(12) United States Patent
Olivier et al.

(10) Patent No.: US 9,756,084 B2
(45) Date of Patent: Sep. 5, 2017

(54) COMMUNICATION SYSTEM ARCHITECTURE

(71) Applicant: Microsoft Technology Licensing, LLC, Redmond, WA (US)

(72) Inventors: Carl S. Olivier, Esher (GB); Andrei Jefremov, Jarfalla (SE); Mihails Velenko, Riga (LV); Sergei Zolotarjov, Tallinn (EE); Marek Laasik, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 14/530,463

(22) Filed: Oct. 31, 2014

(65) Prior Publication Data

US 2015/0145949 A1 May 28, 2015

(30) Foreign Application Priority Data

Nov. 25, 2013 (GB) .................................. 1320778.2

(51) Int. Cl.
*H04N 7/14* (2006.01)
*H04L 29/06* (2006.01)
(Continued)

(52) U.S. Cl.
CPC .......... *H04L 65/1046* (2013.01); *H04L 47/82* (2013.01); *H04L 65/1016* (2013.01);
(Continued)

(58) Field of Classification Search
USPC ............. 348/14.12, 14.09, 21, 69, 156, 192, 348/409.1; 379/9.05, 112.02, 112.05,
(Continued)

(56) References Cited

U.S. PATENT DOCUMENTS 6,088,732 A * 7/2000 Smith .................... H04L 29/06
709/226
6,920,320 B2 7/2005 Rathunde et al.
(Continued)

FOREIGN PATENT DOCUMENTS

CN 102780976 11/2012
WO WO-2015075272 5/2015

OTHER PUBLICATIONS

"International Search Report and Written Opinion", Application No. PCT/EP2014/075585, Aug. 10, 2015, 11 pages.
(Continued)

*Primary Examiner* — Yosef K Laekemariam

(57) ABSTRACT

Disclosed is a communication system for effecting communication events between endpoints connected via a communication network. The communication system comprises a plurality of processing units, each having access to computer storage holding executable code modules for managing a communication event. The code modules are configured to implement a media modality controller configured to manage media modality of an established communication event and a call controller configured to establish the communication event. The communication system further comprises a resource allocator configured to allocate physical resources of the processing units and computer storage to each of the call controller and the media modality controller. A grant of physical resources to the call controller is independent and different from a grant of physical resources to the media modality controller.

20 Claims, 19 Drawing Sheets

(51) Int. Cl.
*H04L 29/08* (2006.01)
*H04L 29/14* (2006.01)
*H04L 12/911* (2013.01)

(52) U.S. Cl.
CPC .......... *H04L 65/1069* (2013.01); *H04L 65/80* (2013.01); *H04L 67/1095* (2013.01); *H04L 69/40* (2013.01); *H04N 7/141* (2013.01)

(58) Field of Classification Search
USPC ........................................ 379/221.04, 265.09
See application file for complete search history.

(56) References Cited

U.S. PATENT DOCUMENTS

| | | | |
|---|---|---|---|
| 7,453,488 | B2 | 11/2008 | Parker et al. |
| 7,561,535 | B2 | 7/2009 | Naqvi et al. |
| 7,680,908 | B2 | 3/2010 | Gates, III et al. |
| 7,729,345 | B2 | 6/2010 | Craig et al. |
| 7,953,698 | B2 | 5/2011 | Beck et al. |
| 8,074,107 | B2 | 12/2011 | Sivasubramanian et al. |
| 8,175,038 | B2 | 5/2012 | Mas Rosique et al. |
| 8,433,303 | B2 | 4/2013 | Naqvi et al. |
| 8,477,926 | B2 | 7/2013 | Jasper et al. |
| 8,483,206 | B2 | 7/2013 | Kohli et al. |
| 8,495,226 | B2 | 7/2013 | Lau |
| 8,547,879 | B1 | 10/2013 | Jones et al. |
| 8,548,125 | B2 | 10/2013 | Liik et al. |
| 8,553,866 | B2 | 10/2013 | Naqvi et al. |
| 8,804,508 | B1 | 8/2014 | Hobbs |
| 8,954,591 | B2 | 2/2015 | Ganesan et al. |
| 9,172,588 | B2 | 10/2015 | Kalyanaraman et al. |
| 9,609,027 | B2 | 3/2017 | Olivier et al. |
| 9,641,558 | B2 | 5/2017 | Olivier et al. |
| 9,667,799 | B2 | 5/2017 | Olivier et al. |
| 2001/0028649 | A1 | 10/2001 | Pogossiants et al. |
| 2006/0146792 | A1 | 7/2006 | Ramachandran et al. |
| 2007/0263611 | A1 | 11/2007 | Mitchell |
| 2008/0151878 | A1 | 6/2008 | Liao et al. |
| 2008/0183991 | A1 | 7/2008 | Cosmadopoulos |
| 2008/0304471 | A1 | 12/2008 | Jackson et al. |
| 2009/0019158 | A1 | 1/2009 | Langen et al. |
| 2010/0008232 | A1 | 1/2010 | Zave |
| 2010/0070563 | A1 | 3/2010 | Baker et al. |
| 2010/0082839 | A1 | 4/2010 | Brunson et al. |
| 2010/0185771 | A1 | 7/2010 | Gurun et al. |
| 2010/0316199 | A1 | 12/2010 | Martin, II |
| 2011/0125913 | A1 | 5/2011 | Maes |
| 2012/0047266 | A1 | 2/2012 | Minert |
| 2012/0155457 | A1 | 6/2012 | Yi et al. |
| 2012/0159234 | A1* | 6/2012 | Mehta ................. H04L 41/0663 714/4.11 |
| 2012/0178413 | A1 | 7/2012 | Schliesser et al. |
| 2012/0278812 | A1 | 11/2012 | Wang |
| 2012/0294282 | A1 | 11/2012 | Kumar |
| 2013/0022192 | A1 | 1/2013 | Free et al. |
| 2013/0024187 | A1 | 1/2013 | Chang et al. |
| 2013/0024574 | A1 | 1/2013 | Lau et al. |
| 2013/0046896 | A1 | 2/2013 | Ball et al. |
| 2013/0057639 | A1 | 3/2013 | Ralston |
| 2013/0066960 | A1 | 3/2013 | Fieremans et al. |
| 2013/0091291 | A1 | 4/2013 | Liu |
| 2013/0106989 | A1 | 5/2013 | Gage et al. |
| 2013/0177011 | A1 | 7/2013 | Carter |
| 2013/0250941 | A1 | 9/2013 | Siegel et al. |
| 2013/0251129 | A1* | 9/2013 | Jasper ................. H04M 3/5237 379/112.05 |
| 2013/0259031 | A1 | 10/2013 | Cheung et al. |
| 2013/0279669 | A1 | 10/2013 | Minert |
| 2013/0304929 | A1* | 11/2013 | Fahlgren ............. H04L 65/1006 709/227 |
| 2013/0336308 | A1 | 12/2013 | Laasik et al. |
| 2014/0115164 | A1 | 4/2014 | Kalyanaraman et al. |
| 2014/0270093 | A1 | 9/2014 | Lum et al. |
| 2014/0301192 | A1 | 10/2014 | Lee et al. |
| 2014/0348044 | A1 | 11/2014 | Narayanan et al. |
| 2015/0127808 | A1 | 5/2015 | Bragstad et al. |
| 2015/0146580 | A1 | 5/2015 | Olivier et al. |
| 2015/0146581 | A1 | 5/2015 | Olivier et al. |
| 2015/0146715 | A1 | 5/2015 | Olivier et al. |
| 2015/0146716 | A1 | 5/2015 | Olivier et al. |

OTHER PUBLICATIONS

"Cloud-based Video Bridging Service", Retrieved From: <http://bluejeans.com/mcu/alternative> Dec. 24, 2014, May 30, 2013, 4 Pages.
"Selecting a Cisco Unified Videoconferencing Solution Deployment Topology", Available at: <http://www.cisco.com/c/en/us/td/docs/video/cuvc/design/guides/desktop/7_0/cuvc70dg/topology.pdf>, Jan. 15, 2010, 14 pages.
Huang, "Building a Scalable Framework for the Collaborative Annotation of Real Time Data Streams", Proceedings: In Doctoral Dissertation, Indiana University Available at: <http://grids.ucs.indiana.edu/ptliupages/publications/TaoHuang-Thesis-Final.pdf>, Jan. 2013, 100 pages.
Katz, et al., "A Scalable Service Architecture for Computer-Telephony Integration", Proceedings: In IEEE Communication Magazine, Feb. 1999, 21 pages.
Uyar, "Scalable Service Oriented Architecture for Audio/Video Conferencing", Proceedings: In Doctoral Dissertation, Syracuse University Available at: <http://grids.ucs.indiana.edu/ptliupages/publications/UyarThesisFinal.PDF>, May 2005, 228 pages.
Wu, et al., "Building Scalable and High Efficient Java Multimedia Collaboration", Proceedings: In International Symposium on Collaborative Technologies and Systems, May 14, 2006, 8 pages.
"Architecting a Cloud Based IP Multimedia System (IMS)", an Ip.com Prior Art Database Technical Disclosure, Feb. 20, 2013, 16 pages.
"International Search Report and Written Opinion", Application No. PCT/EP2014/075586, Feb. 23, 2015, 10 pages.
"International Search Report and Written Opinion", Application No. PCT/EP2014/075584, Feb. 23, 2015, 11 pages.
"International Search Report and Written Opinion", Application No. PCT/US2014/075583, Feb. 23, 2015, 11 pages.
"International Search Report and Written Opinion", Application No. PCT/EP2014/075587, Feb. 23, 2015, 12 pages.
Bellavista, et al., "QoS-aware elastic cloud brokering for IMS Infrastructures", IEEE Symposium on Computers and Communications, 2012, 2012, 4 pages.
Chen, "IMS cloud computing architecture for high-quality multimedia applications", Wireless Communications and Mobile Computing Conference (IWCMC), 2011, Jul. 4, 2011, pp. 1463-1468.
Ganesh, "Architecting a cloud based IP Multimedia System (IMS)", IP.COM Journal, Feb. 21, 2013, 9 pages.
Johansson, "Session Mobility in Multimedia Services Enabled by the Cloud and Peer-to-Peer Paradigms", In Proceedings: 5th IEEE Workshop on User Mobility and Vehicular Networks, Oct. 4, 2011, 7 pages.
Keating, "Ringio Launches Cloud-based 'Rich Calling' Service", Retrieved From: <http://blog.tmcnet.com/blog/tom-keating/unified-communications/ringio-launches-cloud-based-rich-calling-service.asp> Sep. 11, 2013, Apr. 19, 2010, 6 pages.
Kogel, et al., "Load Sharing in a Distributed IMS Architecture", In Proceedings: IEEE 69th Vehicular Technology Conference, Apr. 26, 2009, 6 pages.
"Non-Final Office Action", U.S. Appl. No. 14/530,306, Apr. 7, 2016, 10 pages.
"Non-Final Office Action", U.S. Appl. No. 14/530,514, Apr. 8, 2016, 29 pages.
"Non-Final Office Action", U.S. Appl. No. 14/530,393, Mar. 29, 2016, 30 pages.
"International Preliminary Report on Patentability", Application No. PCT/US2014/075583, Nov. 26, 2015, 7 pages.
"International Preliminary Report on Patentability", Application No. PCT/EP2014/075586, Dec. 1, 2015, 7 pages.

(56) References Cited

OTHER PUBLICATIONS

"International Preliminary Report on Patentability", Application No. PCT/EP2014/075587, Dec. 1, 2015, 7 pages.
"Non-Final Office Action", U.S. Appl. No. 14/530,557, Jun. 17, 2016, 14 pages.
"Final Office Action", U.S. Appl. No. 14/530,514, Aug. 25, 2016, 34 pages.
"Final Office Action", U.S. Appl. No. 14/530,393, Oct. 6, 2016, 34 pages.
"Final Office Action", U.S. Appl. No. 14/530,306, Aug. 16, 2016, 9 pages.
"Notice of Allowance", U.S. Appl. No. 14/530,306, Dec. 1, 2016, 8 pages.
"Notice of Allowance", U.S. Appl. No. 14/530,514, Jan. 5, 2017, 18 pages.
"Notice of Allowance", U.S. Appl. No. 14/530,557, Dec. 21, 2016, 5 pages.
"Supplemental Notice of Allowance", U.S. Appl. No. 14/530,557, Jan. 17, 2017, 2 pages.
"Corrected Notice of Allowance", U.S. Appl. No. 14/530,514, dated Mar. 29, 2017, 2 pages.
"Corrected Notice of Allowance", U.S. Appl. No. 14/530,514, dated May 2, 2017, 2 pages.
"Extended European Search Report", EP Application No. 16202288.3, dated Mar. 21, 2017, 9 pages.
"Non-Final Office Action", U.S. Appl. No. 14/530,393, dated Apr. 20, 2017, 40 pages.

\* cited by examiner

COMMUNICATION SYSTEM ARCHITECTURE

RELATED APPLICATIONS

This application claims priority under 35 USC §119 or §365 to Great Britain Patent Application No. 1320778.2, filed Nov. 25, 2013, the disclosure of which is incorporate in its entirety.

BACKGROUND

Conventional communication systems allow a user of a device (endpoint), such as a personal computer or mobile device, to conduct voice or video calls with one or more other endpoints over a packet-based computer network such as the Internet. FIG. 1 shows an example of such a user device 102, as used by a user 104. User device 102 is shown executing a communication client 120 for use in conducting such calls. Frequently, communication of call data by endpoints is effected by the endpoints adhering to an agreed communication protocol. One example of this is the Session Initiation Protocol (SIP). In broad terms, SIP dictates that calls be negotiated in accordance with an endpoint-to-endpoint request-response-based transaction paradigm in which (among other things) the call is progressed from an initial unconnected state to a state in which real-time media can flow between endpoints by SIP user agents—such as SIP user agent 108 which forms part of the client software 106 executed at endpoint 102—transmitting a sequence of request messages to other user agents of other endpoints and receiving respective response messages in return, with maintenance and eventual termination of the call being similarly effected. Each user agent maintains a state machine (such as state machine 110) for the duration of the call which is used to track current call state. The state machines are suitably updated upon transmission of salient requests and receipt of salient responses.

A typical example of an SIP call flow between two users (Alice and Bob) is illustrated in FIG. 2. Initially, Alice's user agent transmits an INVITE request to Bob's user agent (S202), which initially returns a provisional RINGING response (S204) followed by an OK response (S206) indicating that Bob has accepted the call. Alice's user agent acknowledges this with an ACK message (S208) and real-time media flow commences (S210). At S212 Alice's user agent instigates call termination by transmitting a BYE request to Bob's user agent (S212). In response, Bob's user agent returns an OK response (S214) and the call is terminated. As shown, Alice and Bobs' user agents may exchange such messages via an SIP proxy 120. For instance, Alice and Bobs' user agents may initially register their respective addresses with the proxy 120 to make themselves 'visible' to one another. Typically, the proxy 120 is stateless in so far as it does not maintain any data about the current call state (and merely acts as a relay) or transaction-stateful in so far as it only maintained limited information about current transactions (i.e. single request-response exchanges) and only for the duration of those transactions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

Disclosed is a communication system for effecting communication events between endpoints connected via a communication network. The communication system comprises a plurality of processing units, each having access to computer storage holding executable code modules for managing a communication event. The code modules are configured to implement a media modality controller configured to manage media modality of an established communication event and a call controller configured to establish the communication event. The communication system further comprises a resource allocator configured to allocate physical resources of the processing units and computer storage to each of the call controller and the media modality controller. A grant of physical resources to the call controller is independent and different from a grant of physical resources to the media modality controller.

Also disclosed is a method of resource allocation in a communication system comprising a plurality of processing units, each having access to computer storage holding executable code modules for managing the communication event. The code modules are configured to implement a media modality controller configured to manage media modality of an established communication event and a call controller configured to establish the communication event. The method comprises: allocating first physical resources to the call controller; and independently allocating second physical resources to the media modality controller, the second physical resources being different to the first physical resources.

Also disclosed are computer program products configured to implement any of the disclosed methods and/or communication systems.

BRIEF DESCRIPTION OF FIGURES

To aid understanding of the disclosed subject matter and to show how the same may be put into effect, reference will now be made, by way of example, to the following drawings in which.

DETAILED DESCRIPTION 0.1 Overview

Figure 1:
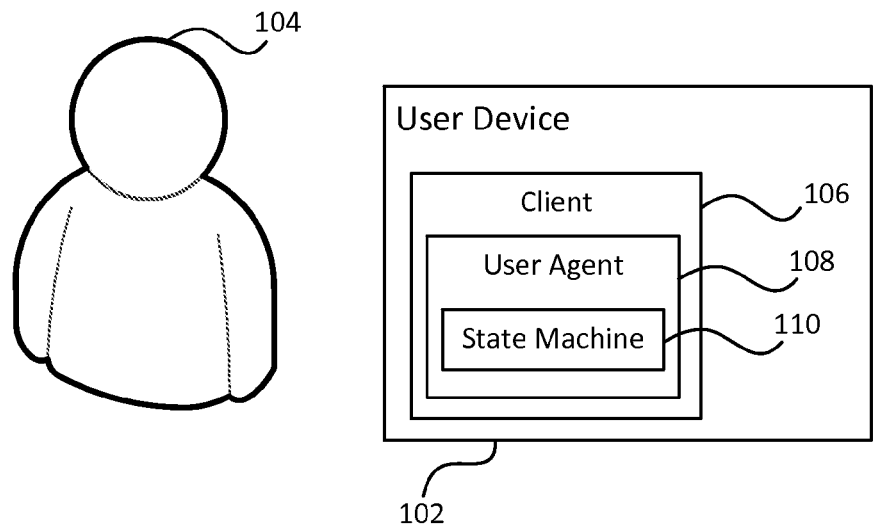
FIG. 1 is a schematic illustration of a user device executing an SIP client.

When setting up a real-time media communication event such as a call (e.g. an audio call, audio-and-video (AV) call etc.) between one or more endpoints, a number of decisions have to be made taking into account multiple factors and variables including whether parties should be allowed to call one another, what audio and video codecs to use, how to route media packets from one party endpoint to another etc. In order to (among other things) ensure appropriate decisions are made, provide the parties in the call the best feasible quality, and complete call setup as fast as possible, algorithms, protocols, systems and processes responsible for the call setup, including media (e.g. audio and video) negotiation, should have access to any salient information and should be allocated sufficient computing resources to be able to perform their respective control functions.

In the described embodiments, a bespoke Central Intelligence Cloud Call Setup, Control and Media Negotiation (CICCSMNC) system provides centralized (as opposed to end-point based) control of real-time media communication events from within a "distributed platform" otherwise referred to as a "cloud platform" or simply a "cloud", with CICCCSMNC system is tailored to leverage computing resources provided by such a cloud platform which can be readily and dynamically to ensure that (among other things) the above considerations are met.

As used herein, a "distributed platform" ("cloud") is a computing platform, accessible via a network (e.g. the Internet), which includes a distributed computer system comprised of multiple networked computer devices and system software running thereon, the computer system providing a (potentially very large) pool of physical computing resources (such as physical processing resources and physical memory resources, volatile and/or non-volatile), and the system software being configured to partition this underlying physical resource pool by implementing multiple independent, software-realized (or "virtual"), resource-limited computer systems each having their own respective computer architecture (which may be different from that of the underlying physical computer system on which they are running) Each of these virtual computer systems is allocated by the system software (and can thus make use of) a predetermined portion of the total available physical resources, that portion having a size which is substantially independent from any other virtual computer systems of that platform. At least some of these virtual computer systems are configured to provide a runtime environment for application code, the code application being executed within that virtual computer system e.g. on one or more virtual processors having a respective instruction set architecture (which may be different from that of any physical processor(s) on which the virtual computer system is running). These or other such virtual computer systems may be configured as data access means (e.g. being configured as a database server or similar), configured to provide access to physical memory resources accessible by that data access means, by which application code can read data from, and write data to, those physical memory resources.

This pooling of physical computer resources, and partitioning of that pool through virtualization act to decouple hardware and software considerations due to a virtualization layer (realized by the system software of the platform) providing separation of physical computer resources (e.g. available physical processor clock cycles and physical bits of memory) from 'virtual' resources—that is, resources actually be seen within each virtual computer system. Physical resources of the underlying hardware can be augmented by way of addition of new physical network computer devices, or upgrading of existing physical networked computer and the only considerations that need to be made in terms of legacy compatibility are of ensuring that the upgraded physical computer systems can still run the same generic virtual machines (i.e. without any consideration of what operating systems or application code are going to be run on those virtual machines). Similarly, a system designer can design systems (possibly extremely complex systems with many components), and develop code in relation thereto, for implementation on the cloud platform free from physical hardware considerations (such as ordering, deploying and housing physical servers etc.)—the system designer need only consider consumptions of computer resources in terms of resource limitations of virtual computer systems (not resource limitations of the underlying hardware), resource limitations of those virtual systems being well-defined and known. Thus, from the perspective of the systems designer, computer resource considerations are reduced to considerations of e.g. how many virtual computer systems of the cloud platform should be deployed; from the perspective of an operator of the platform itself (who may be different from the systems designer), computer resources are reduced to considerations of e.g. how many physical computer systems are needed to implement a required number of virtual machines having pre-defined resource allocations.

Figure 8:
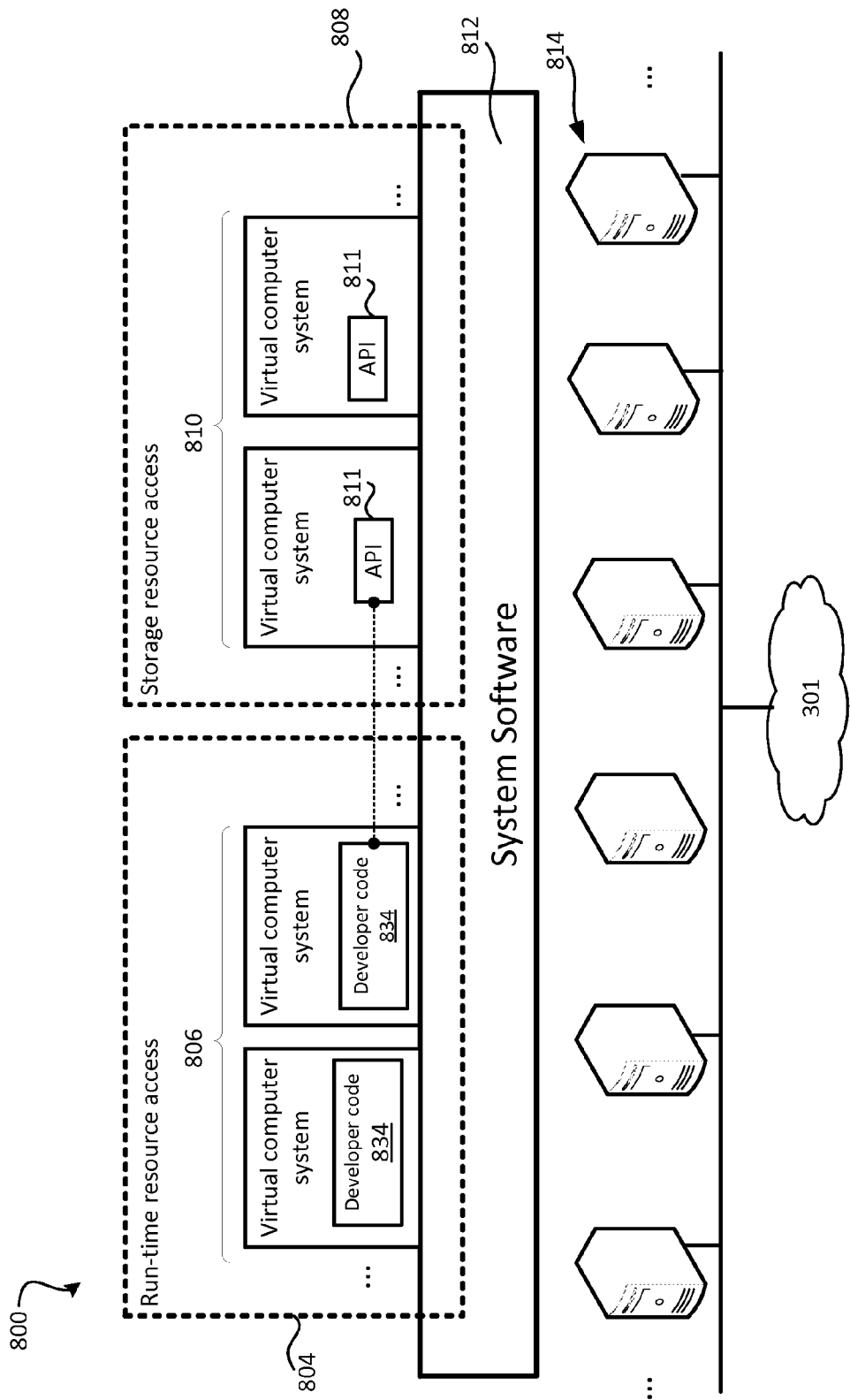
FIG. 8 is a schematic overview of a communication system architecture.

A high-level overview of an exemplary distributed platform 800 is shown in FIG. 8. The exemplary platform includes a distributed computer system 814. The computer system 814 of FIG. 8 is comprised of a very large number (e.g. tens of thousands) of networked computer devices—large enough that the physical computing resources can, in some contexts, be considered sufficiently plentiful as to be effectively unlimited. These computer devices are configured for communication with a packet-based data network 301 (e.g. the Internet) and are globally distributed (e.g. spread across multiple countries and/or continents). Typically, groups of such computer systems (e.g. thousands of servers) are housed in respective data centers (alternatively referred to as "datacenter") at different geo-locations (i.e. in different regions of a country, different countries, different continents etc.)

System software 812 runs on top of the distributed computer system 814. The system software 812 is configured to implement two sets 804 (runtime set) and 808 (storage set) of independent, virtual, resource-limited computer systems 806, 810. Each virtual system 806, 810 is resource-limited in the sense that it is allocated a predetermined limited portion of the total available underlying physical resources of the distributed computer system 814 by the system software 812 and is independent in the sense that the size of this portion is substantially independent from other virtual systems of the platform 800. Each virtual system 806, 810 is virtual in the sense that it is software configured to emulate a computer architecture (which is typically different from that of the physical computer system 814).

The runtime set 804 comprises multiple virtual computer systems 806 which provide runtime environments for execution of application code 834, the application code 834 being executed on that virtual computer system 806. The system software 812 is configured to enable a software developer, desiring to make use of the platform 800, to upload their bespoke code 834 via network 301 to the platform 800 for execution thereon. In response, the system software 812 creates such a runtime environment and supplies the code 834 to the newly-created runtime environment for execution. Execution of this code 834 on the virtual system 806 is made possible by the system software mediating access to underlying physical processing resources and physical memory resources (primarily realized at the physical level by physical volatile memory) allocated to that environment.

The storage set 808 comprises multiple virtual computer systems 810 configured to provide data storage. Each has a corresponding Application Programming Interface (API) 811 which can be used to effect transfer of data to and from the physical memory resources (primarily realized at the physical level by physical non-volatile memory) allocated to that computer system 810 e.g. by code 834 making suitable function calls thereto. This transfer is, again, mediated by the system software 812.

Examples of distributed platforms include Windows Azure™, Amazon Web Services™ etc.

Figure 2:
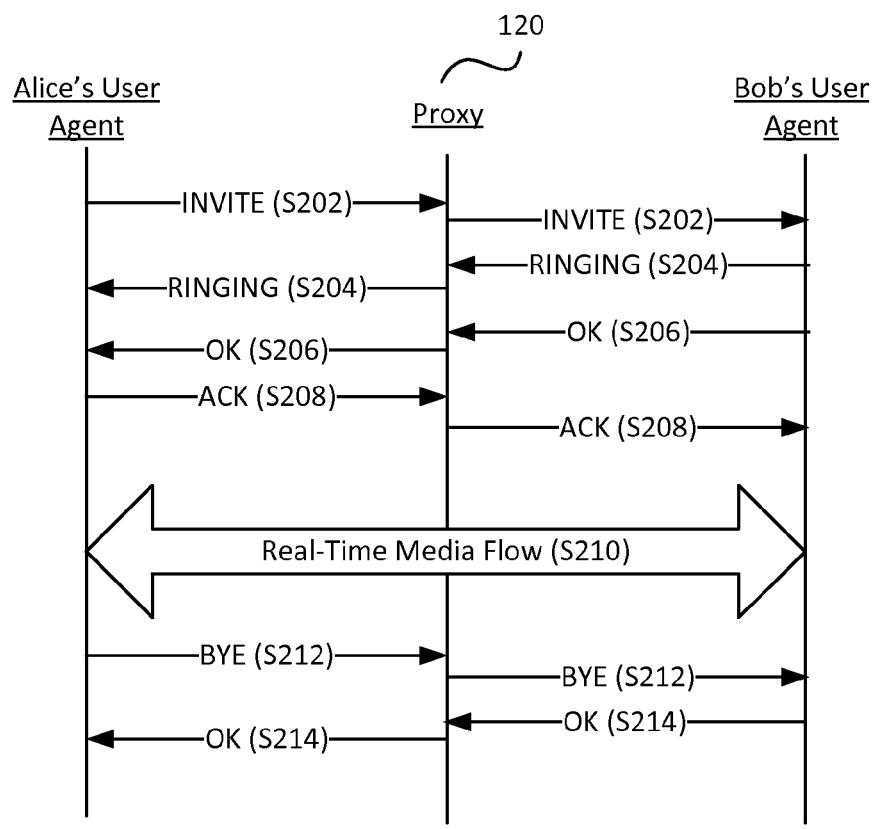
FIG. 2 is a schematic illustration of and SIP-based call flow.

The CICCSCMN system is designed and implemented according to a set of principles and design patterns, with the core being that of central control and decision making (as opposed to e.g. the endpoint control and decision making of SIP as discussed in relation to FIGS. 1 and 2). It comprises a plurality of service logics, each service logic being implemented by application code executed on one more virtual computer systems of the cloud platform, those virtual computer systems being distinct from those of other service logics of the cloud platform (that is, such that different service logics are implemented by different sets of application code executed on different respective virtual computer systems of the could platform).

Service logics are grouped according to type (there being multiple service logics of each type). Each type of service logic is configured to control to control—by way of interaction with other service logics and service agents of that same type which form part of an end-user communication client application—a distinct aspect of a real-time media communication event (e.g. an AV call) conducted over a communication system using that client.

Central control and decision making is not implemented by a single service logic or software component, but rather multiple, independent service logics (controller) of different types, which work together to control and facilitate any given real-time media communication event. The services are decoupled, with well-defined borders and interfaces. For call setup and corresponding media setup, and control of these whilst the call is on-going, following service groupings (types of service) are defined as below and as set out in table 1:

First type: Call Control (oversees signalling, call state, control—control being a composite of changing state via signalling)

Second and third types: Transport Control and Pipe Control (oversees topology, endpoint connection/pipe management, media flow and packetisation, encryption on the wire). Transport handles the overall endpoint topology, and instructs Pipe to establish a connection between the endpoints in the topology of a call.

Fourth type: Audio Media Control (oversees audio codec selection, audio specific variable management, endpoint audio control e.g. muting)

Fifth type: Video Media Control (video codec selection, video specific variable management, endpoint video control e.g. enabling/disabling video)

TABLE 1

| SERVICE (CONTROLLER): | Primary function: | Details thereof: |
| --- | --- | --- |
| CALLING (CALL CONTROLLER) | Call signalling, control and state | Calling provides the underlying real time communications framework for all synchronous real-time events, e.g. calls. |
| TRANSPORT AND PIPE (TRANSPORT AND PIPE CONTROLLERS) | Media transport pipes and encryption | Media Transport provides the underlying transport topology for all media packets between endpoints and the service that establishes the physical connections between endpoints |
| AUDIO (AUDIO CONTROLLER) | Voice engine components and audio codecs | Audio provides the audio processing logic used to send and receive audio packets to and from endpoints. |
| VIDEO (VIDEO CONTROLLER) | Video engine components and video codecs | Video provides the audio processing logic used to send and receive video packets to and from endpoints. |

Any given call will typically be controlled by one of each type of service logic (that is, one from each group) at any given time during the call (although the individual service logic of that type is subject to change during a call under certain conditions).

Service logics expose interfaces—e.g. RESTful ("Representational State Transfer") interfaces—for communication with one another and/or with their respective agents. REST is an architectural style that abstracts architectural elements within a distributed hypermedia comprising, at a high level of abstraction, processing elements (i.e. elements which perform functions runtime—including service logics and service agents in the present context); data elements (i.e. data which is processed by processing elements—including real-time media communication event data and associated control data in this context); and connecting elements (i.e. mechanisms which facilitate communication between processing elements within the communication system in this context). REST ignores details of processing element implementation and protocol syntax in order to focus on the roles of processing elements, the constraints upon their interaction with other components, and their interpretation of significant data elements.

Services are 'bordered' with different types of service logics having substantially disjoint remits (i.e. there is minimal or no overlap between tasks performed by different types of service logic): if control of a first service by a first type of service logic necessitates performance of a task that is within the remit of a second type of service logic, rather than perform that task itself, the service logic will request that a second service logic of that second type performs that task instead. Inter-service requests are higher-level requests in that they do not specify lower-level implementation details (that is, they request only that a particular task is completed without specifying lower-level details of how it is to be completed). The second service logic then informs the first service logic upon completion of that task, again without communicating any lower-level details of how it has been completed For instance, a first service logic may request that a second service logic establish some mechanism for communicating data from one endpoint to another (that being within the remit of the second service logic); the second service logic may then handle all of the lower-level details of that request e.g. selecting a connection protocol, finding a path through the network, establishing and maintaining a connection according to that protocol across that path etc. The first service logic can, once informed of the establishment of this mechanism, make use of that mechanism with the lower-level implementation details remaining largely invisible thereto.

Rules or 'contracts' are defined which, for each pair of service logics, specify circumstances in which that pair of service logics should and should not communicate directly with one other and which, for each service and its corresponding agent, specify circumstances in which that service and that agent should and should not communicate directly with one another. Contracts essentially define what each service exposes in terms of interfaces, what the responsibilities are, and what the limitations are.

Setting up a real time audio-and-video call (referred to as a "video call" herein for simplicity) call is performed by respective service logics delivering these services, which is effected via a command received or initiated via the e.g. RESTful interface of a call control service logic. This command results in a "call representation" for that call being created in the cloud comprising a "call state" in the form of call parameters and information which is stored and maintained by the call control service logic for the duration of that call. Failure of that service logic aside, this is the only authoritative instance and state representation of the call; any subsequent commands received related to that specific call result in a possible state modification being performed on its representation by the call control service logic, and this change being communicated to any interested endpoints/parties/subscribers.

As part of the call setup and control, media needs to be negotiated and controlled, and transport mechanisms established, to allow media data packets to flow between endpoints. This is achieved by the call control service logic calling the interfaces exposed by the other control service logics (transport, pipe, audio, video) informing them of the call and instructing them to perform steps to set up the call between endpoints. This inter-service interaction model results in the various services doing what is necessary to make the relevant decisions, instruct their endpoint agents to perform actions, provide variable data and context—reporting readiness to the call control service, and any other service logics where relevant. Once the various services have completed and all reported readiness, the call control service logic updates the call state and communicates the updated state of the call to all connected endpoints (and any other interested components), allowing the call to be connected, and media to flow.

During the call, signals will be sent by endpoints and agents to the various services—for controlling the main aspects of the call participation, this is via the call control service logic, but service agents are able to independently talk to their corresponding service logics of the same as needed, using their respective interfaces, provided the contract between services is not broken.

It should also be noted that a service is deemed to own both the cloud based components and elements—as well as the endpoint service agent (if required by the service). The Could service also owns the endpoint contract (or Agent).

Figure 3:
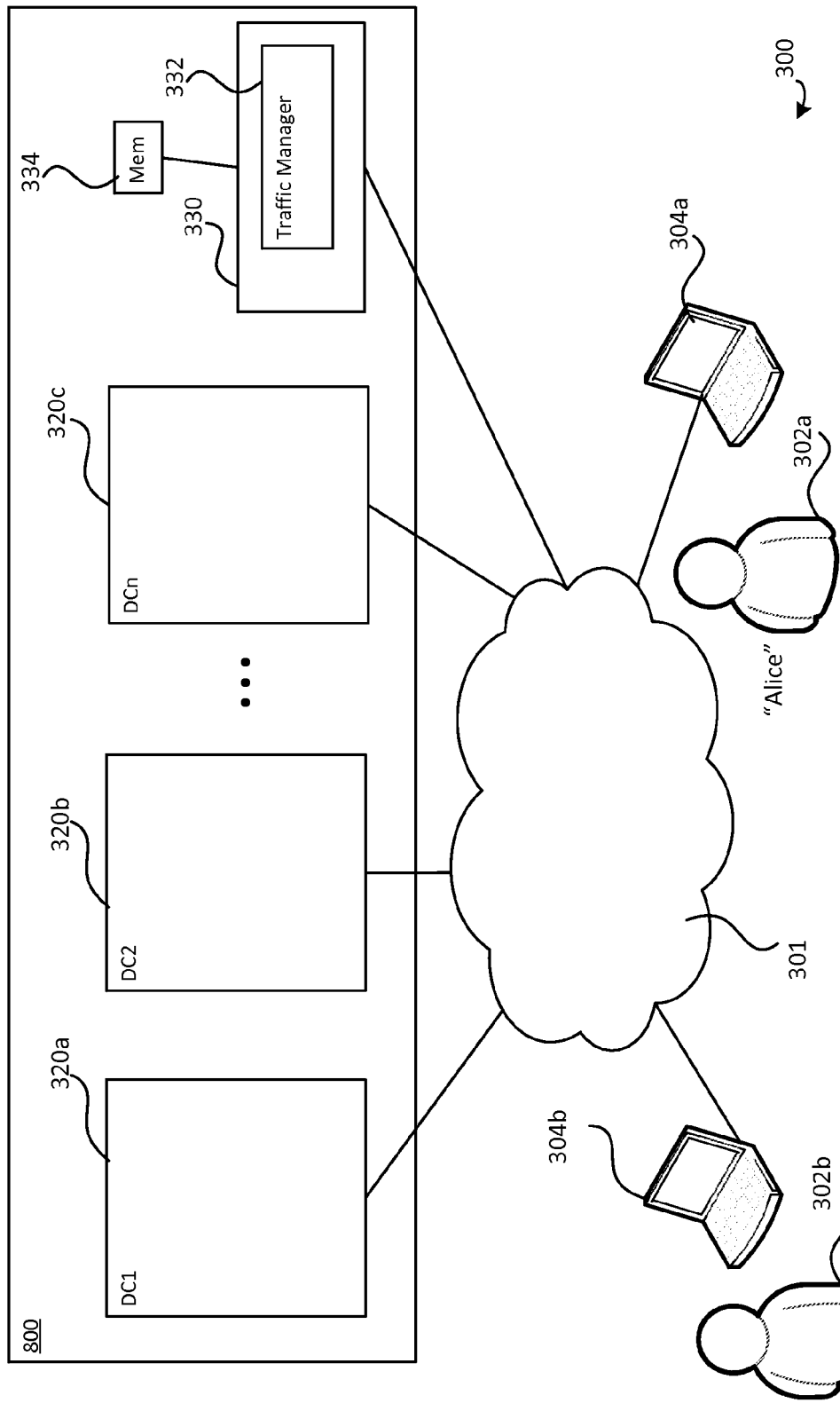
FIG. 3 is a schematic illustration of a communication system.

A communication system 300 in accordance with the present subject matter will now be described with reference to FIG. 3. The communication system 300 includes a packet-based communication network (here, a computer network) 301 (e.g. the Internet). Connected to the network 300 are a user device (user terminal) 304a associated with a first user 302a ("Alice") and a further user device (user terminal) 204b associated with a second user 302b ("Bob"). The user devices 304a, 304b are arranged to receive information from and output information to the user of the respective device. Although only two user devices are shown in FIG. 3, many more user devices may be included in communication system 300. Each of the user devices 304a, 304b may be, for example, a mobile phone (e.g. smartphone), a tablet, a laptop, a personal computer ("PC") (including, for example, Windows™, Mac OS™ and Linux™ PCs), a gaming device, a personal digital assistant ("PDA") or other embedded device able to connect to the network 301.

Also connected to network 301 are a plurality of data centers (DCs) 320a, 320b, . . . , 320c and a traffic management system 330 which is a computer system. The traffic management system 330 comprises one or more memory devices 334 and one or more processors configured to execute traffic management code 332 (traffic manager/traffic management logic) for managing datacenter traffic as described in more detail below. The traffic management system 330 and the datacenters 320 form part of the distributed platform 800.

The communication system 300 is for effecting communication events (e.g. AV calls) between a plurality of endpoints connected via the communication network 301. The endpoints may be user devices (e.g. 304a, 304b) and/or other computer devices/computer systems (e.g. servers or bridges). The communication system 300 a plurality of processing units each having access to computer storage holding executable (application) code modules for managing a communication event. As discussed in more detail below, the code modules are configured to implement:

a call controller configured to establish a communication event and to manage the established communication event;

one or more media modality controllers (e.g. audio controller, video controller) configured to manage a respective media modality (e.g. audio, video) of the established communication event (which includes negotiating media modality parameters etc. with the endpoints during the establishment of the communication event);

a transport controller configured to manage transport of media of the communication event between the endpoints, (which includes negotiating transport parameters etc. during the establishment of the communication event with the endpoints, and controlling a pipe controller); and the pipe controller which is configured to create pipes (during the establishment of the communication event), between respective pairs of said endpoints, for said transportation of media under control of the transport controller.

Any one or more of said controllers may be a virtual controller, as explained below.

The processing units are distributed across multiple failure-tolerant regions, and the computer storage is partitioned into multiple failure-tolerant regions. A failure tolerant region is a region substantially isolated from failure of components (hardware and software) in any other failure-tolerant region. Examples include different fault domains within a data center (discussed below), different data centers (data centers defining respective fault-tolerant regions), different geo-locations (geo-locations defining respective failure-tolerant regions). In this embodiment, the processing units are processing units of networked servers. The servers are distributed across multiple data centers (and across different fault domains within each data center). The communication system comprises a plurality of control servers, each control server being configured to control operation of a respective group of one or more of said networked servers. Each control server is configured, responsive to receiving at least one executable code module from the network, to store the received code module in the computer storage whereby the stored code module is accessible to one or more servers controlled by that control server. Responsive to receiving the code module from the network, the control server is configured to instantiate a virtual machine on a server whereby the virtual machine is responsive to received instructions to instantiate that code module on the virtual machine. The control server is configured to instantiate multiple virtual machines on one or more servers whereby each virtual machine is responsive to received instructions to instantiate that same code module.

In this embodiment, as described in more detail below, each of said processing units is configured to run plurality of virtual machines, each of said virtual machines having access to at least one of said code modules whereby one or more instances of that code module run on that virtual machine. However, in alternative embodiments, some or all of the processing units may not run virtual machine and code modules may be executed 'directly' on those processing units (e.g. on top of an operating system running 'directly' on that processing unit).

0.2 User Device

Figure 4:
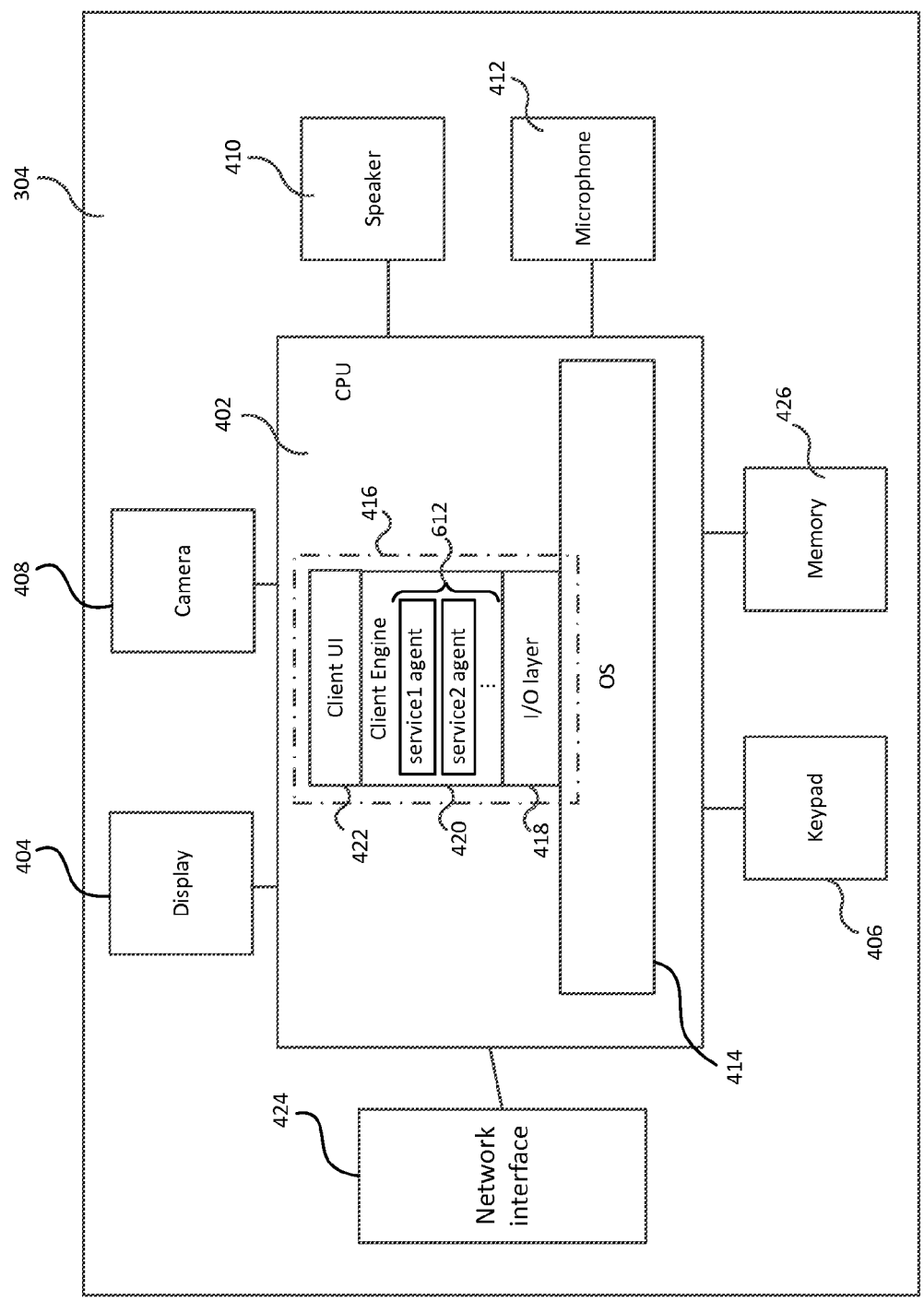
FIG. 4 is a schematic illustration of a user device.

FIG. 4 illustrates a detailed view a user device 304 (such as user devices 304a and 304b). The user device 114 comprises a central processing unit ("CPU") 402, to which is connected: output devices such as a display 404, which may be implemented as a touch-screen, and a speaker (or "loudspeaker") 410 for outputting audio signals; input devices such as a microphone 426 for receiving audio signals, a camera 408 for receiving image data, and a keypad 406; a memory 426 for storing data; and a network interface 424 such as a modem for communication with the network 301. The user device 114 may comprise other elements than those shown in FIG. 4. The display 404, speaker 410, microphone 412, memory 426, camera 408, keypad 406 and network interface 424 are be integrated into the user device 304. Alternatively, one or more of the display 404, speaker 410, microphone 412, memory 426, camera 408, keypad 406 and network interface 424 may not be integrated into the user device and may be connected to the CPU 402 via respective interfaces. One example of such an interface is a USB interface. If the connection of the user device 304 to the network 301 via the network interface 424 is a wireless connection then the network interface 424 may include an antenna for wirelessly transmitting signals to the internet 301 and wirelessly receiving signals from the internet 301.

FIG. 4 also illustrates an operating system ("OS") 414 executed on the CPU 402. Running on top of the OS 414 is an 416 instance of a communication client application (client) of the communication system 300, shown as a software stack. The client 416 communicates with the operating system 414 and manages the connections over the communication system 300, including connections with other user devices and with datacenters 320. The client 416 has a client User Interface ("UI") which is used to present information to, and receive information from, a user of the device. In this way, the client 416 performs the processing required to allow a user (e.g. Alice, Bob) to communicate over the communication system 300. The software stack shows a client protocol layer 418, a client engine layer 420 and a client user interface layer 422. Each layer is responsible for specific functions. Because each layer usually communicates with two other layers, they are regarded as being arranged in a stack as shown in FIG. 4. The operating system 414 manages hardware resources of the device 304 and handles data being transmitted to and from the network 301 via the network interface 424. The client protocol layer 418 of the client software communicates with the operating system 414 and manages the connections over the communication system 300. Processes requiring higher level processing are passed to the client engine layer 420. The client engine 420 also communicates with the client user interface layer 422. The client engine 420 is arranged to control the client user interface layer 334 to present information to the user via the user interface of the client and to receive information from the user via the user interface.

The client engine layer comprises a plurality of service agents 421. Each service agent handles a distinct aspect of a real-time media communication event (e.g. call); the plurality of service agents cumulatively enable a user to conduct such a real-time media communication event via the client user interface. This is described in more detail below. Each service agent has a corresponding API (e.g. C++ API) and the agents communicate with one another by way of those APIs. An agent is the endpoint/client logic implementation that defines how that endpoint interacts with each service (and sometimes with each other).

0.3 Data Center Structure

Figure 5A:
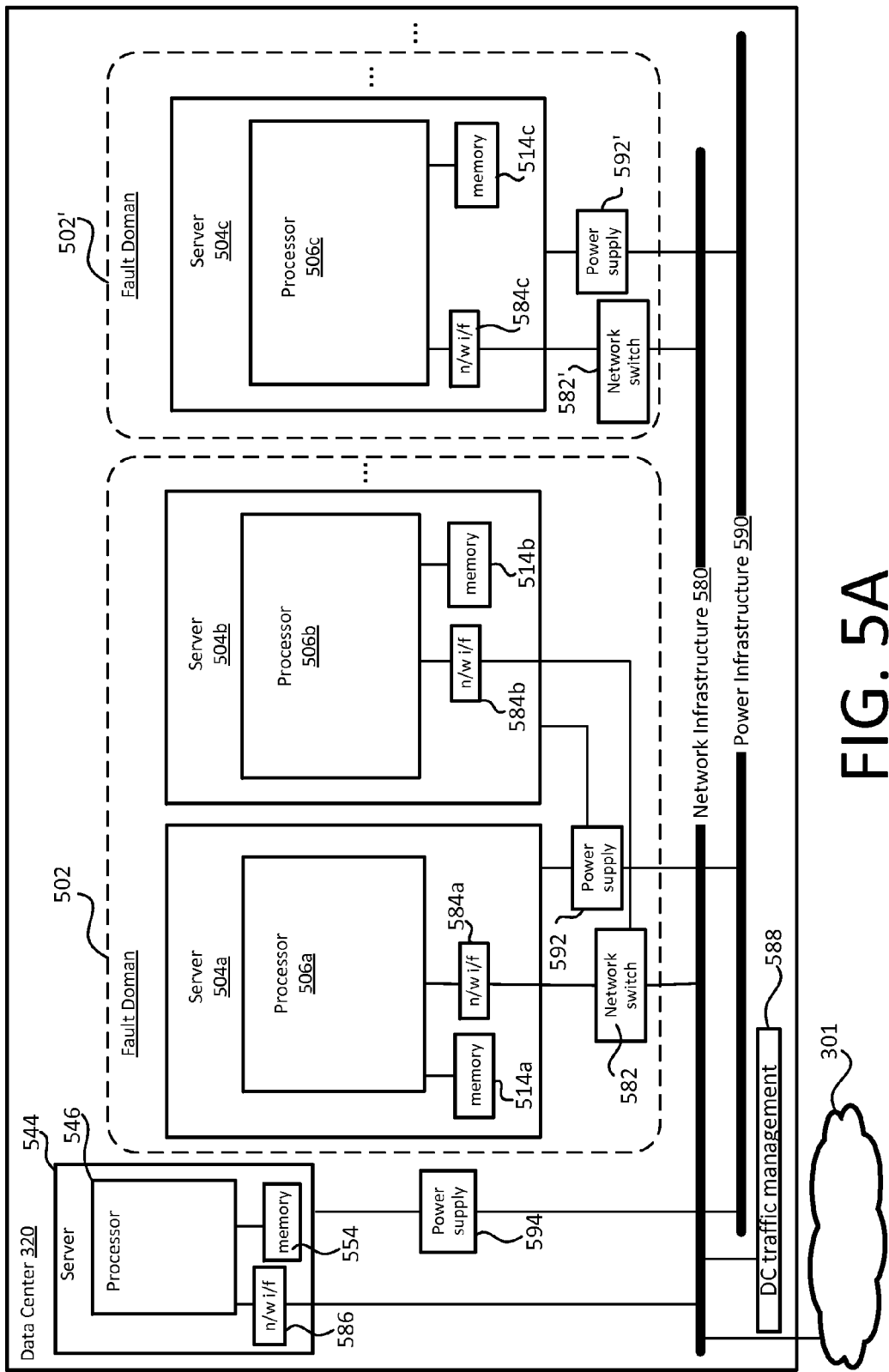
FIG. 5A is a schematic illustration of a datacenter.

FIG. 5A is a schematic illustration of a datacenter 320 (e.g. datacenters 320a, 320b, 320c in FIG. 3). The datacenter comprises a plurality of servers 544, 504a, 504b, 504c; a network infrastructure 580, which is connected to the network 310, for exchanging data packets among networked devices within the datacenter 320 and with devices external to the datacenter via network 301; and a power infrastructure 590 for providing electrical power to devices of the datacenter. Servers 504a, 504b and server 502c are respectively supplied with electrical power by a power supply 592 and a power supply 592', themselves supplied with electrical power from power infrastructure 590. The datacenter also comprises a data center traffic management system 588 connected to network infrastructure 580 for receiving inbound traffic from network 301 directed to data center 320 and distributing that traffic across servers 504a, 504b, 504c, and for distributing internal traffic from one server of the datacenter 320 (e.g. 504a) across other servers of the datacenter 320 (e.g. 504b, 504c). The DC traffic management system may comprise components such as hardware load balancers, and software executed at a suitable computer system, or a combination thereof.

Each of servers 504a, 504b, 504c comprises a respective processor 506a, 506b, 506c to which is connected to a respective memory 514a, 514b, 514c for storing data and a respective network interface 584a, 584b, 584c for exchanging data with other networked devices. Network interfaces 584a and 584b are connected to a network switch 582 which enables servers 504a and 504b to exchange data with one another and with any other servers (not shown) connected to that switch 582 via that switch 582 directly. Network interface 584c is connected to a network switch 582' which enables server 504c to exchange data with any other servers (not shown) connected to that switch 582' via that switch 582' directly. Switch 582 is connected to the network infrastructure 580 which also enables servers 504a, 504b and any other servers (not shown) connected to switch 582 to exchange data with other devices connected to the network infrastructure (e.g. devices so connected via other switches such as switch 582') and with further devices connected to network 301. Switch 582' is similarly connected enabling server 504c to participate in similar data exchanges.

Server 544 is a control server for the datacenter: it is responsible for control and monitoring of other servers in the datacenter. Control server 544 is supplied with electrical power from a power supply 595 itself supplied with electrical power from power infrastructure 590. Control server 544 comprises a processor 546 which is connected to a memory 554 for storing data and a network interface 586 for exchanging data with other networked devices. Network interface 586 is connected to the network infrastructure 580 which enables control server 544 to exchange data with other devices connected to the network infrastructure including servers 504a, 504b, 504c and with further devices (e.g. 304a, 304b in FIG. 3) connected to network 301.

The servers 504a 504b, 504c are grouped into respective "fault domains" 502, 502', a fault domain being a group of servers that share a common point of failure (that is, servers which are dependent on a same physical electronic component for operation, failure of which thus inhibits operation of all those servers). For instance, servers 504a and 504b are connected to the network infrastructure 580 via network switch 582 which is common to both servers 508a, 508b; failure of this switch 582 causes failure of each of servers 504a, 504b, and any other servers connected to that switch in that all such servers become disconnected from the network infrastructure 580 and thus from network 301 in that event. Network switch 582 is therefore said to define a fault domain being a group of all servers connected to that switch 582. Similarly, servers 504a and 504b are both supplied with electrical power from power supply 592 itself supplied by the power infrastructure 509; failure of this power supply 592 causes failure of each of servers 504a, 504b, and any other servers supplied by that power supply 592. Power supply 592 is thus said to define a fault domain being a group of all servers supplied by that power supply 592. In FIG. 5A, each server shown connected to switch 582 is also shown being supplied with electrical power by supply 592 thus switch 582 and supply 592 of FIG. 5A define a common failure domain 502; in general, servers supplied by the same power supply may be connected to different network switches and vice versa. Similarly, FIG. 5A shows a second fault domain 502' characterized by both network switch 582; and power supply 592'. Server 504c of fault domain 502' is shown connected to switch 582' and power supply 592'. Datacenter 320 comprises additional servers (possibly thousands) both in fault domains 502, 502' and in other fault domains characterized by additional network switches, power supplies and other physical components (not shown).

Figure 5B:
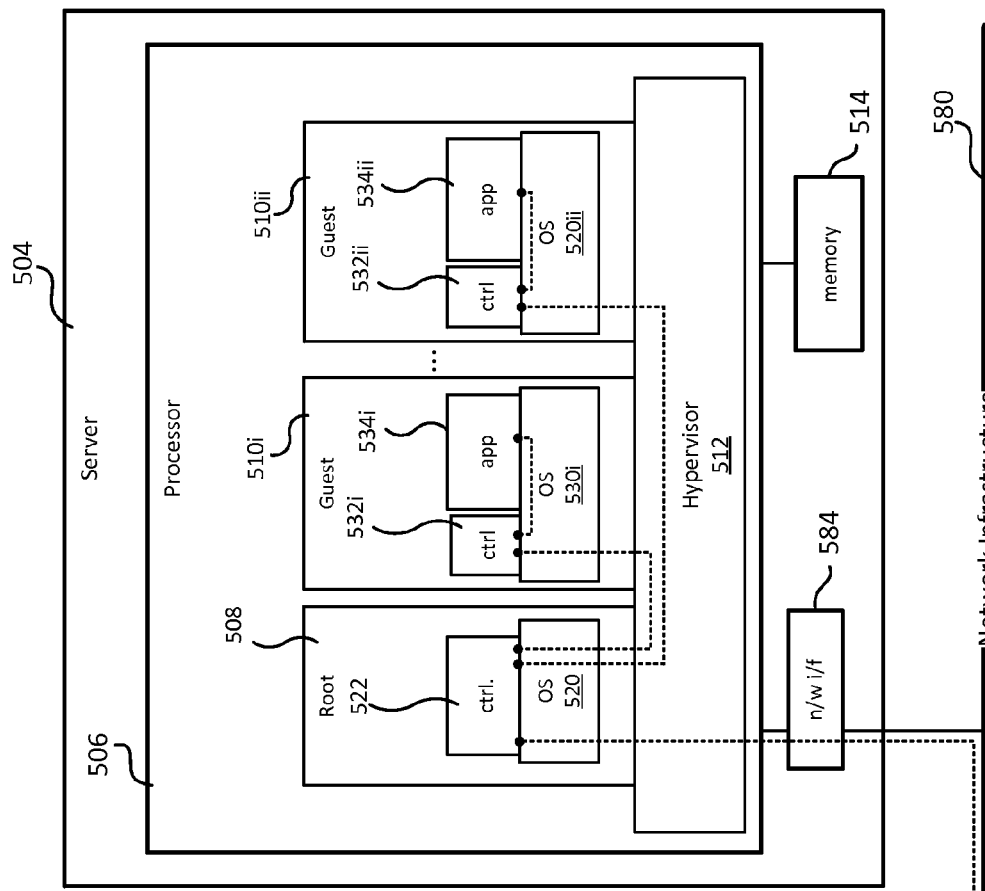
FIG. 5B is a schematic illustration of servers of a datacenter.

FIG. 5B shows schematic illustrations of control server 546 and a server 504 (e.g. 504a, 504b, 504c). Processor 546 of control server 546 executes an Operating System (OS) 550. The operating system 550 manages hardware resources of the control server 544 and handles data being transmitted via the network interface 586. Running on top of the OS 550 is a datacenter manager block 552 in the form of datacenter control software (code). Datacenter manager 552 communicates with the operating system 550 and manages connections with other servers of the datacenter and with other devices connected to network 301. The datacenter manager comprises a datacenter control and monitoring block (DC control block) 556, a resource reporting block 558 and an external control block 559. The DC control block 556 is responsible for monitoring resource usage by, and controlling operation of, other servers in the datacenter e.g. 504. The DC control block supplies information obtained through this monitoring to the resource reporting block 558. The resource reporting block 558 is responsible for reporting DC-wide resource usage (i.e. information pertaining to overall usage of physical resources of the datacenter) via network 301. The external control block 559 is configured to receive configuration information from network 301 and to communicate that information to the DC control block 556. In response, the DC control block 556 is configured to control operation of the datacenter 320 accordingly.

Processor 506 of server 504 executes a hypervisor 512. In the present context, a hypervisor is a piece of computer software that creates, runs and manages virtual machines, typically more than one. In the present context, a "virtual machine" (VM) is a software realization (or "emulation") of a first computer system having a first computer architecture which is run on a second computer system having a second computer architecture which may be different than the first. In other words, a VM has its own computer architecture which may well be different to that of any underlying physical computer system on which the VM is ultimately running (e.g. server 504). Where a hypervisor runs multiple VMs, each may have a respective computer architecture different from other of those VMs. A VM typically supports execution of code thereon (e.g. of application(s) or of an operating system on which application(s) can be executed). A VM may be designed to emulate an existing type of 'real-world' computer system (that is, a VM may have a virtual computer architecture of which there exist direct hardware realizations) or it may be designed to emulate a 'hypothetical' computer system (that is, a VM may have a computer architecture of which there do not exist direct hardware realizations).

For instance, a virtual machine may comprise an emulated processor having a particular instruction-set architecture; code to be executed on that virtual machine is first compiled into a sequence of low-level machine code instructions, these instructions being in accordance with (i.e. having opcodes and operands as specified by) that instruction-set architecture of the emulated processor. However, these machine code instructions are not executed on a physical processor per se; rather, the hypervisor performs further instruction translations ultimately resulting in low-level machine code instructions for execution on one or more physical processors (e.g. processor 506) of a underlying physical computer system on which the hypervisor (and thus the simulated processor) is executed, those instructions being in accordance with (i.e. having opcodes and operands as specified by) the instruction-set architecture of the physical processor in question (as opposed to the simulated processor). For smaller size VMs, VMs may share physical processors; for larger VMs, these are dedicated.

The hypervisor 512 is configured to run a root (parent) VM 508 and one or more guest (child) VMs 510. The root VM executes an operating system 520 and each guest VM 510$i$, 512$i$ executes a respective operating system 520$i$,

520ii. One example of a suitable operating system is Windows Server 2012™. On top of the root OS 520 is executed a host control block 522 in the form of code which is configured (among other things) to be able to create and terminate guest VMs 510 and to initiate booting of the OS 510 thereon, by calling a suitable Application Programming Interface (API) of the hypervisor (not shown). On top of each guest OS 510i, 510ii is executed a respective guest control block 532i, 532ii in the form of code, and respective application code 534i, 534ii (e.g. a software developer's bespoke code) which causes its respective VM 510i, 510ii to perform useful tasks above and beyond the mere running of that VM itself. Each guest control block 532 is (among other things) configured to be able to instigate execution of application code module(s)—i.e. instantiate the application code module to create instance(s) thereof—and terminate execution of application code module(s)—i.e. decommission those application code instance(s)—on that VM. Each OS 520 is configured to initiate execution of the corresponding guest control block 532 automatically when that OS 520 is booted. A guest VM may alternatively or additionally be configured as a data access means (not shown)—see above. At least some of the application code modules are for managing one or more communication events (e.g. calls).

The DC control block of control server 544 and the root control block of root VM 508 can communicate with one another via the network infrastructure 580 as indicated by the dotted line in FIG. 5B e.g. though use of suitable APIs. Creation and termination of guest VMs by the root VM is at the behest of the DC control block 556 of control server 544. The DC control block 556 also indicates to the root control block 522 what application block is to be executed on child VMs of that machine e.g. by providing an identifier of that code or an address which can be used to download that code from e.g. network 301. A VM 510 may run one or more instances of one or more application code modules.

As indicated, configuration information is uploaded to the data center 320 via network 301; this configuration information is received by external control block 559. Each piece of control information pertains to code for execution on a child VM 520 and/or to one or more desired properties of that child VM 520 on which the application code is to be executed (i.e. on which one or more application code modules are to be instantiated).

The root control block 508 can communicate with each guest control block 532 and vice versa e.g. via hypervisor 530—this is again shown by dotted lines in FIG. 5B. Once a guest VM 510 has been created by the root control block 508 at the behest of the DC control block 556, that root control block instructs the guest control code to initiate execution of the application code e.g. responsive to receiving the address or identifier of the application code 534 from the root control block 522 (as supplied by the DC control block 556 from the configuration information) the guest control block 532 downloads the application code 534, using that identifier or address, for execution on the OS 530.

Application code may, for instance, be uploaded to a suitable network location by a software developer or systems designer and that location communicated to the external control block 559 of control server 544 as configuration information. The external control block 559 then communicates that location to the DC control block 556 which, in response, instructs the root control block 552 to create a new guest VM on the same server 506 as the root VM and download that code to that created VM, or to download that code to an existing guest VM on that server.

Such configuration information may also comprise information specifying properties of the child VM on which the application code is to be executed. For instance, the configuration information may specify that a child VM should be 'internally visible' (that is, configured such that other VMs of the distributed platform 800 are able to establish logical connections with that VM either via network 301 or via the DC network infrastructure 580) and/or 'externally visible (that is, configured such that devices e.g. 304a, 304b connected to network 301 are able to establish logical connections with that VM via network 301). The configuration information may, for instance, also specify respective portions of one or more physical computer resources to be allocated to the child VM 510 on which that code is to be executed (such as an amount of memory in e.g. Mega-Bytes, Giga-Bytes etc. and an amount of processing resources in e.g. MegaHertz, GigaHertz etc.).

The configuration information uploaded to the datacenter 320 via network 310 is stored in memory 554 of the control server 544 and this stored configuration information is accessible to the DC control block 556, and (at least partially) to each root VM and each guest VM.

Only the root VM has direct access to underlying physical computer resources (e.g. processor, memory) of the server 506; other guest VM access these resources through the root VM, via the hypervisor or via virtual bus (that is, a logical inter-VM communication channel). The root VM 522 and the hypervisor 512 are collectively configured to regulate access to these underlying physical resources and collectively act to allocate a respective predetermined portion of these physical resources to each guest VM, that predetermined portion being substantially independent from the other guest VMs i.e. such that any behaviour of, or modification to, the other guest VMs does not increase or decrease that portion of physical resources available for use by that guest VM. Thus, each guest VM (e.g. 510i) provides a resource-limited runtime environment which is substantially isolated from any other guest VMs (e.g. 510ii) running on the same processor 506.

Guest VMs 510 do not communicate directly with one another via the hypervisor 512 and, as discussed, have minimal impact upon each other's available physical resources (with virtualization by the hypervisor providing this substantial isolation). In these respects, VMs are blind to each other's existence. That said, guest VMs can still be configured to communicate with one another via the network infrastructure 580, both intra-DC (within the data center 320) and over network 301.

As shown in FIG. 5B, the DC control block 556 is also responsible for controlling the DC traffic management system 588 to regulate traffic flow within the datacenter for both data received form network 301 and internal data exchanged via network infrastructure 580.

The child control code 532 on each child VM 510 has two functions (among others): firstly, it sends periodic heartbeats to its corresponding root VM; secondly, it monitors the application code 532 executed on that VM. If a failure of the application code occurs, the child control code attempts to restart that application code using the stored configuration information. If it is unable to do so, it communicates this failure to the corresponding root control code 522. Further, if failure of that child VM occurs, the heartbeats from the child control code 532 will cease. In response to either of these events, the root control 532 terminates that child MV 510 and then re-creates it using the stored configuration information as above (with the re-created VM thus loading and executing the same application code as the terminated VM).

Similarly, the root control code 522 transmits periodic heart beats to the DC control block 556. If these heartbeats cease e.g. due to a hardware failure of the physical server 504 (e.g. power failure, network failure etc.) or due to a software failure of the root control code, hypervisor etc., the DC control block 566 assumes that all child VMs running on that server have failed. In response, it uses the stored configuration information to re-create those VMs (as above) on one or more functioning servers of the data center having sufficient available physical resources, and controls the DC traffic management system 588 to direct traffic to the re-created VMs accordingly.

The distributed platform 800 (comprising multiple such datacenters 320a, 320b, 320c etc.) can thus be adapted to run multiple service logics, each service logic being implemented by one or more guest virtual machines 510 executing respective application code 534. These virtual machines may be distributed throughout a single datacenter 320 and/or across multiple datacenters with inter-datacenter traffic being communicated via network 301 (e.g. the Internet).

0.4 Hierarchical Structure of Service Logics

In the embodiments described below, control service logics (alternatively referred to as "controllers" throughout)—implemented by application code executed on virtual machines running on a distributed platform—are configured to deliver respective services to support (that is, manage at least an aspect of) a real-time media communication event. Code modules configured to implement a service logic are instantiated on virtual machines 510 in the manner described above. Different types of service logic are configured to deliver different control services (different services being e.g. call control, audio control, video control, transport control, pipe control), whilst service logics of the same type are configured to deliver the same service (e.g. one of call control, audio control, video control, transport control, pipe control).

One of each type of service will typically control a corresponding aspect of a real-time media communication event at any given time during that event. Upon creation of the communication event, a service logic of each type is selected from a plurality of possible service logics of that type to support that communication event (e.g. call). This selection is made within the traffic management system 330 in response to a request for that type of service, either from a client-side service agent (612, FIG. 4) that type or from another service logic of another type.

Service logics of the same type are each capable of delivering the same service and are interchangeably selectable in response to such a request for that type of service (whilst service logics of different types are not interchangeably selectable). For instance, each service logic of a first type may be responsive to any request message from a first set of possible request messages transmitted thereto, and each service logic of a second type may be responsive to any request message from a second set of possible request messages transmitted thereto, the first and second sets being disjoint or partially. Each of these service logics then controls (i.e. provides a control service for) that call for the duration of that call or until failure of that service logic (discussed below).

The communication system 300 is responsive to instructions in the form of request messages (e.g. REST calls) initiated by an initiator to a service logic (e.g. by an agent of the same type or by a service logic of a different type) and transmitted via the network 301. Specifically, the communication system 300 is responsive to assign an instance (on a VM 510) of that service logic (instantiated as described above) to perform operations in relation to a particular communication event in accordance with that instruction (i.e. to process that instruction). In this embodiment, assignments are made by load balancers associated with a particular service logic as explained in more detail below.

The assigned instance may be released from that assignment responsive to that instance returning a response to the received instruction (the response being returned to the initiator). Such an instruction (request)/response exchange is referred to as a transaction. Here "released" means that all physical resources (processing resources, memory resources) allocated to the assigned instance to enable it to complete that transaction are unallocated therefrom (e.g. becoming available for other such transactions). In this embodiment, those physical resources are physical resources of the virtual machine on which the VM is running. An instance, once so released, is no longer required to maintain any information about that transaction in memory resources individually allocated to the VM on which it is running (although information about that transaction may be stored elsewhere, as explained below) such that the transaction is 'forgotten' by that VM once so released. The instance may be configured to be so released (i.e. the release being built into the application code), or the instance may be 'forcibly' released (e.g. re-assigned or decommissioned) by release logic of the communication system.

An instance of that service logic is instance is independently assigned for each such instruction (e.g. for a plurality of instances of a particular service logic, in a round-robin fashion or based on available resources for each instance), and the communication system 300 is responsive to a further such instruction to independently assign the or another instance of that service logic to process that further instruction (with that service logic instance being released from that assignment responsive to that service logic instance returning a response to the further instruction).

In this embodiment, each of the virtual machines 510 has access to at most one of the call controller code modules, the media modality controller code modules (either audio or video, not both), the transport controller code modules and the pipe controller code modules such that only one of the call controller, the media modality controller (either audio or video, not both), the transport controller or the pipe controller runs on that virtual machine. As discussed, each of said processing units is configured to execute a hypervisor, virtual machines of that processing unit running on top of that hypervisor.

Figure 6A:
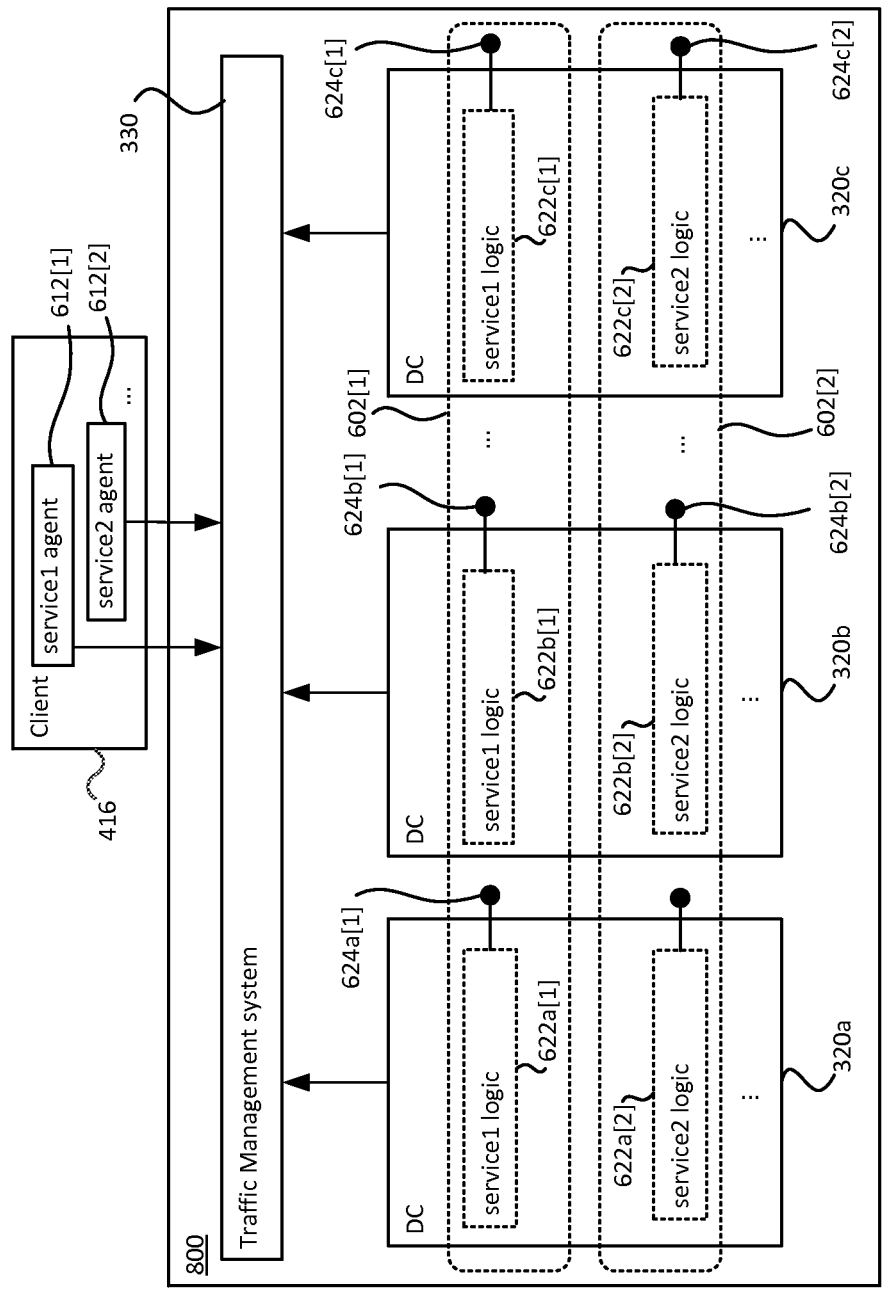
FIGS. 6A and 6B schematically illustrate principles of a hierarchical communication system architecture.

Each service logic has a hierarchical structure which will now be described with reference to FIGS. 6A and 6B. As shown in FIG. 6A, the distributed platform 800 is adapted to run at least a first group 602[1] of first service logics 622[1] of a first type (that is, capable of delivering a first service) and a group 602[2] of second service logics 622[2] of a second type (that is, capable of delivering a second service). Service logics of the same type operate independently in that successful delivery of a service by one does require any of the other service logics of that same type to be operating correctly. While there is inter-dependence, there is also autonomy within the decoupled/separate services for some level of functioning—e.g. once the initial call is set up, and modality is being delivered, there are elements which are entirely within the control and scope of the modality service that can be performed without other services needing to be involved at all.

The client 416 of user device 304 comprises service agents 612[1] (first type), 612[2] (second type) for each type of service. Service agent 612[1] can communicate directly with each of the first type of service logics 622[1] and service agent 612[2] can communicate directly with each of the second type of service logics 622[2]; service logics of a particular type only communicate directly with service agents of that same type and do not communicate directly with service agents of other types. Service logics of different types can, however, communicate directly with one another. Each service agent 612 and each service logic 622 can communicate with the traffic management system 130. Inter-service logic communication and communication between service logics and their respective agents is, to some extent, mediated by the traffic management system 330. This is discussed in more detail below.

Figure 6B:
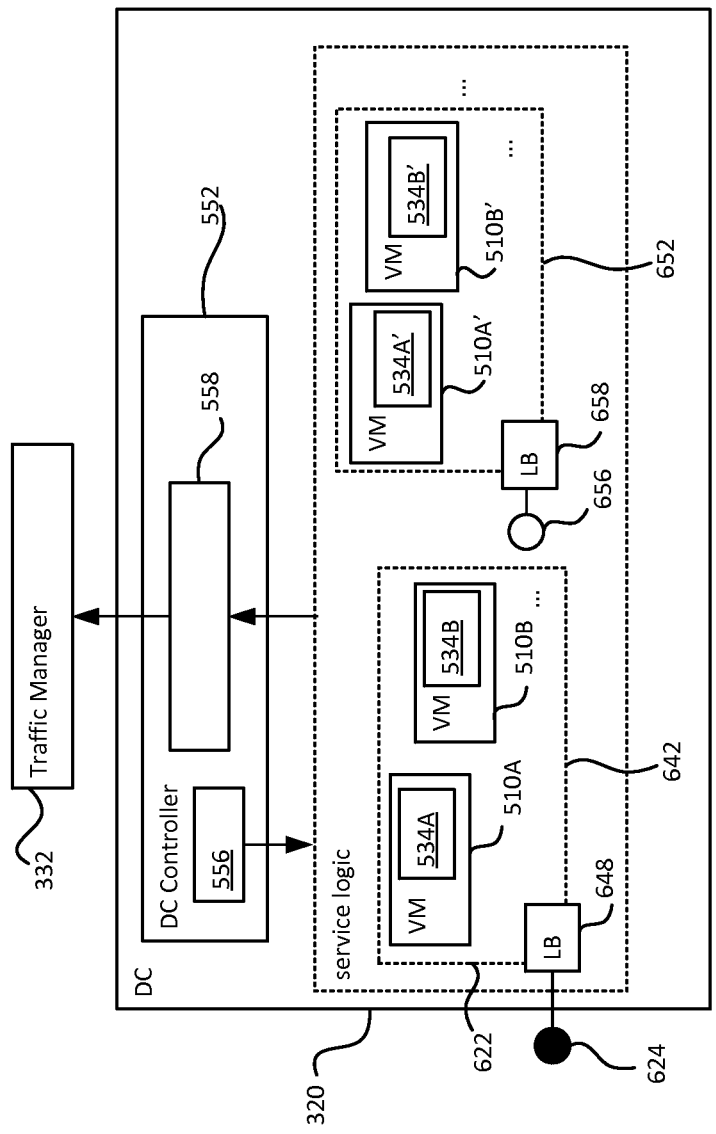

As illustrated in FIG. 6B, a service logic for delivering a particular service comprises one or more inter-dependent components 642, 652 which work in tandem to deliver that service. Generally, failure of a single component (e.g. one of 642, 652) of a service logic causes failure of that service logic. In this embodiment, each service logic is implemented at a single respective datacenter (e.g. one of 320a, 320b, 320c) and each service logic of any given type is implemented at a different data center (i.e. such that no two service logics of the same type—e.g. video service logics— are implemented at the same data center). In alternative embodiments, components of service logics may be spread across multiple data centers and/or multiple service logics of the same type may run at the same data center. Further, in FIG. 6A, each data center implements one of each type of service logic but this is not essential and some data centers may implements some types of service logic but not others (e.g. only audio control service logic but not video control service logic).

Each component of a service logic comprises a load balancer 648, 658 and one or more guest virtual machines 510 executing a respective instance of application code 535, with the load balancers being configured to assign instances responsive to received instructions (request messages) as described above with reference to FIG. 5B. The application code is responsive to request messages received at that VM e.g. 'external' requests received from user devices e.g. 304a, 304b and other service logics at different data centers etc. or 'internal' requests received from other components of that service logic. Each VM of a particular component runs at the same datacenter, and the load balancer of that component forms part of the data center traffic management system 588 of that data center. The VMs within a particular component have are configured to have the same properties based on the same configuration information and each executes one or more respective instances of the same application code (which provides redundancy should one or some of those VMs fail). The load balancer of a component is operable to receive requests and direct those requests to any one of the VMs of that component e.g. in a round-robin fashion or based on monitored resource availability of those VMs (e.g. directing an incoming request to the VM with maximal available resources). The load balancer of a component assumes that each VM of that component is equivalently configured to be able to process any request received by that load balancer.

Examples of a components include web and worker roles implemented on a Windows Azure™ platform.

FIG. 6B shows a service logic 642 comprising at least two components 642 and 652 having respective load balancers 648, 658. Component 642 comprises at least two VMs 510A, 510B configured to have identical properties based on the same configuration information. VM 510A executes an instance 534A of application code and VM 510B executes an instance 534B of the same (or at least duplicate) application code. Similarly, component 652 comprises at least two VMs 510A', 510B' configured to have like properties based on the same configuration information. VM 510A' executes an instance 534A' of application code and VM 510B' executes an instance 534B' of the same (or at least duplicate) application code.

A component can be implemented as a stateless component containing stateless VMs. This is down to how the component and service is designed and written. A stateless VM is a VM running an application code instance which is operable to service any request it receives without relying on any information that has been stored at that VM (i.e. in the physical memory resources individually allocated to that VM) during processing of previous requests. That is, a stateless VM treats each request as an independent transaction and does not keep track of previous transactions it has performed in its individually allocated memory resources (although it may retrieve, and possibly modify, information stored elsewhere, e.g. a call state of a particular call, as defined by that request, e.g. which identifies that particular call).

Any request to a stateless component can thus be directed to the load balancer of that component (as it does not matter which stateless VM within that component actually services the request). This provides redundancy as, if one VM in a component (or the application code thereof) fails, other VMs in that component can seamlessly take over whilst the failure is corrected.

Stateless VMs can nonetheless be configured to access physical memory resources (e.g. an area of physical memory) of the distributed platform which are allocated by the platform to that component as a whole rather than to specific, individual VMs therein (e.g. in-memory storage, such as a cache layer, realized at the physical level by volatile memory) of the distributed platform 800 on which they are running, with each VM in that component being configured to access that same area of memory. At part of servicing a request, a VM may read from and write to this memory, and the contents of this memory may affect how that request is serviced. However, the VM is still stateless in that it is not relying on its own individual memory resources but rather is relying on memory resources which are accessible by all VMs of that component.

The code modules of the communication system may be configured to implement data access software whereby the computer storage is accessible to service logic (controller) instances via instances of the data access software.

A controller instance on one virtual machine may access computer storage via a data access software instance on another virtual machine. A component of a service logic may be configured as a dedicated in-memory access component, VMs of that component being configured to access such shared memory resources (and which, as discussed, may themselves be stateless) and executing application code which is operable to only service read/write requests from other components of that service logic (i.e. such that they only handle memory access on behalf of other components of that service logic). One example is a dedicated cache worker role on an Azure™ platform.

Alternatively or additionally a controller instance on a virtual machine accesses computer storage via a data access software instance on that same virtual machine. VMs of a component may be configured to access such a shared memory resources and also execute application code, with the shared memory resources (e.g. in-memory cache) not deployed to dedicated components but deployed onto other components in a distributed fashion. One example is in-role caching on an Azure™ platform.

Alternatively, components can be implemented as stateful, VMs of that component being configured as stateful VMs which do rely on information about past transactions stored using their own respective individual memory resources for successful servicing of future requests. Such requests are directed to that VM specifically, bypassing that component's load balancer (as other VMs of that component would be unable to service those requests). Stateful components may be used for servicing time-critical requests (as generally it is quicker for a VM to access its own individual memory resources than the shared, component-wide memory resources). However, in contrast to stateless components, failure of a VM within a stateful component may result in that component being unable to service subsequent requests which would have been serviced by the failed VM.

Components of a service logic can be configured to expose one or more externally-useable, addressable interfaces 624 (e.g. RESTful) and/or one or more internally-useable, addressable interfaces 652 (e.g. RESTful) which can be exploited (i.e. called) in order to establish a logical connection for exchanging data with that component. Internal interfaces 624 are only visible to (and exploitable by) other components of the same service logic, whereas external interfaces are visible to, and exploitable by, corresponding client-side service agents 612 and/or other service logics. An interface of a component is effectively coupled to the load balancer of that component in that any requests directed to that component using that interface are received by that load balancer for forwarding to a VM of that component (this forwarding being invisible outside of that component).

FIG. 6B shows component 642 exposing an external interface 624 (which is effectively coupled to the load balancer 648 of that component), and component 652 exposing an internal interface 656 (which is effectively coupled to the load balancer 658 of that component).

The DC control block 556 controls VMs and load balancers (which are part of the DC traffic management system 558) of a component in the manner discussed above with reference to FIGS. 5A and 5B. The resource reporting block 558 of the data center 320 is operable to receive resource utilization information from each service logic, and to communicate information about resource usage within that data center to the traffic manager 332 (this information being part of overall information reported by block 558 pertaining to use and availability of physical computer resources of the data center at which that service logic is running). The traffic manager 332 is operable to receive such information from multiple data centers (e.g. 320a, 320b, 320c).

Figure 7A:
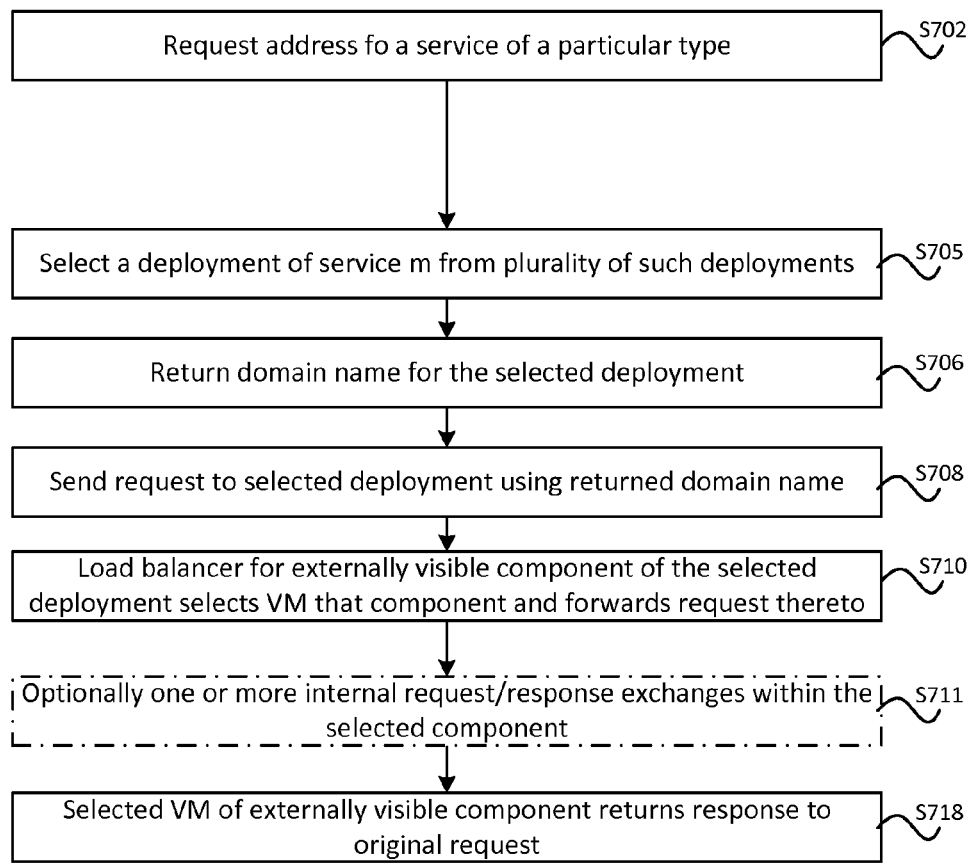
FIGS. 7A and 7B schematically illustrate methods of exchanging data within a communication system.
Figure 7B:
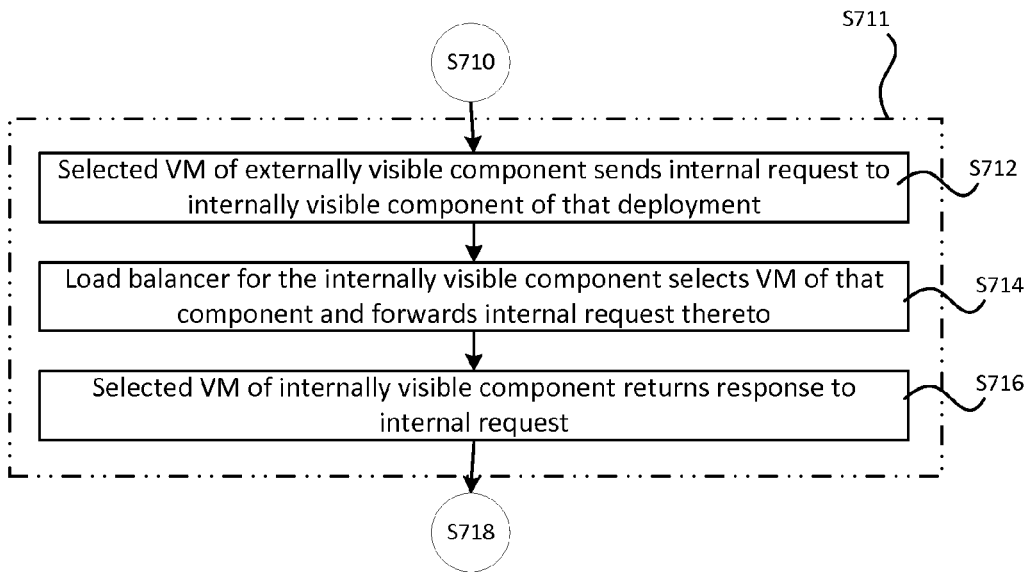
Figure 7C:
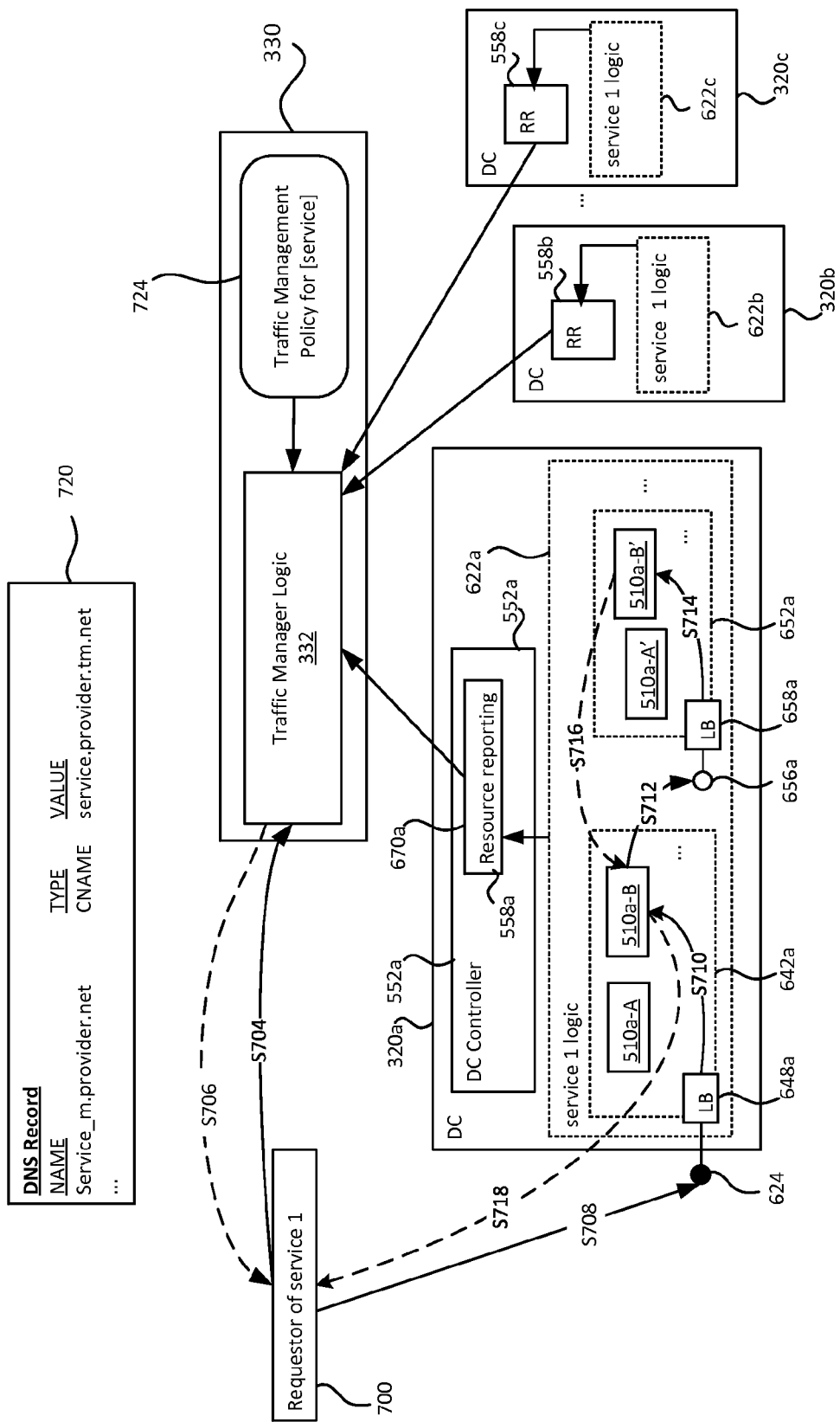
FIG. 7C is a schematic illustration of a data exchange within a communication system.

As discussed above, in response to respective requests for particular types of services (either from a client-side agent of that type—as service agents of one type only send requests to service logics of that same type and not to service logics of different types—or from a service logic of another, different type), corresponding service logics 622[1], 622[2] of those types out of respective possible groups 602[1], 602[2] are selected to deliver those respective services. This selection is made by the traffic manager 132 in response to such requests—this will now be described with reference to FIGS. 7A, 7B and 7C, which illustrate an exemplary process for requesting a particular type of service. FIGS. 7A and 7B are flow charts illustrating the process and FIG. 7C schematically illustrates an exemplary data exchange for that process.

At step S702, a requestor 700 of a particular type of service (e.g. a client-side agent of that service type or a service logic of another service type) sends a request (instruction) for an address of a service logic able to deliver that particular type of service to the traffic management system 330. For example, in embodiments, the traffic management system 330 is associated with a particular domain name (e.g. tm.net) and a sub-domain name for that type of service (e.g. service_m.provider.tm.net) is defined for each type of service (e.g. each type of service "m"). Each sub-domain is then associated with a corresponding sub-domain name (e.g. service_m.provider.net) of a domain name (e.g. provider.net) associated with a provider of that service e.g. an operator of the communication system 300. This association is effective using a canonical name (CNAME) DNS ("Domain Name System") record 720 enabling the provider sub-domain name (e.g. service_m.provider.net) to be used to obtain an address within the traffic management system to which a request for that type of service can be requested, that address being associated with a traffic management policy 724 for that type of service. CNAME records are known in the art.

The traffic management policy 722 for that type of service (e.g. "service 1", which could be e.g. a call control service, an audio control service, a video control service, a traffic control service, a pipe control service etc.) is stored in memory 334 of the traffic management system 330. This policy identifies a plurality of service logics (622a, 622b, 622c in FIG. 7C) able to deliver that type of service e.g. as specified by an operator of the communication system 300. The traffic manager 132 is operable to select one of those service logics 622a, 622b, 622c in dependence on the resource utilization information received from each of the data center resource reporting blocks 558a, 558b, 558c etc. Once selected, the traffic manager 132 returns a response to the requestor 750 (S706) comprising an address of that selected service deployment e.g. 622a in FIG. 7C. That address is an address of an external interface 624a exposed by a component 642a of that service logic 622a, which is coupled to a load balancer 648a of that component 622a. Responsive to receiving this response message, the requestor 750 transmits a request (S708) to that address which is received by the load balancer 648a. Here, the component 642a is a stateless component comprising multiple stateless virtual machines 510a-A, 510a-B able to service that request, and in response to receipt of that request the load balancer 648a then selects one of those virtual machines 510a-B of and forwards the request thereto. The VM 510a-B performs various operations in response. For instance, in this example, service logic 622a comprises another component 652a—itself comprising a load balancer 658a coupled to an exposed internal interface 656a—and a plurality of virtual machines 510a-A', 510a-B'. Said operations performed by VM 510a-B may include transmitting one or more internal requests to said internal interface 656a. In response thereto, load balancer 658a selects virtual machine 510a-B' of component 652a and forwards that request to that VM. That VM 510a-B' performs various operations in response thereto before returning a response to VM 510a-B upon completion thereof (S716). In response, VM 510a-B of component 642a performs additional operations including returning a response to the requestor 700's original request (S718). Alternatively, VM 510a-B may service the original request from requestor 750 without transmitting any further requests to other components of the service logic 622a.

1. Central Intelligence Cloud Call Setup, Control and Media Negotiation (CICCSCMN)

The above provides, by way of example, an overview of mechanisms by which service agents communicate with corresponding service logics of the same type and by which service logics communicate with other types of service logics to illustrate basic principles thereof.

An embodiment will now be described in which service agents and service logics employ (among other things) such mechanisms to support real-time media communication events (e.g. calls), thereby allowing users (e.g. 302a, 302b) to communicate with one another.

Figure 9:
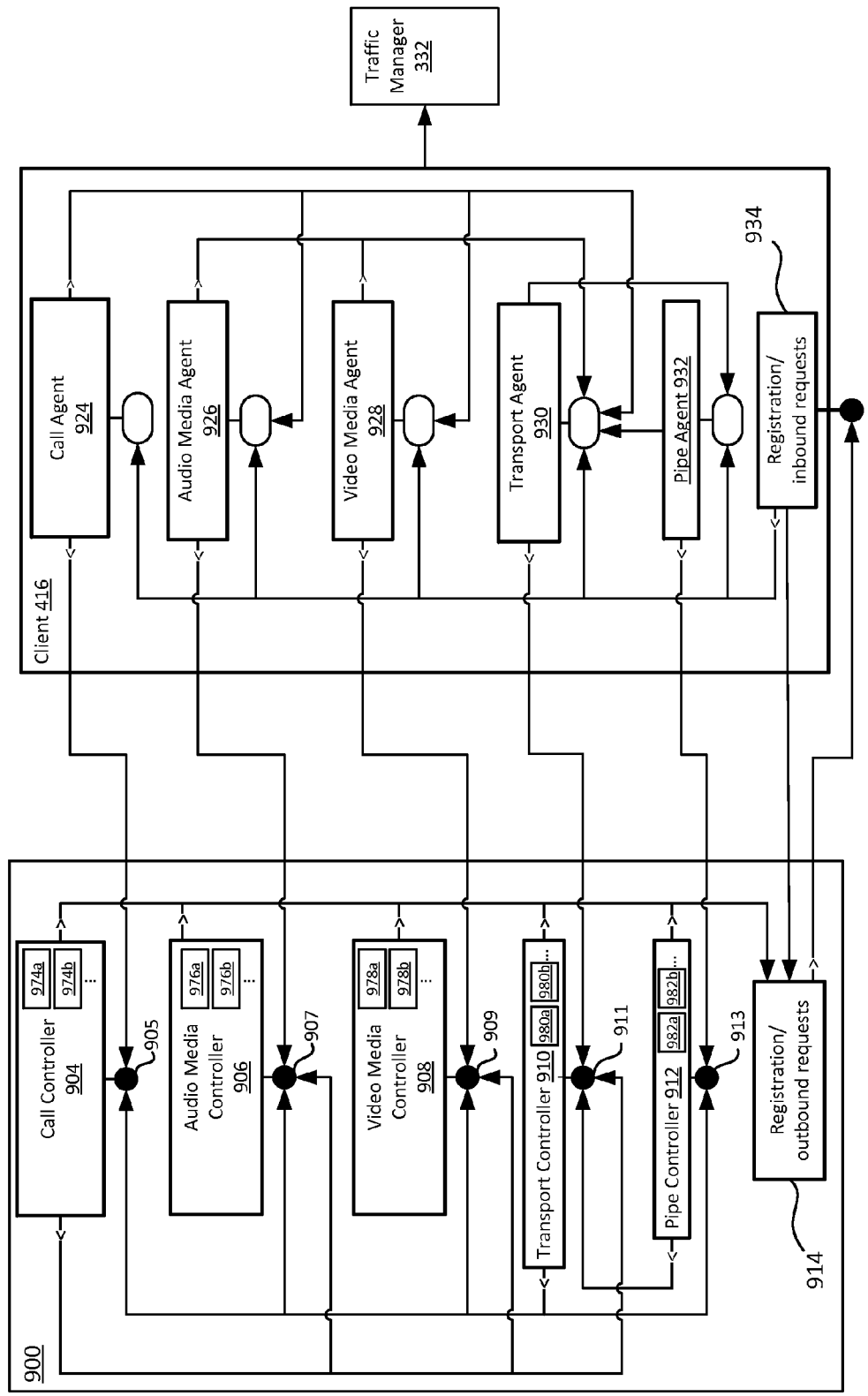
FIG. 9 is a schematic illustration of a particular communication system architecture, with FIGS. 9A, 9B and 9C schematically illustration additional details thereof.

In this embodiment, as shown in FIG. 9, the distributed platform is adapted to run pluralities of the following types of cloud control service logics (controllers), each being implemented by respective code executed on virtual machines of the distributed platform 800 in the manner described above: call control service logic 904 for delivering a call control service (call controller); audio media control service logic for delivering an audio media control service 906 (audio controller); video media control service logic 908 (video controller) for delivering a video media control service; transport control service logic 910 (transport controller) for delivering a transport control service; and pipe control service logic 912 (pipe controller) for delivering a pipe control service. The audio and video control services are respective examples of different media modality control service (audio being one type of media modality, video being another type of media modality). Each is configured to expose a respective external interface 905, 907, 909, 911, 913. The distributed platform is further adapted to implement registration and outbound request logic 914.

The call control service provides the highest-level of control for the call, with control services other than the call control services providing lower-level control functions to support that call (each functioning largely independently whilst ultimately, albeit sometimes indirectly, being controlled by the call controller as part of the call control service). These include one or more "modality services", a "modality" being a mode of communication conveyance—such as audio or video.

These cloud logics form part of a cloud call control system 900 for controlling calls, with other controllers of those same types (not shown in FIG. 9) also forming part of that system 900.

These various logics and the communication client 416 (running at e.g. user device 304a, 304b) form part of the communication system 300.

Controllers control their service and expose the interfaces for other services to call—as well as the interfaces to their respective agents.

1.1 Service Agents

The client 416 of user device 304 comprises a plurality of agents of different types (corresponding to each type of controller), namely a call control agent 924, audio media agent 926 (audio agent), video media agent 928 (video agent), transport agent 930 and pipe agent 332. The client 416 further comprises a registration and inbound request block 934, which is able to communicate with the registration and outbound request logic 914 via network 301 and which is operable to register an address of the client 416 (e.g. comprising an Internet Protocol (IP) address of user device 304 at which that client is executed) therewith. Any requests sent to that address are received by block 943 are forwarded to the intended agent recipient, thereby enabling the registration and outbound request logic to transmit request messages (received from one of the various service logics) to individual agents of the client. This enables each type of controller to establish a connection with the corresponding agent of that type for communicating corresponding control data (e.g. enabling the call controller to establish a connection to the call agent for communicating call control data, the audio controller to establish a connection to the audio agent for communicating audio control data, the video controller to establish a connection to the video agent for communicating video control data, the transport controller to establish a connection to the transport agent for communication transport control data, the pipe agent to establish a connection to the pipe agent for communicating pipe control data).

Service-to-endpoint messaging is by way of a service-to-endpoint message channel—of a push type—which means it does not require a client request to be able to deliver a service message (or response). If a service needs to send an endpoint a message or command, it does this 'at will' via the appropriate push channel.

More specifically, the client 416 has a log-in/registration facility which associates the user device 304 with a particular respective user (e.g. Alice, Bob). As part of the log-in procedure, the user's username is stored in association with an address of the device executing the client at which that user is logged in by the registration and outbound request logic 914 of the communication system 300. Users can have communication client instances running on other devices associated with the same log in/registration details. In the case where the same user, having a particular username, can be simultaneously logged in to multiple instances of the same client application on different devices, logic 914 is arranged to map the username (user ID) to all of those multiple instances but also to map a separate sub-identifier (sub-ID) to each particular individual instance. Thus the communication system 300 is capable of distinguishing between the different instances whilst still maintaining a consistent identity for the user within the communication system. Both Alice 302a and Bob 302b are logged-in at their respective user devices 304a, 304b of FIG. 3.

Agents (e.g. 924, 926, 928, 930, 932) of a common client (e.g. 416) can communicate data (including various types of control data as well as real-time media data of the call) with one another using APIs of those agents (discussed above).

Agents of a common client supply data to one another e.g. through utilization of a suitable API (e.g. C++ API). The call agent 924 is able to supply data to each of the audio agent 926, video agent 928 and transport agent 929. Both the audio agent 926 and the video agent 928 are able to supply data to the transport agent 930. The transport agent 930 is able to supply data to pipe agent 332. The pipe agent 322 is able to supply data to the transport agent 930. An agent to which such data is supplied may, for instance, perform operations and/or return further data to the supplier in response. This is generally seen as a mechanism for optimisation rather than the purest design pattern. In accordance with the purest design pattern, agent generated commands/requests would be sent to the agent's respective service (with optimizations using inter-agent interfaces instead).

All user inputs for controlling a call are communicated to the call are communicated to the call agent 924 for initial processing (which may in response cause other agents or the call controller to perform further processing in the manner discussed above). In addition to communicating call control data with the call controller supporting the call, the call agent receives control signals from, and outputs call information (such as information about current participants and their respective statuses), to the client user interface of client 416.

The agents help establish the appropriate "pipes" for the packets to be sent. The underlying media library (so voice engine, video engine—with codecs, etc.)—do the actual capture of media data (e.g. from the camera and microphone) and send the packets to the right sockets.

1.2 Cloud Controllers

The call controller provides higher-level control of a call and maintains information about the call in the form of a call state for that call. It interacts with corresponding call agents participating in the call. The call controller provides a context for real-time media flow of the call and ultimately oversees lower-level control by other service logics (e.g. audio control, video control, transport control, pipe control etc.) ensuring that they work correctly in tandem to support the call.

A local version of the call state is maintained by each endpoint of the call. In response to call-state updates from the call controller, a call agent of that endpoint updates the local version of the call state stored on that device accordingly. Call agents do not update the call state of their own volition (that is, the local version of the call state is updated only in response to updates from the call controller via the network and not, say, in direct response to an endpoint transmitting a request or receiving a response to such a request), and the local versions of the call state are not authoritative; only the call state stored in the cloud is authoritative (this being a 'master' call state for the corresponding communication event).

The call controller 904 delivers a call control service to the corresponding call control agent 924 (and to any other agents of that type participating in the call). The audio controller 906 delivers an audio control service to the corresponding audio agent 926 (and to any other agents of that type participating in the call). The video controller 908 delivers a video control service to the corresponding video agent 928 (and to any other agents of that type participating in the call). The transport controller delivers a corresponding transport control service to the corresponding transport agent 930 (and to any other agents of that type participating in the call). The pipe control agent delivers a pipe control service to the corresponding pipe agent 332 (and to any other agents of that type participating in the call).

Each controller (control service logic) is one of a plurality of such controllers (control service logics) running on the could platform 800 (each of that pluralist running at a different data centers in this embodiment which may have different geo-locations) e.g. the call controller is one of a plurality of call controllers (each of those call controllers running at a different data center from the others), the audio controller is one of a plurality of audio controllers (each of those audio controllers running at a different data center from the others), the video controller is one of a plurality of video controllers (each of those video controllers running at a different data center from the others), the transport controller is one of a plurality of transport controllers (each of those transport controllers running at a different data center from the others), and the pipe controller is one of a plurality of pipe controllers (each of those pipe controllers running at a different data center from the others)

The audio and video controller provides respective control over audio and video aspect of the call, and control (among others) audio (resp. video) codec selection, audio (resp. video) specific variable management, endpoint audio (resp.) control though interaction with corresponding audio (rep. video) agents participating in the call. The audio and video controller are different media modality controllers.

The transport controller and pipe controller collectively control how media (e.g. audio/video) data of the call is conveyed between endpoints of the call. Among other things, they act in harmony to create a transport mechanism in the form of a "pipe" which can be used to convey real-time media data of the call between participants), with the transport controller overseeing higher-level aspects thereof (such as network topology) and the pipe controller implementing lower-level details, and ultimately creating the pipe, under the control of the transport agent.

Each of the call controller 904, audio controller 906, video controller 908, transport controller 910 and pipe controller 912 is one of a respective plurality of service logics of that same type (and able to deliver that same service) running on the distributed platform 800. Each agent 924, 926, 928, 930, 332 can request an address of a corresponding service logic (904, 906, 908, 910, and 912 respectively) from the traffic manager 332 in the manner discussed above and described in context below.

The call controller can establish connections for communicating control data with each of the audio controller 906, video controller 908 (media controllers) and transport controller 910 via their respective external interfaces 907, 909, 911. The transport controller can establish connections for communicating data with the call controller 904, the audio controller 906, video controller 908 and pipe controller 912 via their respective external interfaces 950, 907, 909, 913. The pipe controller 912 can establish connections for communicating data with the transport controller 911 via its external interface 911. In general, only the transport controller interacts with the pipe controller directly (other services may interact indirectly with the pipe controller via the call controller).

Controllers of one type (call, audio, video, transport, pipe) only access endpoint agents of that same type and do not access (i.e. do not establish connections to or receive instructions directly from) agents of different types.

The nature of the inter-service communications generally start with the call controller, and the call controller provides links to the other services and back to itself where necessary. However, this does not preclude other flows.

Each of the controllers 904, 906, 908, 910 and 912 can establish connections for communicating data with the registration and outbound request logic 914 by which they can communicate relevant control data to their respective corresponding agents as described below.

As discussed, the registration and outbound request logic 914 can establish connections for communicating data with the registration and inbound request block of the client 416 using the address registered by that block by which data received from each of the controllers 904, 906, 908, 910 and 912 can be forwarded to the intended agent (824, 926, 928, 930 and 332 respectively). The registration and inbound request block 934 is configured to receive those data from the registration and outbound request logic 914 of the distributed platform 800 and direct those data to the intended client-side agent (one of 924, 926, 928, 930, 332).

An agent of a particular type can establish an connection for communicating control data with a controller of that type via that controller's external interface (e.g. RESTful interface). For instance, the call agent 924 can establish connections for communicating data with the corresponding call controller 904 via its respective external interface 905. The audio agent 926 can establish connections for communicating data directly with the corresponding audio controller 906 via its respective external interface 907. The video agent 928 can establish connections for communicating data directly with the corresponding video controller 908 via its respective external interface 909). The transport agent 930 can establish connections for communicating data directly with the corresponding transport controller 910 via its respective external interface 911. The pipe agent 332 can establish connections for communicating data directly with the corresponding pipe controller 912 via its respective external interface 913.

Any such established connections may be used, for instance, to send request messages, with the receiver performing operations in response and retuning a response message via that connection upon completion thereof.

Each controller typically controls a respective aspect of multiple (and likely numerous) calls contemporaneously. In between any two given transactions (i.e. request-response exchange-based transactions) of a particular call, each controller may complete any number (zero or more) transactions of one or more other calls. For stateless VMs of stateless component participating in those transactions, any one of these VMs may operate to further completion of the two given transactions and the other transactions. In this sense, stateless VMs of a particular type of controller provide a pool of control resources for that controller; any free VM (i.e. any VM not currently performing processing to further a transaction) can be selected from that pool at any time to further a transaction of any given call and, upon completion thereof, can be returned to the pool for future such selection.

Each time a instruction (request message), e.g. REST call, directed to a particular controller (e.g. call, media modality e.g. audio, video etc., transport, pipe), is received via network 30, an instance of that controller is assigned to process that instruction (by a load balancer associated with that controller in this embodiment, as described above). Responsive to that controller instance returning a response to the instruction, that controller instance is released from that assignment such that any physical resources (processing resources, memory resources) allocated to enable completion of that assignment are unallocated (thereby becoming free for use in processing other such instructions).

FIG. 9 shows multiple instances 974a, 974b, . . . of the call controller; multiple instances 976a, 976b, . . . of the audio controller; multiple instances 978a, 978b, . . . of the video controller; multiple instances of the transport controller 980a, 980b, . . . ; and multiple instances o982a, 982b of the pipe controller. In this embodiment, each of said instances is an instance 534 of one or more application code module running on a virtual machine 510, having been instantiated thereon in the manner described above with reference to FIGS. 5A and 5B). In this embodiment, a virtual machine has at most one controller instance running thereon (therefore a selection of a virtual machine is equivalent to a selection of an instance running on that virtual machine). However, in other embodiments, a VM may run multiple instances.

A call controller and a call agent act in tandem to deliver a real-time media call service (a primary, higher-level service), functioning in conjunction to provide call-setup functionality, call-management functionality (i.e. adding/removing participants, responding to any user selections made via the client user interface, presenting selectable options via the client user interface to enhance the call experience e.g. by enabling additional functionality such as screen sharing or instant messaging), providing information that creates a context for an underlying flow of real-time media call data (such as call participants status). As discussed, control of this call service is effected by the call controller delivering a call control service to the call agent with user side-interactions being effected by the call agent under said control by the call controller. The call agent provides the interface between the calling service and the user.

Other modality services and their corresponding modality agents act in tandem to deliver a respective modality service (secondary, lower-level service). The modality controller delivers a modality control service which can, under the control of the call control (either direct control or indirect control i.e. with the modality service being directly controlled by another modality service under direct or indirect control of the call controller) be extended to a corresponding modality agent to support a call controller by the call controller (i.e. to support a call service delivered by that call controller and its corresponding call agent for that call). Once the modality control service is so-extended to the corresponding modality agent, that modality controller and that modality agent function in conjunction to deliver the modality service.

Media (audio and video) services are one example. An audio (resp. video) controller and an audio (resp. video) agent) act in tandem to deliver an audio (resp. video) service, functioning in conjunction to ensure that audio (resp. video) captured at the user device is optimally encoded that optimal audio (resp. video) variables being are selected for that encoding, with the audio (resp. video) agent supplying the encoded audio (resp. video) data to the transport agent for transmission to other call parties as part of that audio (resp. video) service.

Transport and pipe services are another example. A transport controller and a transport agent act in conjunction to deliver a transport service. A pipe controller and a pipe agent act in conjunction to deliver a pipe service.

The transport controller controls the topology of the endpoints of the call, making decisions based on all the endpoints in the call, and thus the most effective way to route media. One these decisions have been made, the transport controller instructs the pipe controller to establish the necessary physical socket connections between the relevant endpoints for the modalities as needed.

1.2.1 Call Controller

The call controller is configured to establish a communication event (and to manage the communication event once established). A communication event is said to be established at a point at which real-time media (e.g. audio/video) can flow between two or more endpoints. Establishing the communication event comprises, among other things, creating a call state for the communication event and instructing other controller appropriately responsive to which the other controllers communicate with their respective agents in order to establish media flow. Managing the communication event comprises, among other thing, maintaining an updating the call state during the communication event (e.g. by adding and/or removing call participants, handling mute/unmute audio requests in conjunction with the audio controller, handling video enable/disable requests in conjunction with the video controller; eventually terminating the communication event etc.).

In accordance with the present subject matter, an instance of the call controller is assigned to progress the establishment of the communication event responsive to an instruction received via the network and is configured to initiate an instruction to at least one of: the media modality controller; and at least one of the endpoints.

Typically, multiple assignments of call controller instances will occur during call establishment, each instance being assigned independently of the others to progress the establishment of the communication event. For instance, an instance of the call controller may be assigned to progress the establishment of a communication event responsive to an instruction received via the network, and the or another instance of the call controller may be independently assigned to further progress the establishment of the communication event responsive to a further instruction received via the network. For example, the initially assigned instance may progress the establishment of the communication event by creating a call state for the communication event, with subsequently assigned instances further progressing the establishment of the communication event by performing call establishment operations and updating the call state in response thereto accordingly.

The call controller is configured to access the computer storage of the communication system to access a call state for the communication event (to create a call state for the communication event e.g. as part of establishing the communication event or access an existing call state for the communication event). Specifically, in this embodiment, an assigned instance of the call controller is configured to access the call state, and the call state persists following a release of the call controller instance from said assignment so that another instance of the call controller can access the call state in that event (that is, so that the and/or another instance of the call controller can access the call state following said release). Media modality state data received from a media modality controller may be stored as part of the call state.

Further, typically multiple further assignments of call controller instances occur during the communication event to manage the communication event (e.g. an instance may be assigned responsive to a request to add a participant, the or another instance independently assigned responsive to a request to remove a participant etc.). Thus, an instance of the call controller may be assigned to progress the establishment of the communication event and the or another instance of the call controller may be independently assigned to manage at least part of the established communication event.

Figure 9A:
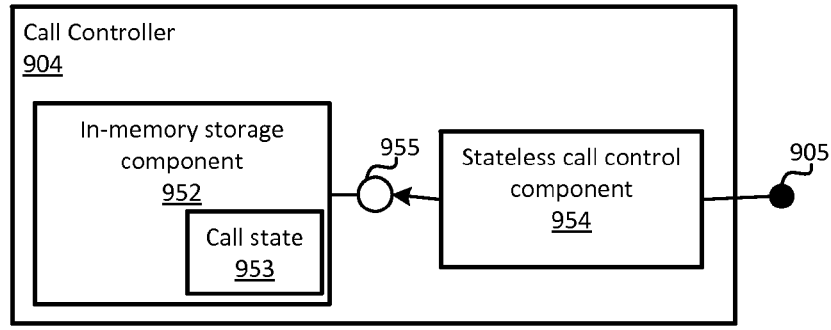

In this embodiment, the call controller is implemented by stateless code modules. As shown in FIG. 9A, the call controller service logic 904 comprises a stateless call control component 945 exposing the external interface 905 and an in-memory storage component 952 exposing an internal interface 955 and having an allocated set of shared physical memory resources. The stateless call control component 954 can establish connections for communicating data with the stateless in-memory storage component via the internal interface 955. The in-memory storage component 953 is operable to store a call state 953 for each call currently being supported by the call controller 904 in the shared physical memory resources which are shared between, and accessible to all, VMs of that component 952, the call state comprising a plurality of current parameters of that call. The stateless call control component 954 can read from and write to those physical memory sources by way of connections established via internal interface 955. Thus call control component 954 can retrieve and modify the call state 953 or at least parts thereof.

The call state for a call represents current information about that call such identifiers of participating endpoints (user devices) within the communication system 300 and their respective statuses (ready, connecting, ringing, in progress etc.), identifiers of other service logics currently supporting that call etc. Call states, and creation and maintenance thereof, are discussed below. It may also track the following (among other things): which modalities are active per participant/endpoint, what the modality state is (sending, mute etc.)—the permissions for each user around allowable call control (kick, add, mute others etc.).

Each of said components comprises a respective load balancer and respective multiple load-balanced, duplicate VMs running duplicate application code instances in the manner discussed above. Requests received at control component 954 via interface 905 are forwarded to any selected one of the plurality of stateless VMs therein by that component's load balancer, each request being treated as a separate, independent transaction. In response, the selected VM may, as part of processing the request, retrieve a copy of (at least part of) the call state 952 from the in-memory storage component 952 interface 955 by sending an internal read request via internal interface 955. This internal request is forwarded to any selected one of the VMs of the in-memory storage component 952 by that components load balancer which, in response, retrieves the copy of the call state 953 from shared physical memory of the in-memory storage component 952 and returns that copy to the call control component 954. The call control component maintains this copy temporarily and, if applicable, modifies that maintained copy accordingly and sends that modified copy to in-memory storage component 952 for storage therein as part of an additional internal write request. Again, this additional internal write request is forwarded to any selected one of the VMs of the in-memory storage component 952 by that components load balancer (which may be different than the VM selected to initially retrieve the copy of the call state) which, in response, over-writes the call state 953 in the shared physical memory resources of the in-memory component 952 to effect the received modification.

As discussed further below, the call controller is, in embodiments, responsive to each of one or more instructions; responsive to each of the one or more instructions a respective instance of the call controller is independently assigned to progress the establishment of the communication event in accordance with that instruction, that assigned call controller instance being configured to so progress the establishment of the communication event. The establishment of the communication event may, for instance, be progressed in accordance with an instruction at least by updating the existing call state.

The one or more instructions may comprise a first instruction, the establishment of the communication event being progressed in accordance with the first instruction at least by creating the call state for the communication event. Alternatively or additionally, the one or more instructions may comprise:

a second instruction, the establishment of the communication event being progressed in accordance with the second instruction at least by selecting one or more endpoints based on a received user identifier; and/or a third instruction, the establishment of the communication event being progressed in accordance with the third instruction at least by selecting one or more other endpoints based on another received user identifier; and/or a fourth instruction, the establishment of the communication event being progressed in accordance with the fourth instruction at least by initiating an invite instruction to at least one of said endpoints; and/or a fifth instruction, the establishment of the communication event being progressed in accordance with the fifth instruction at least by initiating a ringing instruction to at least one of said endpoints; and/or a sixth instruction, the establishment of the communication event being progressed in accordance with the sixth instruction at least by attaching one or more identified users to the communication event; and/or a seventh instruction, the establishment of the communication event being progressed in accordance with the seventh instruction at least by adding one or more identified users to the communication event as participants therein; and/or an eighth instruction, the establishment of the communication event being progressed in accordance with the eighth instruction at least by transmitting a ready instruction to one or more of said endpoints.

An aspect of the present subject matter is directed to a method of managing a communication event between a plurality of endpoints connected via a communication network of a communication system comprising a plurality of processing units other than said endpoints, each having access to computer storage holding executable code modules for managing the communication event, the code modules being configured to implement a media modality controller configured to manage media modality of an established communication event and a call controller configured to establish the communication event, the method comprising: receiving an instruction via the network; in response to receiving the instruction, assigning an instance of the call controller to progress the establishment of the communication event; and the call controller instance initiating an instruction to at least one of: the media modality controller; and at least one of the endpoints.

In embodiments, the method may further comprise: receiving another instruction via the network; in response to receiving the other instruction, independently assigning the or another instance of the call controller to further progress the establishment of the communication event, that instance initiating another instruction to at least one of: the media modality controller; and at least one of the endpoints.

In embodiment, the method may further comprising: the call controller instance selecting one or more endpoints based on a received user identifier and initiating a first instruction to the selected endpoints; and independently assigning the or another call controller instance to initiate a second instruction to the media modality controller comprising an identifier of one of the selected endpoints.

1.2.2 Transport Controller

The code modules of the communication system 300 are configured to implement a transport controller configured to manage transport of media of the communication event between endpoints of the communication event. An instance of the transport controller is assigned to convey transport control signals of the communication event to respective transport agents of the endpoints without accessing the call agents of the endpoints, the transport controller instance being so assigned independently of the call controller and responsive to a first instruction received via the network. The transport controller instance is released from said assignment responsive to the transport controller instance returning a response to the first instruction while the call controller continues to operate in communication with the call agents of the endpoints and/or with the media modality controller(s) (the instance either being configured to be so released from that assignment or the communication system comprising release logic to so release that instance). The first instruction may be initiated by the call controller.

Figure 9B:
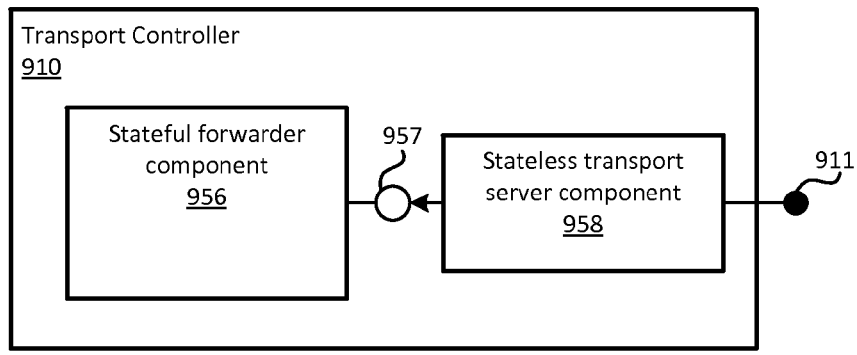

As shown in FIG. 9B, the transport controller 906 comprises a stateless transport server component 958 comprising a load balancer and multiple stateless VMs and a stateful forwarder component comprising a load balancer and multiple stateful VMs, stateful in the sense that each stores information about past transactions even after those transactions have been completed using their individually assigned physical memory resources, and relies upon that information for successful completion of future transactions—this information is only accessible via that specific VM (and becomes inaccessible and thus effectively lost should that particular VM fail, making the forwarder component unable to process certain future requests as processing of these is reliant on that lost information). The stateless transport server exposes the external interface 907 coupled to that component's load balancer. The stateful forwarder component 956 exposes an internal interface 957 coupled to that component's load balancer. The transport server component 958 can establish connections for communicating data with the forwarder via the internal interface 955. The stateless transport control component can also establish connections to specific, individual VMs of the forwarder component; as explained below (section 1.4), certain situations may necessitate bypassing of the stateful forwarder component's load balancer in this way i.e. certain internal requests directed to the forwarder component may be sent from the transport component to a specific, identified VM of the forwarder component.

1.2.3 Pipe Controller

The code modules of the communication system 300 are configured to implement a pipe controller configured to create a pipe between two of said endpoints for said transportation of media under control of the transport controller. An instance of the pipe controller is assigned to create said pipe independently of the transport controller and responsive to a second instruction received via the network. The transport controller continues to operate in communication with transport agents of the endpoints and/or the media modality controller(s) and/or the call controller following a release of the pipe controller instance from said assignment. The second instruction is initiated by the transport controller (and not by the call controller, the call controller being configured not to initiate instructions to the pipe controller). Responsive to creation of a pipe by the pipe controller the transport controller is configured to supply one or more parameters of the created pipe to the media controller.

In this embodiment, the pipe controller is configured to create a plurality of pipes for different respective media modalities, each of said pipes being via the or another network (e.g. the pipe controller may communicate with the pipe agent via the Internet, but the pipe may be via another network such as a Local Area Network, or via the PSTN). Specifically, the pipe controller is configured to create separate audio and video pipes for transportation of audio and video data respectively.

Figure 9C:
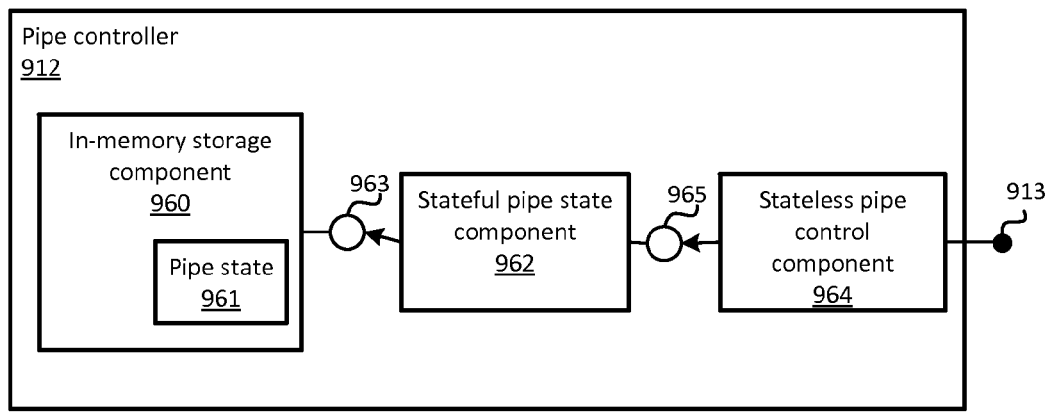

As shown in FIG. 9C, the pipe controller 908 comprises a stateless transport control component 964, a stateful pipe state component 962, and an in-memory storage component 960 operable to store a pipe state 961 in that components shared physical memory resources. The pipe control component exposes an external interface 909, and the pipe state component 962 and the in-memory storage component 960 each expose respective internal interfaces 965, 963. The stateless pipe control component 954 can establish connections for communicating data with the stateful pipe state component 962 via the internal interface 965. The stateful pipe state component 962 can establish connections for communicating data with the in-memory storage component via the internal interface 963. Stateful behaviour of the pipe controller is discussed below (section 1.4).

1.2.4 Media Modality Controller(s) (e.g. Audio Controller, Video Controller)

In accordance with the present subject matter, an instance of the media modality controller (as implemented by the aforementioned code modules accessible to processing units of the communication system 300) is assigned to convey media modality control signals of a communication event between a plurality of endpoints (effected by the communication system 300) to respective media modality agents of the endpoints without accessing respective call agents of the endpoints, the media modality controller instance being so assigned independently of the call controller and responsive to an instruction received via the network. The media modality controller instance is released from said assignment responsive to the media modality controller instance returning a response to the received instruction while the call controller continues to operate in communication with the call agents of the endpoints. In this embodiment, said return of the response by the media modality controller instance is responsive to completion of a negotiation of media modality parameters with the media agents of the endpoints. In embodiments, the received instruction comprises respective identifies of each of the endpoints, the media modality control signals being conveyed using the received identifiers.

The media modality controller instance may continue to operate in communication with media agents of the endpoints while a call controller instance assigned to progress the establishment of the communication event is released from that assignment and/or is deactivated (e.g. being decommissioned or failing) and another call controller instance is assigned to progress the establishment of the communication event.

The received instruction may be initiated by the call controller (or other controller e.g. transport controller), the response being returned to the call controller (or other controller e.g. transport controller). For example, an instance of the call controller may initiate the instruction to the media controller and that instance of the call controller may continue to operate in communication with the call agents of the endpoints following a release of the instance of the media controller. In this embodiment, the media controller does not initiate instructions to the call controller.

The media modality controller is further configured to be responsive to a further instruction received via the network, with the or another instance of the media modality controller being independently assigned to process the further instruction.

Among other things, the media modality (e.g. audio resp. video) controller is configured to select a media (e.g. audio resp. video) codec and/or media (e.g. audio resp. video) variables and to control the media (e.g. audio resp. video) agents of the endpoints to process media (e.g. audio resp. video) data of the communication event based on said selection.

In this embodiment, the code modules of the communication system are configured to implement at least first and second media modality controllers configured to manage respective first and second media modalities of the established communication event. An instance of the first media modality controller is assigned to convey first media modality control signals of the communication event to respective first media modality agents of the endpoints without accessing respective second media agents of the endpoints, the instance of the first media modality controller instance being so assigned independently of the second media modality controller and responsive to an instruction received via the network. The instance of the first media modality controller is configured to be released from said assignment responsive that instance returning a response to the received instruction while the second media modality controller continues to operate in communication the second media agents. One of said media modality controllers is an audio controller for managing audio of an established communication event and the other of said media modality controllers is a video controller for managing video of an established communication event. The audio controller operates to convey audio control signals to audio agents of the endpoints but not to video agents of the endpoints, and the video controller operates to convey video control signals to the video agents of the endpoints but not to the audio agents of the endpoints.

Each media modality controller also comprises an in-memory storage component (similar to the call controller) operable to store a media modality state (e.g. audio state, video state) e.g. comprising respective identifiers of one or more endpoints between which a communication event is conducted. The media modality state data may comprise an indication of whether or not that media modality is enabled for at least one of said endpoints (where the media modality controller is an audio controller, the indication being an indication of whether or not audio is muted for the at least one endpoint; where the media modality controller is a video controller, the indication being an indication of whether or not video is enabled for that endpoint.)

In embodiments, an assigned media modality controller instance may be configured to access the computer storage of the communication system to access the media modality state for the established communication event. In embodiments, the media modality state may persist following a release of the media modality controller from said assignment so that another instance of the media modality controller can access the media modality state in that event. For instance, a media modality controller instance may generate media modality state data. The media modality state data may be stored as part of the media modality state. Accessing the media modality state may comprise updating the media modality state. The media modality controller instance may be configured to convey media modality control signals based on the media modality state.

Alternatively or additionally, a response to an instruction returned by the media modality controller instance may comprises the media modality state data. The response may be returned to an initiator of the instruction responsive to which the initiator may store the received media modality state data. The received instruction may be initiated by the call controller (or transport controller), the response being returned to the call controller (or transport controller).

The media modality controller operates in conjunction with the transport controller and the pipe controller to communicate pipe details to endpoints: the media controller is configured to receive one or more pipe parameters from the transport controller and to communicate at least one of the received pipe parameters to media agents of the endpoints.

The media modality controller is configured to transmit an initiation control signal (e.g. at the start of the communication event or during the established communication event) to a media agent of one of the endpoints responsive to which that media agent initiates transmission of media data to another of the endpoints. The media modality controller is further configured to transmit a cessation control signal to that media agent responsive to which that media agent ceases said transmission of media data.

In this embodiments, the call controller is implemented by stateless code modules in a manner similar to the call controller.

In further accordance with the present subject matter, there is disclosed method of managing a communication event between endpoints connected via a communication network of a communication system comprising a plurality of processing units, each having access to computer storage holding executable code modules for managing the communication event, the code modules being configured to implement a media modality controller configured to manage media modality of an established communication event and a call controller configured to establish the communication event, the method comprising: assigning an instance of the media modality controller to convey media modality control signals of the communication event to respective media agents of the endpoints without accessing respective call agents of the endpoints; releasing the media modality controller instance from said assignment; and assigning an instance of the call controller to progress the establishment of the communication event, the call controller instance operating in communication with the call agents of the endpoints following said release of the media modality controller instance. In embodiments, the call controller instance may be so assigned prior to or following said release of the media modality controller.

A media modality controller instance may be configured responsive to an instruction received via the network to access the computer storage of the communication system to: create a media modality state for the communication event, and/or access an existing media modality state for the communication event to update the existing media modality state. The created media modality state and/or the updated media modality state persist following said release of the medial modality controller instance so that the or another media modality controller instance subsequently assigned to convey further media modality control signals of the communication event can access the created and/or updated media modality state in that event.

1.2.5 Traffic Manager

The traffic manager 332 is configured to select a controller of a particular type from a plurality controllers of that type responsive to a request for a controller of that type from a requestor (initiator)—e.g. service logic of a different type; agent of the same type—configured to request a media modality controller address form the traffic management logic. In response, the traffic manager returns an address of the selected media modality controller, the initiator being configured to initiate an instruction to the media modality controller using the returned address.

For call controller requests, the requestor may one of the endpoints of the communication event or a network entity other than said endpoints e.g. another controller, or a conference management system configured to initiate establishment of a scheduled communication event at a pre-determined time. For media modality controller requests, the requestor may be the call controller (or possibly the transport controller), or a user device which is not participating in the communication event but which causes the communication event to be established. For transport controller requests, the requestor may be the call controller. For pipe controller requests, the requestor may be the transport controller.

1.3 Call Set-Up (Establishment) and Management

Methods of call set-up will now be described with reference to FIGS. 10A and 10B. In this case, the call is between two users Alice (302a FIG. 3) and Bob (302b FIG. 3) and, in accordance with the present subject matter, is controlled centrally by cloud service logics 904, 906, 908, 910, 912 as selected by traffic manager 332 from a respective plurality of service logics of those same types.

As will be appreciated, the method can be extended to enable calls to be conducted between more than two users.

Unless otherwise stated, in the below, all request messages (instructions) transmitted to a cloud control service logic (controller) are transmitted by way of a connection established (by a requestor which is one of an agent of that type participating in a call or a service logic of a different type supporting that call) via an external interface of a component of that service logic, that connection being a connection to a load balancer of that component rather than to an individual virtual machine of that component.

As described above, each received request message causes the communication system to independently assign an instance of the appropriate controller to process that instruction (which in this embodiments amounts to an assignment of the VM on is running as, in this embodiment, at most one controller instance runs on each VM). Each such request message is received by the load balancer of that component responsive to which the load balancer selects a virtual machine of that component from a possible plurality in accordance with a load balancing mechanism of that load balancer (e.g. a round-robin load balancing mechanism, VM resource-usage dependent load balancing mechanism) and forwards the message to the selected virtual machine for processing by the controller instance running thereon; each such request message (both messages sent by way of a same such connection or by way of different such connections) may be forwarded to a different virtual machine of that component—that is, there is no assumption (or guarantee) that any two such request messages will be forwarded to a same virtual machine. Responses to those messages (in the form of response messages) are returned via that same connection. Responsive to the VM retuning a repose to the instruction (that is the controller instance running on that VM), the VM (that is, the controller instance running on that VM) is released from said assignment, as described above.

Unless otherwise stated, in the below, operations performed by a service logic responsive to an instruction are performed by a first instance of that service logic, assigned as above and which is released from that assignment responsive to that instance retuning a response; operations performed by that service logic responsive to a further instruction are performed by the first or a second instance of that service logic, assigned independently from the afore mentioned assignment of the first instance, which is again released from that assignment responsive to that instance returning a response to the further instruction. The aforementioned operations performed by the first instance may or may not involve generating state data (e.g. a call controller instance generating call state data; a media modality controller instance generating media state data) which persists following release the first instance for use by the second instance.

Unless otherwise stated, in the below, all request messages (instructions) transmitted to a client-side agent of a particular type are transmitted by way of a connection to the registration and inbound request block 934, established (by a corresponding controller of that type) using information pertaining to that client stored by the registration and outbound request logic 914 of the cloud 800, and forwarded therefrom to the intended agent. When a service sends a service-to-endpoint message, the response is not along the same connection; rather, the endpoint/agent initiates a new message to the service in the form of a RESTful message.

To enable Alice to create a call, the client user interface of Alice's client 416*a* displays a selectable option, selectable by e.g. touching or swiping a touchscreen of device 304*a* and/by making a suitable gesture or voice command detectable by device 304*a*. In response to selection of this option, the call agent 924*a* of Alice's client 416*a* transmits (S1000*a*) a request to the traffic manager 332 for an address of a call control cloud logic. In response to receiving this request, traffic manager 332 selects a call control cloud logic out of a plurality of possible cloud control service logics based on a call control traffic management profile stored in memory 334 and based on respective current resource usage by those logics as reported by the respective data centers at which those logics are running (as described above), and returns (S1000*b*) an address of the selected call control service logic 904 to the call agent 924*a*. The selected call control service logic 904 handles that call for the duration thereof or until failure of that call control service logic 904 (discussed below).

Call agent 924*a* uses the returned address to establish a connection to the call control service logic 904 via interface 905 thereof by which client agent 924 transmits (S1002) a call creation message to call control service logic 904, comprising an endpoint identifier and/or a user identifier for Alice, requesting that a new call be created. The user identifier may, for instance, comprise a username of Alice which is unique to Alice within the communication system; the endpoint identifier may comprise an identifier of her user device 304*a* such as a Medium Access Control (MAC) address, these having previously been stored in association with an address of the client 416 by registration and outbound request logic 914 (see above).

This request is received by the call control component 954 of the call control service logic 904 which, in response, creates a call state 953 (51003*a*) comprising, among other things, the endpoint identifier for Alice. This involves establishing a connection to the in-memory storage component 952 via interface 955 by which the call control component 954 transmits a call-state creation message to in-memory storage component 952. Responsive to receipt thereof, the storage component 952 creates a call state 953 for that call—which is maintained by the storage component 952 for the duration of the call—and returns a response to the call control component 954 to inform the call control component 954 thereof. The call control component 954 then transmits (51003*b*) a message to the call agent 924*a* indicating successful creation of the call state 953 for that call and comprising at least part of the new call state, that part containing at least a call identifier of that call state which unique within the communication system 300 and which thus enables that call to be distinguished from other calls within the communication system 300.

The call creation message may optionally specify a future time at which the call-state 953 should be created, with the call controller 904 deferring creation thereof until that time. This enables call-creation to be specified in advance of the call.

At step S1004, the call agent 924*a* attaches to the call by transmitting a call attachment message, comprising the call identifier and the endpoint identifier for Alice, to the call controller 904. In response (S1005*a*), the call controller 904 modifies at least part of the call state 953 (as described above with reference to FIG. 9A) to indicate that Alice has attached to the call and transmits (S1005*b*) a message to Alice's call agent 924*a* comprising at least that modified part of the call state.

Attaching is to establish a connection and thus allow message exchanges (signalling), state changes, etc.—it does not mean 'answer' or 'join' (which is effected by way of a separate instruction), but it allows media paths to be established, capabilities to be determined, ringing to be started etc.

At step S1006, Alice's call agent 924*a* transmits join message, comprising the call identifier and the endpoint identifier, to the call controller 904 indicating that client 416*a* is ready to receive real-time media from other call participants. In response, the call controller 904 modifies (S1008) at least part the call state to indicate that Alice has joined the call and transmits (S1010) a message to Alice's call agent 924*a* comprising at least that modified part of the call state.

At step S1012, Alice's call agent 924*a* transmits an invitation message to the call controller 904 comprising an identifier (e.g. a user identifier comprising a username) of another user (Bob) and indicate that that user should be invited to join the call. In response, the call controller modifies (S1014) at least part of the call state to indicate that Bob is connecting to the call, transmits (S1016) a message to Alice's call agent 924*a* comprising at least that modified part of the call state, and transmits (S1018) a push notification to Bob's call agent 924*b* indicating that Bob has been so invited and comprising the identifier of the call. The push notification is transmitted first to the registration and outbound request logic 913 along with the identifier (e.g. username) of Bob responsive to which the registration and outbound request logic 914 transmits that notification Bob's user device 304*b* at which Bob is currently logged-in (or to multiple such user devices if Bob is logged on at more than one). The push notification (notification instruction) is transmitted via a push channel to which Bob's user device 304*b* is subscribed (push channels are known in the art), this subscription being registered by registration logic 913.

In embodiments, Bob may have multiple user devices (of which user device 304*b* is one) associated with the same user identifier (e.g. username) for instance if Bob is logged on at all those user devices. Each of those devices subscribes to a push channel and respective notifications are transmitted by way of those push channels by the call controller (and by other controllers—media, pipe, transport—as required).

Upon receiving Bob's user identifier, the call controller is operable to select one or more endpoints (including user device 304*b*) associated with that identifier (i.e. associated with a single user—Bob) and transmits the aforementioned notification to the selected endpoint(s). The notification to the endpoint 304*b* may therefore be one of a plurality of instructions transmitted endpoints, each being transmitted responsive to that same received instruction (form Alice).

In response to receiving the push notification, Bob's call agent attaches to the call by transmitting an attachment message, comprising an endpoint identifier for Bob, to the call controller 904; Bob's call agent 924*b* also outputs a "ringing" notification (e.g. an audible ringing sound) and displays a selectable "join" option to join the call via the user interface of client 416*b*. The endpoint identifier may, for instance, comprise an identifier of his user device 304*b* such as a Medium Access Control (MAC) address. In response to receiving this attachment message, the call controller 904 modifies (S1022) at least part the call state to indicate that Bob's client is currently in a "ringing" state and transmits (S1024, S1026) messages to both Alice's call agent 924*a* and to Bob's call agent respectively, those messages comprising at least that modified part of the call state.

At step S1028, in response to selection of the "join" option by Bob, Bob's call agent transmits a join message, comprising the call identifier and endpoint identifier for Bob, to the call controller 904. In response to receiving this join message, the call controller 904 modifies (S1030) at least part the call state to indicate that Bob's has joined the call and transmits (S1032, S1034) messages to both Alice's call agent 924*a* and to Bob's call agent respectively, those messages comprising at least that modified part of the call state. Also in response thereto, the call controller communicates with other service logics (S1036); in response, these other service logics negotiate with their corresponding service agents (and to some extent with each other) unto decide how real-time media is to be conveyed between endpoints and to create a mechanism for this conveyance in the form of a "pipe". A pipe is a logical connection between endpoint network library stacks—brokered/facilitated by the pipe controller and pipe agents on the relevant endpoints. This is described below with reference to FIG. 10B.

For each request directed to the call controller—i.e. S1002—create call instruction from Alice, S1004—attach instruction from Alice, S1006—join instruction from Alice, S1012—'invite Bob' instruction from Alice, S1020—attach instruction from Bob, S1028—join instruction from Bob)— an instance of the call controller is independently assigned (by the load balancer of stateless call control component 954) to process that request, and is released from that assignment upon completion of that processing—i.e. responsive to creating the call state; responsive to attaching Alice to the call; responsive to adding Alice to the call as a participant; responsive to inviting Bob; responsive to attaching Bob; and responsive to initiating of media flow between the endpoints at S1044 (which occurs after adding Bob as a participant, and completion of the various negotiations and pipe creation S1038).

In this embodiment, only endpoint identifiers identifying specific endpoints (As opposed to user identifiers which may be associated with multiple endpoints e.g. if a user is logged on at all of those endpoints simultaneously) are supplied to controllers other than the call controller. Thus, only the call controller is 'aware' of users; other controllers create sessions between specific devices as instructed and are 'unaware' of the fact that they are associated with particular users.

Figure 10A:
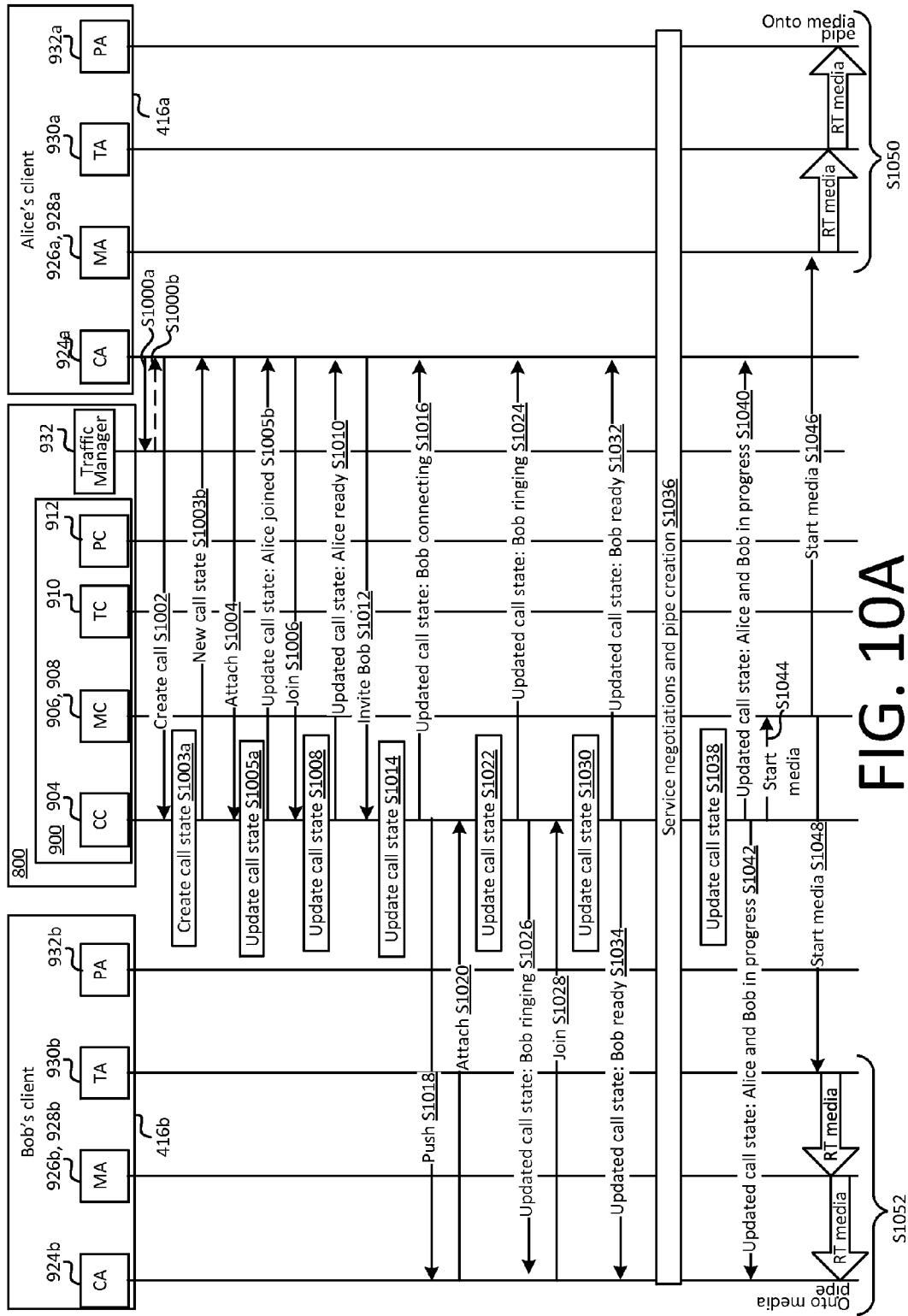
FIGS. 10A and 10B illustrate a call set-up procedure.
Figure 10B:
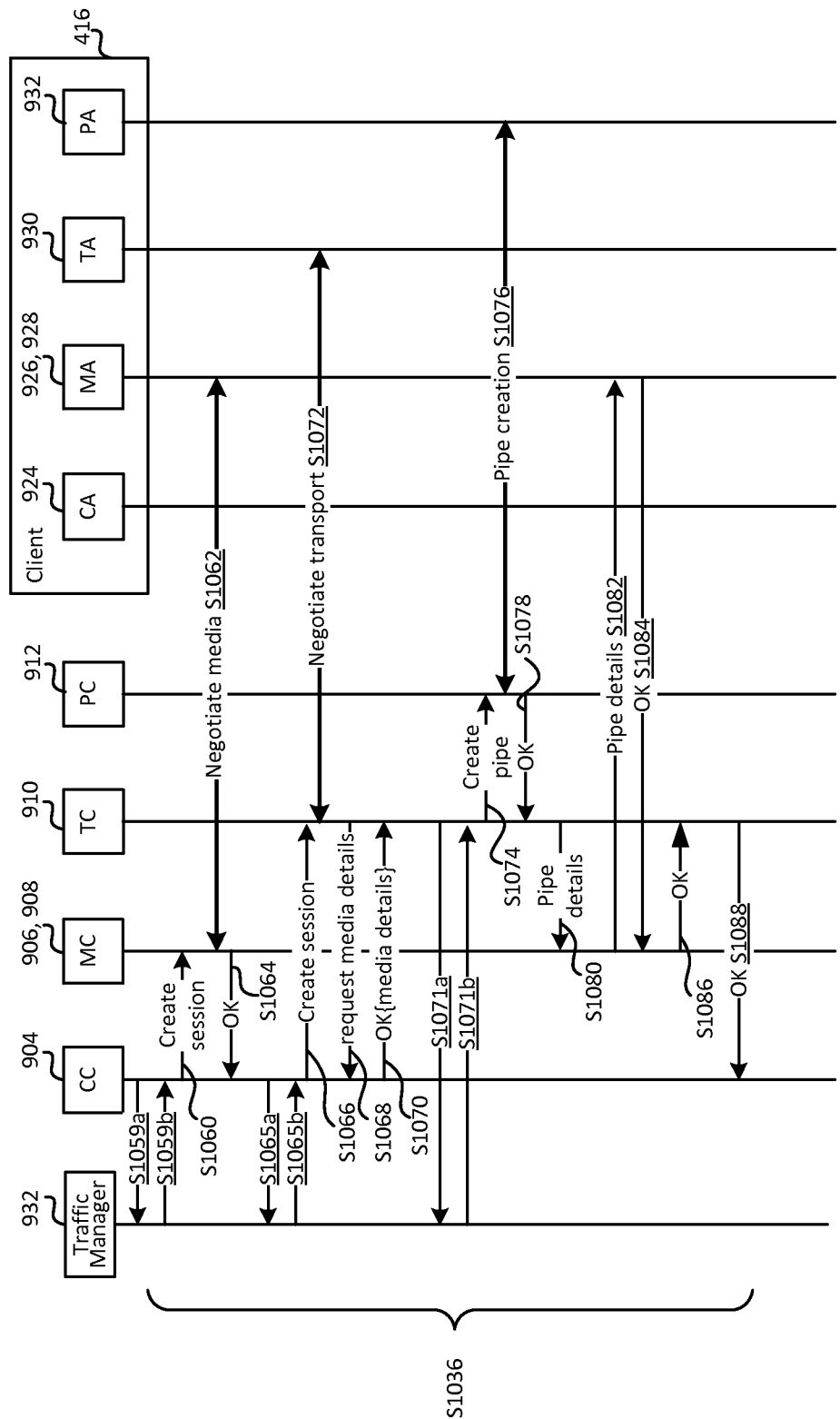

As shown in FIG. 10B, in response to updating of the call state 953 at step S1038, the call controller 904 sends a request to the traffic manager 332 for respective addresses of media controllers of the distributed platform 800, namely an audio controller and a video controller. In response to receiving this request, traffic manager 332 selects an audio controller 906 (resp. video controller 908) out of a plurality of possible audio (resp. video) controllers based on an audio (resp. video) control traffic management profile stored in memory 334 and based on respective current resource usage by those audio (resp. video) controllers as reported by the respective data centers at which those audio (resp. video) controllers are running (as described above), and returns (S1059*b*) respective addresses of the selected audio controller 906 and video 908 controller to the call controller 904. The selected audio and video controllers support that call for the duration thereof or until failure of that component (discussed below).

In response, the call controller 904 sends respective session creation messages (instructions) to each of said media controllers 906, 908 using the respective returned addresses therefor. The session message contains various about the call (Alice and Bob) retrieved from the call state 953 such as the call identifier and the endpoint identifiers for Alice and Bob.

An assigned instance of each media controller 906 (audio), 908 (video) (as assigned respective load balancers of those controllers) conveys media modality control signals to the appropriate agents of the endpoints. The instruction received via the network comprises a respective identifier of one of more of the endpoints, the media modality control signals being conveyed using those identifiers. In this embodiment, this is part of a negotiation of media (audio and video respectively) parameters for the call with both Alice and Bob's audio agents 926*a*, 926*b* (resp. 928*a*, 928*b*). This involves establishing respective connections to the corresponding media agents 926 (audio), 928 (video) of both Alice's client 416*a* and of Bob's client 416*b* (using the information stored by the registration and outbound request logic 914) and exchanging respective data by way of those connections. These negotiations may also involve Alice and/or Bob's media agents 926 (audio), 928 (video) establishing respective connections to the respective corresponding media controllers 906 (audio), 908 (video) via the respective external interfaces 907 (audio), 909 (video) and exchanging respective data by way of those connections. Upon completion of the audio (resp. video) negotiations, audio controller 906 (resp. video controller 908) returns (S1064) a response message ("OK") to the call controller 904, that message being a response to the audio (resp. video) session creation message sent at S1060.

Each of the afore-mentioned media modality controller instances may be further configured to generate media modality state data for that media modality (e.g. audio, video), the generated media modality state data being stored in the computer storage of the communication system, and the stored media modality state data persisting following release of each media modality controller instance for use by another instance of that media modality controller. In embodiments, the media modality state data may be transmitted to the call controller responsive to which the call controller is configured to store those data (e.g. the retuned response comprising the media modality state data). The call controller may configured to supply the stored media modality state data to the other instance of the media modality controller. For example, an instance of the call controller may be configured to store the media modality state data received from the media modality controller instance and the or another instance of the call controller may be configured to supply the stored media modality state data to the other media modality controller instance.

Alternatively or additionally, the media modality controller instance may be configured to store the media modality state data as part of the media modality state (see 1.2.4 above).

During of the media negotiation (S1062), at least one media instance is assigned (responsive to instruction S1064), and at least one media instance released (upon returning response S1064) while the call controller continues to operate (specifically while a call controller instance which initiated the instruction S1060 continues to operate) in communication with the call agents 924*a*, 924*b* e.g. by communicating call state updates S1040, S1042 as shown in FIG. 10A. Those instances may be the same such that only one media controller instance is assigned and then released from that assignment. or there may be additional request (by the call controller)/response (by the media controller)

exchanges between the call controller and media controller media controller with multiple media controller instances being assigned and released for each while the call controller continues to operate.

At step S1065a, the call controller 904 sends a request to the traffic manager 332 for an address of a transport controller of the distributed platform 800. In response to receiving this request, traffic manager 332 selects a transport controller 910 out of a plurality of transport controllers based on an transport controller traffic management profile stored in memory 334 and based on respective current resource usage by those transport controllers as reported by the respective data centers at which those transport controllers are running (as described above), and returns (S1065b) an address of the selected transport controller. The selected transport controller supports the call for the duration thereof or until failure of that controller (discussed below).

In response, the call controller 904 sends a session creation message to said transport controllers 910 using the returned addresses therefor. The session message contains various about the call (Alice and Bob) retrieved from the call state 953 such as the call identifier and the endpoint identifiers for Alice and Bob. The transport controller 910 then obtains details about the user devices 304a, 304b and negotiates transport parameters (such as a packetization protocol) for the call with both Alice and Bob's transport agents 412a, 412b. This involves establishing respective connections to the corresponding transport agents 930 of both Alice's client 416a and of Bob's client 416b (using the information stored by the registration and outbound request logic 914) and exchanging data by way transport those connections. These negotiations may also involve Alice and/or Bob's transport agents 930 establishing respective connections to the transport controller 910) via the external interface 911 and exchanging data by way of those connections. The transport controller also requests media details (S1068) from the call controller 904 such at the types of media services supporting the call (here, audio and video)—which are retuned at step S1070—and may also request further details from the audio controller 906 and/or the video controller 908 (not shown). From this and the information obtained from Alice and Bob's transport agents 930, the transport controller determines (among other things) to a number of pipes to be used for the call (one for each type of media—here, two) and to determine a respective path through the network from Alice's user device 304a to Bob's user device 304b for those pipes. Once so determined, the transport controller sends a request (S1071a) to the traffic manager for an address of a pipe controller of the distributed platform 800. In response to receiving this request, traffic manager 332 selects a pipe controller 912 out of a plurality of transport controllers based on an transport controller traffic management profile stored in memory 334 and based on respective current resource usage by those transport controllers as reported by the respective data centers at which those transport controllers are running (as described above), and returns (S1071b) an address of the selected pipe controller. This pipe controller then supports that call for the duration thereof or until of that controller (discussed below).

In response, the transport controller 910 transmits to the selected pipe controller 912 (S1014) a pipe creating message comprising the determined number of pipes to be created (here, two) and respective details about the determined path through the network 301 for each of those pipes. In response, the pipe controller creates (S1076) that number of pipes in accordance with these respective details. Creation of the pipes involves establishing respective connections to the corresponding pipe agents 332 of both Alice's client 416a and of Bob's client 416b (using the information stored by the registration and outbound request logic 914) and exchanging data by way transport those connections. These negotiations may also involve Alice and/or Bob's pipe agents 332 establishing respective connections to the pipe controller 910) via the external interface 913 and exchanging data by way of those connections. Upon completion, the pipe controller 912 returns a response message (S1078) to the transport controller 910 indicating that the pipes have been created and comprising respective pipe identifiers for the audio and video pipes.

In response, the transport controller transmits a message comprising (S1080) the audio (resp. video) pipe identifier to the audio controller 906 (resp. video controller 908). In response, the audio (resp. video) controller transmits these pipe details to both Alice and Bob's audio agents 926 (resp. video agents 928) each of which returns a response ("OK") message (S1084). At step S1086, the audio (resp. video) controller 906 (resp. 908) returns a response message (being a response to the message of S1080) to the transport controller 910 indicating that the pipe identifier have been correctly conveyed to the appropriate client-side media agents (and that they are thus now operable to make use of the pipe in question to convey real-time media data). In response, the transport controller transmits (S1088) a response message (being a response to the session creation message of S1066) to the call controller indicating that a mechanism for conveying real-time media between Alice and Bob's user devices 304a, 304b has been successfully established and is ready for use.

Returning to FIG. 10A, in response to completion of these various negotiations and creation of the pipe (i.e. in response to the response of S1088), the call controller 904 one again updates (S1038) at least part of the call state to indicate that the call is "in progress" for both Alice and Bob (that is, to indicate that real-time media can now flow between Alice and Bob's respective client 416a, 416b), and transmits (S1040, S1042) respective messages to Alice and Bob's call agents comprising at least that updated part of the call state. Also in response thereto, the call controller 904 instructs (S1044) the media controllers 906 (audio), 908 (video) to begin streaming media from Alice to Bob and vice versa (that is, initiates separate respective instructions thereto). Responsive to those instructions S1044, respective media controller instances are independently assigned to initiate said streaming.

In response, the audio controller 906 (resp. video controller 908)—specifically the assigned instances thereof—instructs both Alice and Bob's audio agents 926a, 926b agents (resp. video agents 928a, 928b) to begin streaming of real-time audio (resp. video). In response (S1050, S1052), each audio (resp. video) agent 926 initiates streaming of real-time audio data (resp. video data) via the audio (resp. video) pipe (details of which have been provided by the audio/video controllers at S1082)

The call agent on a user device (e.g. 304a, 304b) indirectly controls other agents on that device—indirect in that the call agent initiates instructions to the call controller which, in response, initiates an instruction to another controller which, in response, initiates control signals to a corresponding agent on that device.

1.4 Stateful Behaviour of Transport and Pipe Controllers During Call-Setup

Both the transport controller and the pipe controller store respective transport and pipe state information. During the above call set-up procedure, transport state information is maintained by the stateful transport forwarder component 956 of the transport controller 910—that is, each VM of the forwarder component 956 does store information about completed transactions in its own respective individual memory resources as these can typically be accessed further than shared in-memory resources. Thus, requests requiring access such information stored at an individual VM are forwarded to that VM directly by the transport server component for processing, bypassing the load balancer 957. For this reason, any requests, transmitted to the transport controller via interface 911, that depend on results of processing of a previous request by a particular VM the forwarder component include an identifier of that VM. After call set-up has been completed, the transport server no longer maintains any information about session(s) created by the call controller to help service a call (and relies on other service logics to maintain any necessary information e.g. in the call state 953 of the call controller 904 and/or the pipe state 961 of pipe controller 912)

Further, during the above call-setup procedure, pipe state information is maintained by the stateful pipe state component 962 of the pipe controller 912—that is, each VM of the pipe state component 956 does store information about completed transactions in its own respective individual memory resources (rather than in in-memory component 960) as these can typically be accessed further than shared in-memory resources. Thus, requests requiring access such information stored at an individual VM are forwarded to that VM directly by the pipe control component for processing, bypassing the load balancer 963. For this reason, any requests, transmitted to the transport controller via interface 913 during call set-up, that depend on results of processing of a previous request by a particular VM the forwarder component include an identifier of that VM. Once the call has been established (at which point, typically the pipe controller will receive fewer requests pertaining to that call), pipe state information is maintained in the pipe state 961 with no further reliance on stateful behaviour of VMs of the pipe controller 908 (in a manner similar to maintenance of the call state 953 by call controller 904).

Thus, once a pipe controller instance has been assigned during call establishment, (responsive to instruction S1074 in FIG. 10B) it will, in normal operation, not be released from that assignment until pipes have been created (i.e. until returning response S1078 in FIG. 10B). When the pipe controller is so released, the transport controller (and specifically an instance of the transport controller which initiated instruction S1074) continues to operate in communication with transport agents and/or with the media controller(s) (e.g. by communicating pipe details to the media controller, as in S1080 FIG. 10B) and/or the call controller (e.g. by returning response S1088 to the transport controller, as in S1080 FIG. 10B).

Once a transport controller instance has been assigned during call establishment (e.g. responsive to instruction S1066) it will, in normal operation, not be released from that assignment until providing pipe details to the media controller (S1080 in FIG. 10B). Thus, steps performed by the transport and pipe controllers in FIG. 10B will, in normal operation, be performed respectively by a single transport controller instance and a single pipe controller instance.

In this embodiment, some of the code modules (specifically those implementing the transport and pipe controllers) of the communication system are configured as stateful during a call establishment phase in which the communication event is established and stateless following establishment of the communication event. However, in other embodiments, this may not be the case and one or more of the pipe and transport controller may be configured as stateless during call establishment, with transport and pipe instances being assigned and released multiple times during call establishment.

In accordance with the present disclosure, a user device comprises a network interface 424 configured to receive respective instructions via a communication network of a communication system from call and media modality controllers of the communication system respectively configured to establish a communication event and to manage media modality of the established communication event; and a processing unit 402 configured to execute a call agent and a media agent, the call agent being configured to be responsive to the instructions received from the call controller and the media modality agent being configured to be responsive to the instructions received from the media modality controller but not to the instructions received from the call controller.

In embodiments, the call agent may not be responsive to instructions from the media modality controller. The call agent may be configured to transmit a communication event establishment instruction to the call controller via the network interface responsive to which the call controller establishes the communication event. The call agent may be configured responsive to a received invitation from the call controller to join the established communication event. The processing unit may be configured to execute an audio agent and a video agent, the audio agent and video agent being respective media modality agents, the audio agent being responsive to instructions received from an audio controller of the communication system but not to instructions received from a video controller of the communication system and the video agent being responsive to the instructions received from the video controller but not to the instructions received from the audio controller. The network interface may be further configured to receive instructions from a transport controller of the communication system configured to manage transportation of media of the communication event; and the processing unit may be further configured to execute a transport agent configured to be responsive to the instructions received from the transport controller but not to the instructions received from the call controller or media controller. The network interface may be further configured to receive instructions from a pipe controller configured to create a pipe for said transportation of media, and the processing unit may be further configured to execute a pipe agent configured to be responsive to the instructions received from the pipe controller. Responsive to the instructions from the pipe controller the pipe agent may be configured to create at least one media pipe to a pipe agent of another endpoint. The media agent may be configured to transmit media data of the communication event by way of the created media pipe. The pipe agent may create separate audio and video pipes. The processing unit may be configured to execute an audio agent and a video agent, the audio agent and video agent being respective media modality agents, the audio agent being configured to transmit audio by way of the audio pipe and the video agent being configured to transmit video by way of the created pipe.

Also in accordance with the present disclosure, a user device comprises: a network interface 424 configured to communicate, via a communication network of a communication system, with call and media modality controllers of the communication system, the media modality controller being responsive to instructions from the communication controller, the call and media controllers being respectively configured to establish a communication event and to manage media modality of the established communication event; and a processing unit 402 configured to execute a media modality agent configured to communicate with the media modality controller but not with the call controller and a call agent configured to initiate an instruction to the call controller to indirectly control operation of the media modality agent of the user device.

In embodiments, the call agent may be configured to communicate with the call controller but not with the media modality controller. The call agent may be configured to transmit a communication event establishment instruction to the call controller via the network interface responsive to which the call controller establishes the communication event. The call agent may be configured responsive to a received invitation from the call controller to join the established communication event. The processing unit may be configured to execute an audio agent and a video agent, the audio agent and video agent being respective media modality agents, the audio agent being configured to communicate with an audio controller of the communication system but not with a video controller of the communication system and the video agent being communicate with the video controller but not with the audio controller. The network interface may be further configured to communicate with a transport controller of the communication system configured to manage transportation of media of the communication event; and the processing unit may be further configured to execute a transport agent configured to communicate with the transport controller but not with the call controller or media controller. The network interface may be further configured to communicate with a pipe controller configured to create a pipe for said transportation of media, and the processing unit may be further configured to execute a pipe agent configured to communicate with the pipe controller.

2. Independent Resource Allocation

Disclosed is a communication system for effecting communication events between endpoints connected via a communication network, the communication system comprising: a plurality of processing units, each having access to computer storage holding executable code modules for managing a communication event, the code modules configured to implement a media modality controller configured to manage media modality of an established communication event and a call controller configured to establish the communication event; and a resource allocator configured to allocate physical resources of the processing units and computer storage to each of the call controller and the media modality controller; wherein a grant of physical resources to the call controller is independent and different from a grant of physical resources to the media modality controller.

As discussed, in this embodiment, the code modules are configured to implement separate audio and video controllers, each of the audio and video controller being a respective media modality controller. A grant of physical resources to the audio controller may be independent and different from a grant of physical resources to the video controller.

The physical resources may distributed across multiple failure-tolerant regions (discussed above; including fault-domains within data centers), the physical resources granted to the call controller being of a failure-tolerant region different from that of the physical resources granted to media modality controller. The physical resources granted to the call controller may have a geo-location different from that of the physical resources granted to media modality controller. Likewise, the grant of physical resources to the audio controller may be of a failure region (and possibly geo-location) different from that of the physical resources granted to the video controller. The transport and pipe controllers have similarly different and independent grants of physical resources in this embodiment (independent and different from each other, from the call controller and from the media controllers)

In this embodiment, all grants of physical resources to the various controllers (call, media e.g. audio and video, transport, pipe) are effected by controlling the respective virtual machines of those controllers (i.e. the respective virtual machines on which instances of those controllers are running).

Moreover, individual components of any controller (e.g. 642, 652) are allocated physical resources independent from other components of that same controller. For instance call controller components 954, 952 have different and independent grants of physical resources; transport controller components 958, 956 have different and independent grants of physical resources; pipe controller components 964, 962 and 960 have different and independent grants of physical resources; and any media (audio/video) controller components have different and independent grants of physical resources.

In this embodiment, the resource allocator is implemented by code executed on processing units 546 of control servers 544 of the various (and possibly geo-distributed) data centers 320.

The communication system 300 can to scale to meet demand for specific, discreet functions e.g. in potentially specific geographic areas (as the communication system 300 may be a global communication system i.e. enabling calls between different countries and/or continents).

To this end, the design of the NRT Calling and RTM services separates not only the logical but the discreet service deployed infrastructure which provides a specific part of the total service delivery to the user—e.g. video media, audio media, call control. The services do not deploy as a set of coupled bits with logical separation in the internal logic of the system, but actually as separate services and processes completely.

Traditionally as demand for a communications service grows in, for example, in a specific part of the world, and for a specific feature, such as group video calling, the entire solution would need to be scaled up to handle the increased demand.

However, the call control system 900 of the present disclosure design allows e.g. video media infrastructure to be scaled, in response to a change in demand, independently from e.g. call control and signalling infrastructure. It may, of course, be desirable to scale up other services in response to that same changing demand, but this is a decoupled independent decision.

As discussed, set-up of a real time AV call is performed by a number of decoupled, independent controllers (cloud control service logics) which interact by means of well-defined interfaces and contracts to provide the real time AV call and attached media services.

This decoupled service design allows each service to be autonomous in terms of the inner workings of the service, which includes deployment, scale and service specific resource management.

This autonomy allows each service to independently react to load and scale requirements on the specific service without there being a design induced need for all other services to scale or change as a direct result of the scale need of a single service. This means that, if the demand for say video media in a specific country increases, just the video media service needs to scale the service infrastructure in the specific country, while placing no direct demands on the other services to scale in concert. Note that there may be a need for other services to scale at the same time, but this will be purely driven by the type of demand, the scale limits of each service, rather than a linked-system design driven need.

Such scaling can, in embodiments, be effected as follows.

Physical computer resources (e.g. physical memory resources, physical processing resources) can be allocated to each type of service independently from other types of service. For instance, if one or more service logics of a first type are configured to deliver a first type of service and one more service logics of a second type of service are configured to deliver a second type of service, additional resources can be allocated to the first service independently from the second type of service.

The resource allocation for the first type of service can be increased resp. decreased) in one or more of the following ways:
- By deploying additional (resp. terminating existing) service logics of that type i.e. by allocating physical computer resources to a new service logic of the first type (resp. un-allocating computer resources for an existing service logic of that type)—one example of this would be deploying a new web application on a Windows Azure™ cloud platform;
- By increasing (resp. decreasing) a number of virtual machines within component(s) of one or more existing service logics of the first type i.e. increasing (resp. decreasing) a computer resources allocation for that component—one example of this would be altering a number of instances within a web-role or worker-role of a web application on a Windows Azure™ cloud platform;
- By increasing (resp. decreasing) a "size" of (that is a respective amount of physical resources allocated to) duplicate virtual machines within component(s) of one or more existing service logics of the first type i.e. increasing (resp. decreasing) respective computer resources allocated to each such duplicate virtual machine of a particular component—one example of this would be resizing a web-role or worker-role of a web application on a Windows Azure™ cloud platform;

Using the latter two techniques, resources can be allocated to one service logic independently from others—both of the same type and of different types. For instance, more VMs could be added to component(s) of a first service logic of a first type, and/or VMs of those component(s) could be re-sized, without altering component(s) of other service logics of that type and without altering component(s) of other service logics of different types.

Moreover, using the latter two techniques, resources can be allocated to different components of a same service logic independently from one another (e.g. adding VMs to, or resizing VMs of, one without altering the other).

The DC control blocks of each data center 320a, 320b, 320c etc. constitute resource allocation logic operable to effect these allocations as each has control over physical resource usage within its own data center. As discussed, resource allocation is effected by supplying configuration information to the external control blocks 559 of data centers.

For example, any one of the call controller 904, audio controller 906, video controller 908, transport controller 910, and pipe controller 912 can be allocated computer resources in this manner independently from each other (that is, without the other being altered) and independently from any other call controllers, audio controllers, video controllers, transport controllers, and pipe controllers running on the same distributed platform 800.

For instance, if a demand for say video media in a specific country increases, just the video media service logic deployed in that country needs to scale (by deploying new video control service logics in that country or by increasing resources allocated to existing video control service logics running in that country), while placing no system-design driven demands on the other services to scale in concert.

Further, components of those controllers can be allocated resources independently from other components of those components. For instance, the call control component 954 of the call controller 904 can be allocated resources independently from the in-memory storage component and vice versa. E.g. if the call control component 954 were to have insufficient allocated processing resources to process eternal requests but the in-memory storage component were to have sufficient allocated processing resources to process internal read/write requests, the stateless call control component could be allocated more processing resources (by adding more VMs thereto or by increasing the size of VMs thereof) without altering the processing resources allocated to the in-memory storage component. Similarly, additional shared memory resources could be allocated to the in-memory storage component to enable it to store more call states without altering the memory resources assigned to each VM of the call control component (this may be unnecessary as each VM of the call control component need only store at most a single call state, or part thereof, for the duration of any transaction).

Resources allocations for components of the other controllers could be similarly independently adjusted.

3. Control Service Logic (Controller) Failure and Call State Replication

Disclosed is a communication system for effecting communication events between endpoints connected via a communication network, the communication system comprising: a plurality of processing units, each having access to computer storage and holding executable code modules for managing a communication event, the code modules configured to implement one or more call controllers for establishing a communication event and for managing the established communication event; wherein the computer storage is partitioned into multiple failure-tolerant regions; wherein a first call controller instance is configured to access a first failure-tolerant region of the computer storage to access a call state, the first call controller instance being assigned to so access the call state responsive to a first instruction received via the network; and wherein at least part of the call state is replicated in a second failure-tolerant region of the computer storage so that a second call controller instance can access the at least part of the call state, the second call controller instance being assigned to so access the at least part of the call state responsive to a second instruction received via the network.

Also disclosed is a method of managing a communication event between endpoints connected via a communication network of a communication system comprising a plurality of processing units, each having access to computer storage holding executable code modules for managing the communication event, the code modules being configured to implement a call controller for establishing a communication event and for managing the established communication event, the computer storage being partitioned into multiple failure-tolerant regions, the method comprising: assigning a first instance of the call controller to progress the establishment of the communication event responsive to which the first call controller instance stores a call state of the communication event in a first of the failure-tolerant regions; and assigning a second instance of the call controller to further progress the establishment of the communication event and/or manage the established communication event responsive to which the second call controller instance accesses a replica of at least part of the call state in a second of the failure-tolerant regions.

The second failure-tolerant region is different to the first failure-tolerant region.

In this embodiment, the second instance of the call controller is assigned to access the at least part of the call state responsive to a detected condition of the first call controller instance. The detected condition is one of: failure of the first call controller instance; decommissioning of the first call controller instance; and the first instance of the call controller having access to insufficient physical resources of the processing units to process the second instruction etc.

The processing units may also be distributed across multiple failure-tolerant regions, the first and second call controller instances being executed on respective processing units in first and second failure-tolerant regions. The failure tolerant regions of the computer storage may or may not be substantially aligned with the failure-tolerant regions of the processing units (that is, such that a set of processing units and a set of computer storage accessible thereto are isolated from the same sources of failure).

In the example below, the first instance is an instance of a first call controller and the second instance is an instance of a second call controller at a different data center (which may or may not have a different geo-location to the first). The fault-tolerant regions of the computer storage and processing units are substantially aligned in that both correspond to data centers at which sets of processing units and the parts of the computer storage to which those sets have access are located.

In accordance with the present disclosure, a user device comprises: a network interface 424 configured to receive instructions via a communication network of a communication system from a call controller of the communication system, the call controller being configured to access a call state of an established communication event; computer storage 426 configured to store a local version of the call state; and a processing unit 402 configured to execute a call agent having access to the local version of the call state and configured to update the local version of the call state responsive to the received instructions from the communication controller.

Figure 5B:
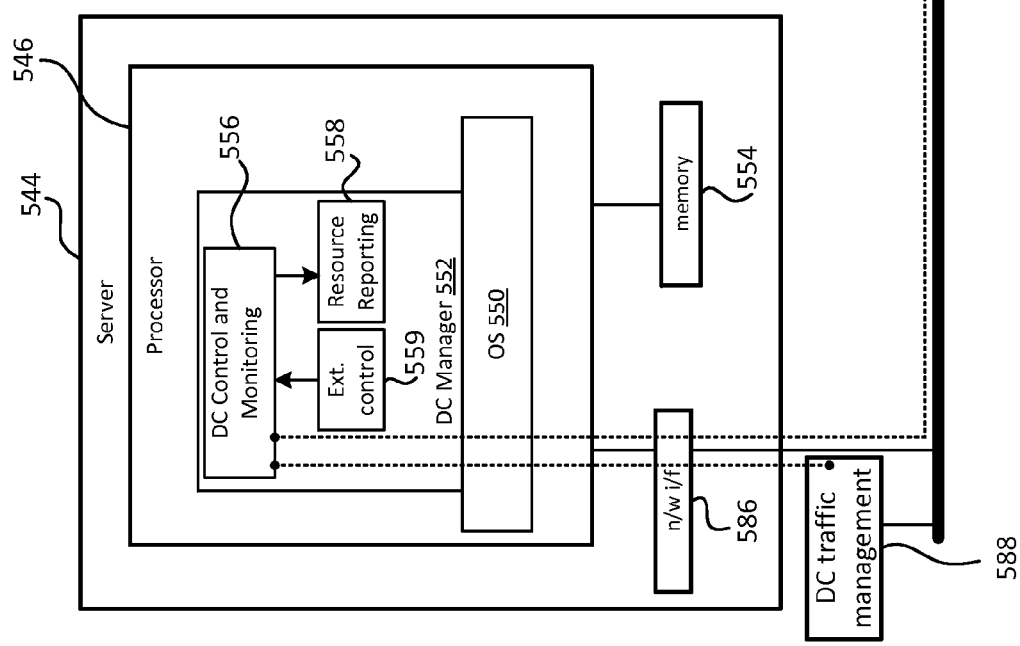

The above-described control system of the cloud 800 that 'power' the communication system 300 is high performing and highly resilient to failure: as discussed, failure of individual VMs within a component of a particular service logic is rectified automatically by the relevant root VM 522 and/or DC control block 556 (see FIG. 5 and accompanying text).

As indicated above, each component of a service logic is implemented by duplicate code instances executed on multiple respective duplicate virtual machines (VMs) running at the same data center 320 under the control of a DC control block 556. If one of those VMs of a component fails (e.g. due to a software failure of the application code being executed on that VM, a software failure of that VM itself, a software failure of the hypervisor on which it is running, a hardware failure of the server on which that hypervisor is running that is either local to that server or across the entirety of the fault zone in which that server is located), this is 'invisible' outside of that component: in response to the failure, the load-balancer stops forwarding requests to that VM and simply forwards any requests to a selected one of the remaining VMs of that component (all of which are capable of processing such requests).

For instance, the call state 953 for a call is stored by in-memory storage component 952 of the call control service logic 904 which is controlling that call in physical memory resources shared by, and accessible to all of, the virtual machines of the in-memory storage component. If one of those virtual machines fails (e.g. as above), the call state 953 can still be accessed (e.g. by call control component 954) via any of the other virtual machines whilst that virtual machine is re-created under the control of the DC control block 556 at which that call controller is running.

Should failure of an entire service logic occur (e.g. due to a failure of all virtual machines within a particular component for whatever reason or due to a hardware or software failure of an entire data center), then the traffic manager 332 can, upon request, select another service logic of that same to take over (e.g. running at a different data center). For instance, if one of the media controllers 906 (audio), 908 (video) or if the transport controller (910) failed during a respective negotiation stage (S1062, S1072), the call controller 904, responsive to detection of this failure, can request an address of a replacement service logic of that type from the traffic manager 332, and can instruct the replacement service logic to re-start the negotiations in question by sending a session creation message thereto as in S1060 or S1066. Audio, Video or transport negotiation can then begin afresh, without having to repeat earlier call establishment steps (as any information needed by the audio, video or transport controller is maintained in the call state 953 of the call controller 904).

As discussed below, it may be beneficial to replicate states of other services too (e.g. media modality state of a media modality controller) to facilitate faster recovery and less disruption. States of other services can be replicated in manner analogous to that of call state replication, as will be apparent upon consideration of the present disclosure.

However, upon similar failure of the call controller 904, information such as the call state 953 for that call is lost (or at least becomes inaccessible). Whilst a new call controller can be selected by the traffic manager 332 in the above manner, if the call state 953 is lost, a new call may have to be created from scratch e.g. by one of Alice or Bob's call agents 924 requesting an address of a new call controller from traffic manager 332.

Call signals that are processed may modify the state of the call, which is deferred for reliability, scale and resilience. This deferred call state is achieved by the call signal processing component reading the call state from a dedicated in-memory (e.g. cache) layer within the first DC, processing the signalling in relation to the call, and writing any changes to the call state to the cache layer. Here, deferred call state means reading to/writing from shared memory resources of a component (e.g. cache layer) every time a request that modifies the call state is processed (rather than the call state being persisted or maintained in the virtual machine processing the command)

Described below is a failover procedure whereby failure of a call controller controlling a call is rectified by without terminating that call.

Call state is replicated from a first failure-tolerant region (here, a first data center (DC), 3.g. 302a in FIG. 3), to at least a second failure-tolerant region (here at least a second data center, e.g. 302b in FIG. 3), in an event based manner, at the time of the state change, to ensure that if the first DC fails, the call can either be recovered, continued or at the very least restarted with the correct participant list. This is describe in detail below.

In accordance with the present subject matter, the call state 953 for each call, or at least part thereof, is replicated between multiple all controllers (that is, across multiple data centers). Should one call controller fail, another call controller can take over using the replicated call state without having to re-start the call from scratch.

As discussed, each virtual machine of a particular call controller is stateless (both those of the stateless call control component 954 and those of the in-memory storage component 952)—the only useable information about the call which is maintained beyond a particular transaction is maintained in the call state 953 stored in the shared memory resources of the in-memory storage component 952 (and not in the individually-assigned memory resources of any particular VM). These shared memory resources are geographically located at the data center at which that component (and that call controller) is running. Therefore, the call state contains all the information required for one call controller to be able to seamlessly take over from another—upon failure of one call controller during a call, any requests originally intended for that call controller can be re-directed to another call controller storing a duplicate (replica) call state, with the duplicate call state containing sufficient information for that other call controller to be able to process those requests.

A call-state replication process will now be described with reference to FIGS. 11A 11B, and 11C.

Figure 11A:
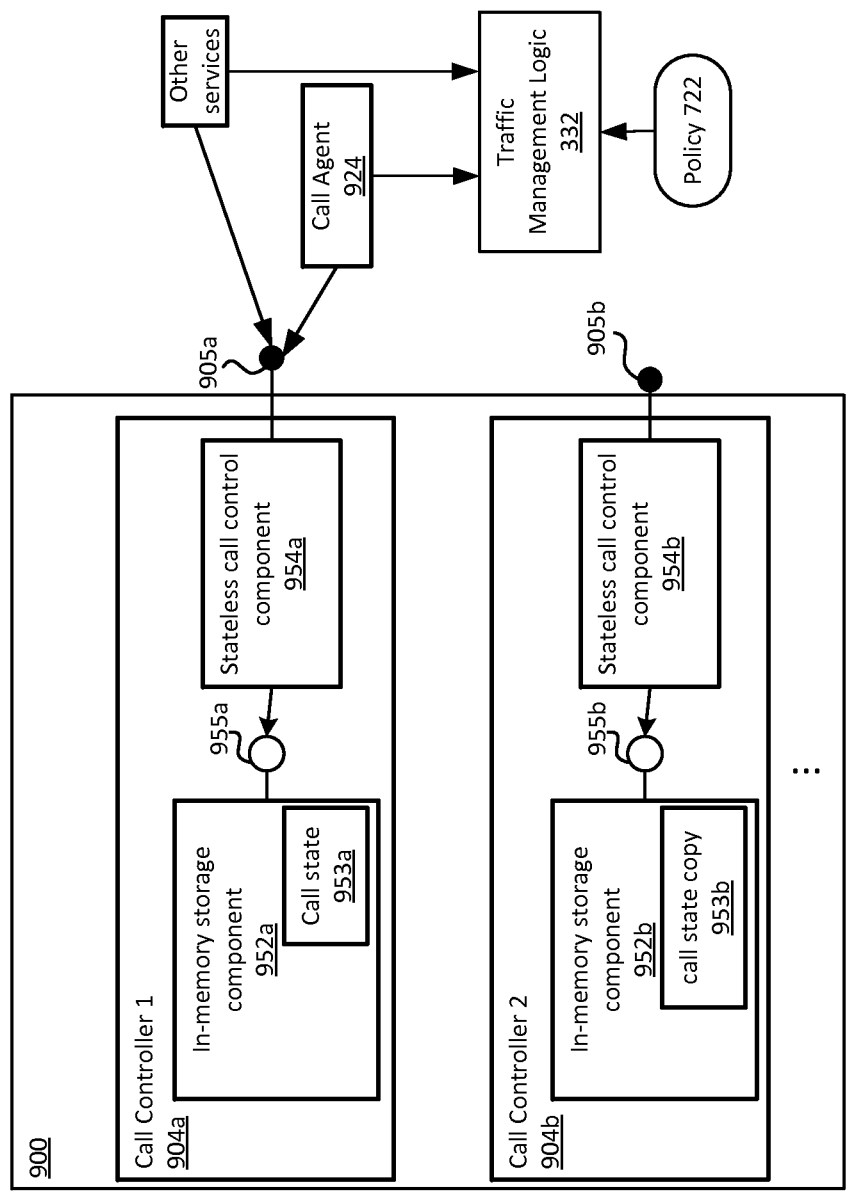
FIGS. 11A, and 11B provide schematic illustrations of a failover procedure.
Figure 11B:
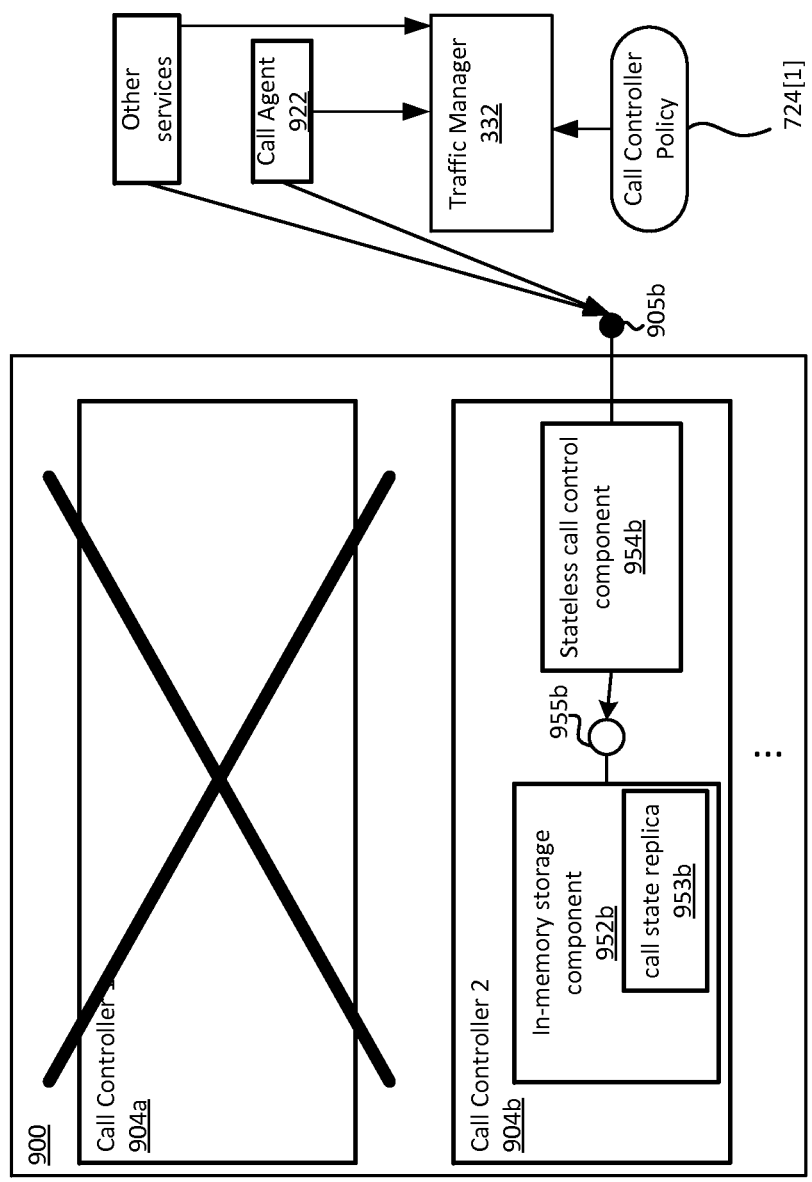
Figure 11C:
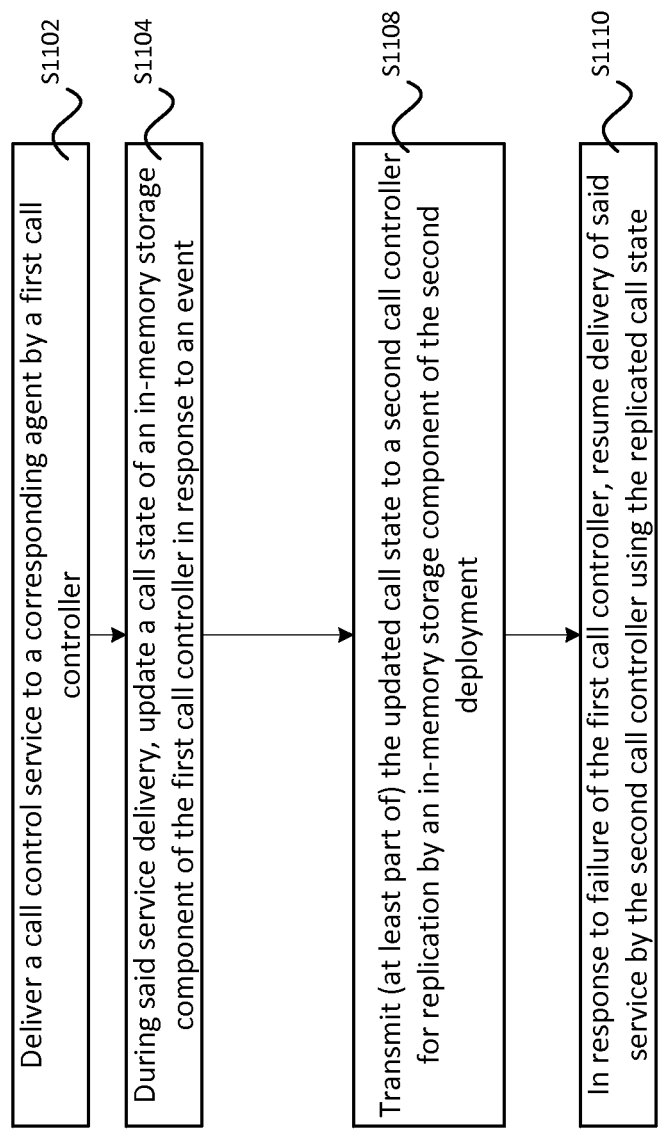
FIG. 11C is a schematic illustration of a method for implementing a failover procedure.

FIG. 11A shows a first call controller 905a—running at the first data center 920a—comprising a first stateless call control component 954a having an external interface 905a and an in-memory storage component 952a having an internal interface 953a. A first set of physical shared memory resources are allocated to the first call controller 905a (by the DC control block of the data center 320a at which that call controller is running) for use by the in-memory 952a storage component of that call controller 905a. These physical memory resources are geographically located at the first data center 920a. The first call controller 905a is controlling a call by delivering a call control service to a call agent 924 (the call agent 924 having initially requested that service from that call controller in response to receipt of an address of that call controller form traffic manager 332, that call controller having been selected by the traffic manager logic 332 based at least in part on a call controller policy 724[1] stored in memory 334). To this end, the first call control service logic is also in communication with other service logics e.g. audio controller, video controller, transport controller. A call state 953a is stored by in-memory storage component 953a.

A second call controller 904b—running at the second data center 920b—comprises a second stateless call control component 954b having an external interface 905b and a second in-memory storage component 952b having an internal interface 955b. A second set of physical shared memory resources are allocated to the second call controller 905b (by the DC control block of the data center 320b at which that call controller is running) for use by the in-memory storage component 952b of that call controller 905b. These physical memory resources are geographically located at the first data center 920a.

The first and second sets of physical memory resources are located at different geo-locations (that is the each is geo-located absent from the other), the first and second data centers 320a, 320b being located at different geographic locations. For instance, they may be located in different states or regions of a country, in different countries, on different continents, in different time-zones or otherwise separated such that a single kinetic event that impacts on (i.e. affects operation of) both (e.g. earthquake, war) is unlikely to occur.

A process of call-state duplication will now be described with reference to FIG. 11C.

As discussed above, upon receipt of an initial call creation message, the first call control component 905a creates the call state 952b (comprising an identifier of the call which is unique within the communication system 300), sends the created call state to the in-memory storage component 952a via interface 955a for storage, and initiates delivery of a call control service to call agent 924 (S1102). The call control component 905a also send a copy 952b of the newly-created call state to the second call controller 954b (e.g. at least by initiating an instruction thereto)—specifically to the second call control component 954b via interface 905b; in response the call control component 954b transmits the received call state to the second in-memory storage component which stores the call state copy 953b in shared physical memory resources of the second in-memory storage component 952b.

During delivery of the call control service, the call control component 954a (specifically an assigned call controller instance thereof) updates (S1104) the call state 953a (by modifying at least part thereof) in response to an event (e.g. S1006, S1012, S1020, S1088 in FIGS. 10A and 10B) by communicating with in-memory storage component 952a. The call control component is also operable to transmit (S1108) a copy of at least part of the updated call state 953a to the second call controller 904b (e.g. at least by initiating an instruction thereto) via the external interface 905b of the second call control component 954b. This transmitted part of the updated call state comprises the identifier of the call. In response to receipt thereof, the second call control component 954b (specifically, an assigned call controller instance thereof) forwards the updated call state for storage thereby; the second in-memory storage component 952b modifies the call state copy 953b (identified using the call identifier) in accordance with the update.

The first call control components may be responsive to update the call state in the first region responsive to a plurality of such instructions and/or responses but to update the at least part of the call state in the second regions responsive to only a selection (that it at least one but not all) of that plurality of instructions and/or responses. For instance, the call state copy 953b may only be updated in response to some of the instructions shown to result in a call state update in FIGS. 10A and 10B (e.g. only a selection of the instructions referred to as the first to eighth instructions above, under the heading 1.2.1 Call Controller). Said selection of instructions may dependent on the one or more parameters of the call (discussed below). This granularity provides an adjustable trade-off between resilience to controller failure (with greater reliance being provided as more of the call state is replicated e.g. at the lower end, enabling a terminated call to be re-started in the event of e.g. controller failure and at the upper end preventing the call from being terminated at all with more-or-less seamless 'handover' from a failed controller to a new controller) and memory saving (with less computer storage being required for less call-state replication).

If the first call controller fails (illustrated graphically in FIG. 11B), delivery of the call control service is resumed by the second call controller 904b using the call state copy 953b as explained below.

Such failure of the first call controller (i.e. failure of first instance(s) thereof) is detectable by the call agent 924 e.g. due to an existing connection with the first call controller 904a being unexpectedly terminated and/or due to request messages directed thereto going un-responded for greater than a timeout period. This failure of the first call controller is also detectable by traffic manager 332 based on reporting from the resource reporting block (e.g. 558, FIG. 5B) of the data center 320 at which the first call controller is running. In response to detection of this failure the traffic manager is configured, based on the call controller policy 722[1], to respond to any requests for an address of a call controller that would have resulted in selection of the first call controller were it available with an address of the second call controller.

In response to such a detection by the call agent 924, the call agent 924 again requests an address of a call controller from traffic manager 332. The request may indicate that the first call controller is being unresponsive and indicate that an address of a different call controller should be returned, or the request may not specify this (and may rely on the traffic manager 332 also detecting failure of the first component). Either way, in response, the traffic manager 322 returns an address of the second call controller 904b which can be used to establish a connection with the second call control component 954b via interface 905b.

The service agent 924 can then transmit any request, comprising the call identifier, that would have been transmitted to the first call controller 904a had it not failed to the second call controller 904b instead. The second call controller processes these requests using the call state copy 953b identified using the call identifier of these requests. This may involve continuing to establish the communication event (if it has not already been established) and/or managing the communication event once established (by either of the first and second call controllers).

In some embodiments, the call state copy 953b may not be a full copy of the call state 953a i.e. the original call state may contain more information than the copy, the copy only containing selective information about the call. In this case, the initial copy sent to the second call controller by the first upon creation of the call state 953a is a copy of only part of that call state, containing sufficient information to enable the call to continue even if the first call controller fails but not every individual parameter of the call (these parameters may be reset upon failure of the first call controller). Alternatively or additionally, the first call controller may only send messages to the second call controller to update the call state copy 953b in response to some events but not others (such that some events result in updating of the 'master' call state 953a but not the copy 953b). In this case, the copy 953b contains sufficient information for the call to be able to continue upon failure of the first call control component even if some recent history is lost. The former requires more memory resources whilst the latter requires more network resources than full call state replication though, in contrast to full replication, both are liable to result in some loss of call information should the first call controller fail.

How much of the call state is replicated may depend on one or more parameters of the call. That is, in one embodiment, the call controller is configured to select the at least part of the call state for said replication based on one or more parameters of the communication event. The parameters may comprise one or more priority parameters associated with one or more users participating in the communication event (e.g. with higher priority users being those who have paid for a premium service, and lower priority users being those who have not paid for a premium service), with the selected at least part of the call state constituting a greater portion of the call state for higher priority parameters and a lesser portion of the call state for lower priority parameters. In this case, the quality parameters are assigned to the users by an operator of the communication system 300.

Alternatively or additionally, the parameters may comprise a current elapsed time of the communication event (that is an amount of time since establishment of the communication event or an amount of time since the call state was first created), with the at least part of the call state constituting a greater portion of the call state for longer elapsed times and a lesser portion of the call state for shorter elapsed times.

The parameters form part of the call state such that the call state itself dictates how much of the call state should be replicated.

The replicated at least part of the call state may, for instance, comprise respective identifiers of one or more users participating in the communication event and/or respective identifiers of one or more of said endpoints. This at least enables the call to be re-started in the event that the original call state becomes inaccessible. The at least part of the call state defines relationships between said users e.g. identifying one of said users as a moderator (or owner) of the call.

The replicated at least part of the call state may comprise media modality state data of the communication event as received from the media modality controller e.g. during establishment of the call (described above). For example, the media modality (e.g. audio resp. video) state data may comprise respective indications of whether or not one or more media modalities (e.g. audio resp. video) are active for each of the users (e.g. whether or not respective audio is muted for one of more of the participating users resp. an indication of whether or not respective video is enabled for one or more of the participating users). The call controller (e.g. second instance thereof) may supply media modality state data to the media controller form the at least part of the call state in the second region responsive to which an instance of the media modality controller is assigned to convey media modality control signals to the endpoints based on the supplied media modality state data (just as if the media modality state data had been supplied from the original call state in the first region e.g. by the first call controller instance).

The decoupling of services means that, whatever detected condition caused failure of the first call controller, that condition may not impact on the media modality controller from which the media modality state data was supplied. Thus, that media modality controller may continue to operate to manage media modality of the communication event following the detected condition.

The replicated at least part of the call state may be selected, based on the parameters, to comprise one of: media modality state data of the communication event and respective identifiers of one or more users participating in the communication event and/or respective identifiers of one or more of said endpoints (e.g. for higher priority users/longer elapsed times), or said identifiers but not said media modality state data (e.g. for lower priority users/shorter elapsed times).

Thus, replication can be tuned based on parameters to provide varying levels of robustness as desired. For example, based on the one or more parameters, the at least part of the call state can be selected to constitute one of:
- a first portion of the call state whereby the call controller can continue to manage the communication event using the first portion without terminating the communication event should the first failure-tolerant region become inaccessible, or
- a second portion of the call state whereby the call controller can re-establish the communication event using the second portion should the first failure-tolerant region become inaccessible and the communication be terminated in response.

The first portion of the call state could, for instance, constitutes the entirety of the call state, the entirety of the call state thereby being replicated in the second failure-tolerant region.

3.1 Replicating Media Modality State

In embodiments, a first media modality controller instance is configured to access a third failure-tolerant region of the computer storage to access a media modality state, the first media modality controller instance being assigned to so access the media modality state responsive to a third instruction received via the network; and wherein at least part of the media modality state is replicated in a fourth failure-tolerant region of the computer storage so that a second media modality controller instance can access the at least part of the media modality state, the second media modality controller instance being assigned to so access the at least part of the media modality state responsive to a fourth instruction received via the network.

The media modality controller may be configured to supply media modality state data to the first instance of the call controller responsive to which the call state in the first region and the at least part of the call state in the second region are updated based thereon. The second instance of the media modality controller may be assigned to access the at least part of the media modality state responsive to a detected condition of the first media modality controller instance. The detected condition may be one of: failure of the first media modality controller instance; decommissioning of the media modality call controller instance; and the first instance of the media modality controller having access to insufficient physical resources of the processing units to process the second instruction. The call controller may continue to operate to establish the communication event and/or manage the established communication event following the detected condition.

Media modality state may be replicated in a manner equivalent to the above-mentioned call state replication, as will be apparent (with the call controller substituted for the media modality controller and the call state substituted for the media modality state).

The third failure-tolerant region is different to the fourth failure-tolerant region. The third and fourth failure-tolerant regions may or may not be different to the first and/or second failure-tolerant regions in which the call state and replica thereof are maintained.

3.2 Virtual Cache Implementation

Disclosed is a method of replicating data in a communication system comprising a plurality of processing units at different geo-locations, each having access to computer storage at that geo-location holding a respective code module for implementing a virtual cache, the method comprising: transmitting a first storage instruction to a first of said processing units, responsive to which a first instance of the virtual cache on that processing unit accesses computer storage of the first processing unit to store data; and responsive thereto, transmitting a second storage instruction to a second of said processing units at a geo-location other than the first, responsive to which a second virtual cache instance on that processing unit accesses computer storage of the second processing unit to replicate said data.

The data may comprise at least part of a call state for a communication event conducted between two or more endpoints of a communication system.

4. Independently Deployable Agents

Whilst the above has been described with reference to endpoints each having a full 'stack' of agents (call, media e.g. audio and video, transport, pipe), the decoupled nature of the communication system architecture lends itself to the deployment of agents on separate devices. For instance, a call control agent can be deployed on one device of a user an media agents deployed on another device of the user; the call controller can simply provide an identifier of the other device to the media controllers and they will create suitable media sessions between that device and the other call endpoints, without the media controller ever needing to know that the controlling user device exists. Moreover, the other user device can have minimal or no call control logic and can simply act to, say, receive and capture video with all control being handled by way of interactions between the call controller and the controlling device.

Agents deployed on separate devices interact with their respective controllers, and effect indirect control over one another just as they do when deployed on the same device (as described above).

Disclosed is a communication system for effecting communication events between a computer system, comprising first and second computer devices, and one or more additional endpoints connected via a communication network, the communication system comprising: a plurality of processing units, each having access to computer storage holding executable code modules for managing a communication event, the code modules configured to implement a media modality controller configured to manage media modality of an established communication event and a call controller configured to establish the communication event; wherein an instance of the media modality controller is assigned responsive to an instruction initiated to the media controller by the call controller to convey media modality control signals of the communication event to a media agent on the first device without accessing a call agent on the second device; and wherein the initiation of the instruction by the call controller is responsive to an instruction received via the network from the call agent on the second device.

Also disclosed is a method of effecting a communication event between a computer system, comprising first and second computer devices, and one or more additional endpoints connected via a communication network of a communication system comprising a plurality of processing units, each having access to computer storage holding executable code modules for managing a communication event, the code modules configured to implement a media modality controller configured to manage media modality of an established communication event and a call controller configured to establish the communication event, the method comprising: the call controller initiating an instruction to the media controller responsive to an instruction received via the network from a call agent on the second device; and responsive to the instruction initiated by the call controller, assigning an instance of the media modality controller to convey media modality control signals of the communication event to a media agent on the first device without accessing the call agent on the second device.

The call controller may be configured to transmit an identifier of the first device to the media modality controller responsive to an instruction received from the call agent on the second device, said conveyance of media modality control signals by the media modality controller instance being based on that identifier.

Also disclosed is a computer system comprising first and second computer devices. The first computer device comprises: a network interface configured to communicate, via a communication network of a communication system, with a media modality controller of the communication system configured to manage media modality of an established communication event, the media modality controller being responsive to instructions from a communication controller of the communication system; and a processing unit configured to execute a media modality agent configured to communicate with the media modality controller but not with the communication controller. The second computer device comprises: a network interface configured to communicate via the network with the call controller, the call controller being configured to establish the communication event; and a processing unit configured to execute a call agent configured to communicate with the call controller and to indirectly control operation of the media modality agent of the first user device by way of said communication with the call controller.

The call agent of second device thus indirectly controls the media agent on the first device in the manner described above.

In existing communication systems, for a user to be able to use more than one device (e.g. a smartphone and a television) contemporaneously to participate in a call (e.g. the smartphone for call audio and the TV for call video), unless those devices are directly connected over wired or wireless networks (including Bluetooth™ and similar) a full real-time control stack is needed at both devices including call control, media control, media and network stack and user level authentication. Such a full stack includes both user and feature service delivery control logic needed to be deployed to the endpoint, making this a more complex and constrained option, due to processing and security constraints.

The present subject matter allows user-side logic for a specific "modality" (that is, type of media service e.g. user-side logic for providing a particular feature of a real-time media communication event, such as call audio, call video and enriched features such as screen sharing or call video tailored to large, high resolution screens) to be installed separately at different devices as modality agents (that is, service agents of that type), along with any necessary media and network stack, on a device or endpoint, allowing it to be discovered by the modality controller, and thus used as a valid modality endpoint in the context of functional service delivery—for example within a call.

When considering the more demanding use cases with regards media in communications settings, with regards both audio and video—as well as for example screen sharing and other modalities—making use of specialist devices and other endpoints that are able to enhance and enrich the experience of a particular modality—such as viewing received video on a large screen TV as opposed to the tablet where the call control is being run—is a powerful tool.

As part of the decoupled service logic design described above, service agents can be deployed to endpoints which provide automatically discoverable infrastructure points to enhance and expand the capabilities of that particular service (e.g. audio, video or enriched services such as screen sharing and high-resolution video), and as such broader functional, end to end service delivery and capabilities.

Agents can be configured to be deployed in a standalone fashion to an endpoint (user device). Deployment could be as an embedded agent in an OS layer, or as an application that runs on top of this OS (e.g. that is delivered "over the air" via an app store type model). The deployed agent is configured to know enough about the device to register it with corresponding cloud service logic of that modality type, which in turn would be able to notify context services or clients of the availability of the endpoint for the specific modality for use in the call or other context service.

The modality agent, on start-up, connects to a corresponding control service logic of that type—video for example—registering the endpoint, with enough information on how to be contacted by that service logic, what its modality specific capabilities are, and other relevant information. The agent would need to be deployed with the necessary media an network stack to allow it to perform the intended modality function.

This means that a "video output agent" could be deployed on a television for example, which would register itself on a network, and if a client (e.g. client 416*a* on user device 304*a* or client 416*b* on user device 304*b*) is using a same device as the television (e.g. if both are connected to a common wireless router), the client is able to output and render incoming video for an active call on the television. This would require no user-side call control logic (i.e. no call agent) on the television and the television could be controlled entirely from the video media service logic of the cloud 800 (e.g. in response to control data from the client 416). The relationship could be established by other means, such as a pre-configured relationship. Provided there is a route to send media, this could be used remotely.

Figure 12:
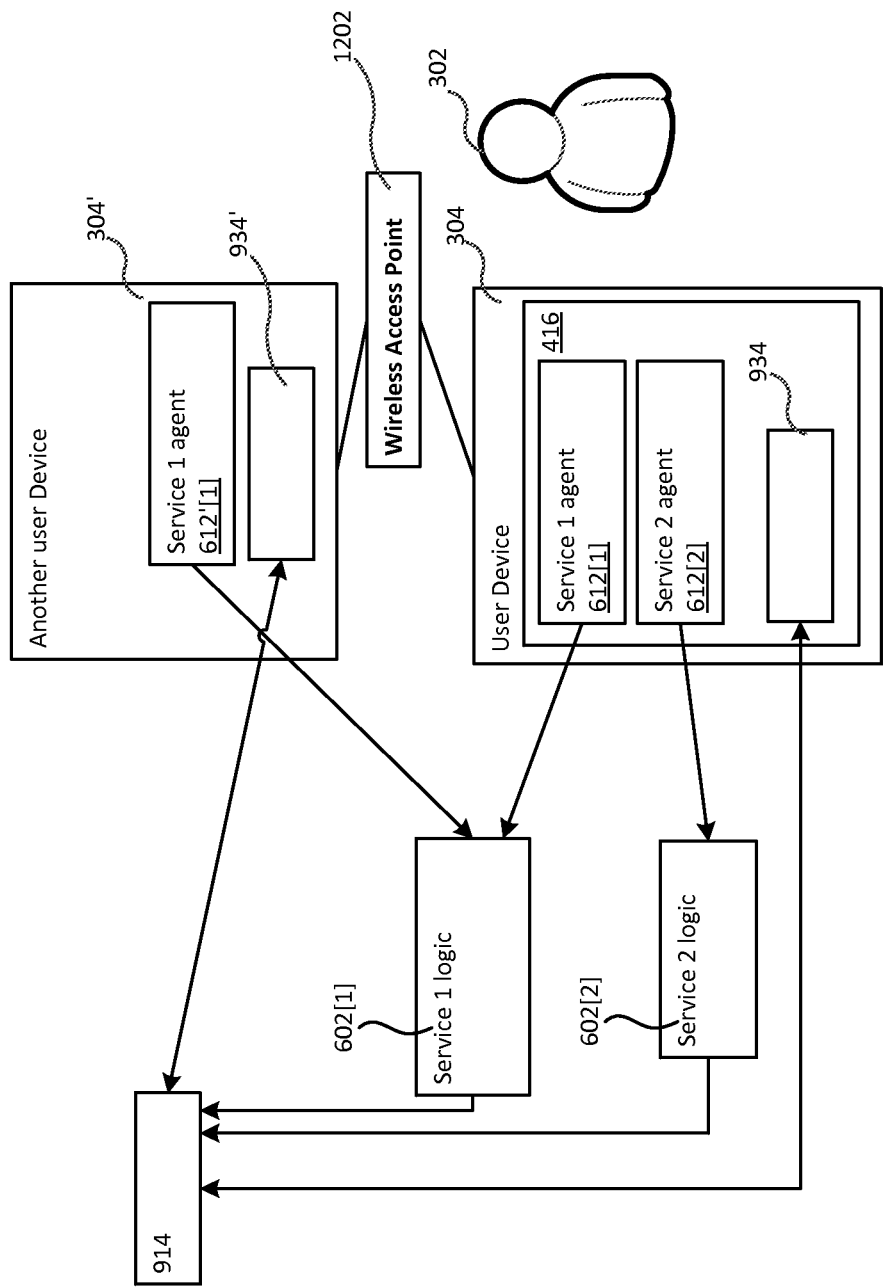
FIGS. 12 and 12A schematically illustrate user devices in accordance with a communication system architecture.

This is now described with reference to FIG. 12. As shown in FIG. 12, different types of agent (e.g. call agent, audio agent, video agent, transport agent, pipe agent) are deployed independently form one another at separate devices. For example, FIG. 12 shows a (second) user device 304 of user 302 implementing: a service agent 612[1] of a first type, a service agent 612[2] of a second type, and an registration and inbound request block 934, all of which form part of a client 416; and another (first) user device 304' implementing another service agent 612'[1] of the first type without implementing another service agent of the second type, and another registration and inbound request block 934', which may form part of another client executed at the other device 304' or alternatively may be embedded in an operating system executed at the other device 304'. Both the device 304 and the other device 304 may implement other service agents (although the other device does not implement a service agent of the second type).

The registration blocks 934, 934' can communicate with registration and outbound request logic 914 of the distributed platform 808. Each is operable to register addresses of the user device 304 and the other user device 304' respectively with the registration and outbound request logic 914.

As described above, the first service logic can establish, using the addresses stored by the registration and outbound request logic 914 of the cloud 800, data connections to the service agent of the first type 612[1] and to the other service agent of the first type 612'[1], and the second service logic 602[2] can establish data connections to the service agent of the second type 612[2]. Similarly, service agents 612[1] and 612'[1] can establish data connections to the first service logic 602[1] and service agent 612[2] can establish data connections to the second service logic 602[2].

The registration block 935 of the user device 304 operates as described above (i.e. registers a username of user 302 and possible a device identifier of device 304). The other registration block 934' of the other user device 304' may operate in a similar manner, or it may register an address of the other user device as being publicly accessible (that is, usable by any user, say, in the vicinity of the other device 304) e.g. by registering an identifier of that device with the registration logic 914 (that logic storing that identifier in association with an address of device 304').

For example, in this embodiment, the user device 304 and other user device 304' are both connected to a common wireless access point 1202 (e.g. both may be connected to network 301 via that access point 1202). Both the registration block 934 of the user device and the registration block 943' of the other user device are operable to (e.g. upon start-up) register an identifier of this access point (e.g. MAC address) with the cloud registration logic 914. The client registration logic (or other detection logic) is operable to detect that both devices have registered this common access point and, in response to this detection, inform the client 416 which informs the user 302 in that event.

Upon creating or joining a call, the user 302 can then specify that, rather than extending the first type of control service (e.g. audio or video) to a corresponding agent at their user device 304 (e.g. audio agent or video agent), that service should instead be extended to a corresponding agent implemented at the other user device 304' (and not at the use device 304). Alternatively or additionally, during a call, the user 102 might specify that they wish to transfer a service which has been extended to an agent of the user device 304 to a corresponding agent of the user device 304'. The service logic then communicates with that service agent of the other user device and with other service logics in the above-described manner to create a mechanism whereby call data can flow between that agent and other call participants.

Figure 12A:
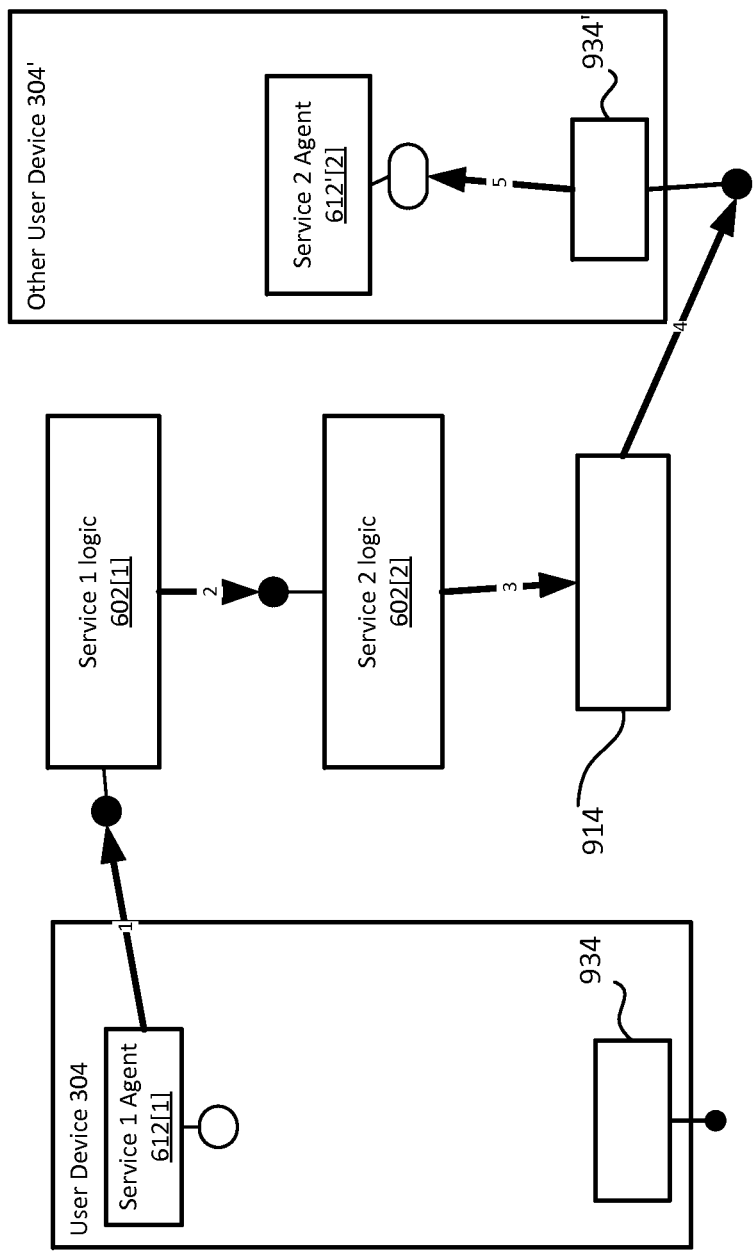

The first type of service agent 612[1] of the user device 304 can communicate with the second type of service agent 612'[2] of the other user device 304' by establishing a data connection with the first service logic 602[1] which, in response, establishes a data connection with the second service logic 602[2] which, in response, establishes a connection with the second type of service agent 612'[2] of the other user device 304' using the information pertaining to the user device 304' stored by registration logic 914. This is illustrated in FIG. 12A.

For instance, in one embodiment, the (second) user device 304 implements a full set of agents i.e. a first call agent, a first audio agent, a first video agent, a first transport agent and a first pipe agent; the other user device 304' does not implement a call agent, and only implements a second transport agent, a second pipe agent and at least one second media agent (audio agent and/or video agent).

The user 302 might specify upon creating or joining a call that they wish for at least one media (e.g. video) control service to be extended to a corresponding media agent of the other (first) user device 304' rather than to a corresponding media agent of the user device 104. In this case, the client agent of the user device 104 specifies this to the call controller and provides the identifier of the other device 304' thereto. The call controller then instructs the corresponding media (e.g. video) controller to negotiate (using the information stored by registration logic 914 in relation to the other device 304') media (e.g. video) parameters with the media (video) agent of the other device 304' (and not with any media agent of the device 304). Similarly, it instructs the transport controller to create a transport mechanism for exchange that type of real-time media (e.g. video) with other call participants; the transport controller in turn instructs the pipe controller to create a pipe for that type of media (e.g. video) between the corresponding media (e.g. video) agent of the other user device 304' (rather than the e.g. video agent of device 304).

The processing for establishing media (audio, video) pipes is the same as that described above with reference to FIGS. 10A and 10B, differences being that one or both of the media agents 926, 928 participating in that process are implemented at device 304' and that those pipe(s) are established though communication of control data with a transport agent and a pipe agent implemented at the other device 304'. That is, in embodiment, any of the agents 924, 926, 928 may all run on different devices (i.e. 3 devices in total), or any two agents may run on the same device with the third remaining agent running on a different device (i.e. 2 devices in total). Any device with a media agent (e.g. 926, 928) will also need to run transport and pipe agents to enable transportation of media. Only one device needs to run call control logic in the form of a call agent and the entire call can be controller using that device (with the other device(s) merely acting as media 'slaves')—the other device(s) do not need to run a call agent (or any other form of call control logic). Where a device runs only a call agent (with all media agents being run on the other device(s)), that device does not need to run pipe or transport agents (as no media is being transmitted to/from that device, only control signals to/from the call controller).

A second device may therefore run a call agent (but possibly no media agent) while a first device runs a media agent (audio/video) but no call agent. The second device may run another media agent of another type (video/audio) and the first device may or may not run another media agent of that type; or a third device may run the other media agent (video/audio) and the first and/or second devices may not run a media agent of that type (video/audio). For example, a TV may receive call video and run a video agent but not a call agent, and be controlled by a call agent on a smartphone. The smartphone may receive call audio and run an audio agent, or it may not and e.g. a speaker system connected to the network may receive call audio and run a call agent (but not a call agent or a video agent).

The fact that media is being delivers to device(s) other than the device controlling the call is invisible to the media and transport controllers. The only modification to the above-mentioned call setup is that the call controller supplies endpoint identifiers of the other device(s) to the media/transport controllers.

For instance, an audio pipe for communicating real-time audio data of the call may be established by the transport controller and pipe controller communicating control data with the transport agent and pipe agent respectively of client 416 implemented at the user device 304 as in FIGS. 10A and 10B, whereas a video pipe for communicating real-time video data of the call may be established by the transport controller and pipe controller communicating control data with the transport agent and pipe agent respectively implemented at the other device 304' as in FIGS. 10A and 10B.

Call control is effected by the call controller interacting with the call agent of the device 304, and the call agent can communicate with the agents on the other device 304' via the call controller, which in turn can communicates with those agents via the corresponding cloud controllers. Thus, there is no need for the other user device 304' to implement any form of call control agent or any other form of call control logic.

The communication system may comprise any form of detection logic configured to detect an association of the first and second devices responsive to which the detection logic causes a notification to be transmitted to the call agent on the second device. This detection logic may, for instance, be implemented at a transport level (e.g. the association arising at a transport level due to the first and second devices being connected to a common access point 1020) e.g. as part of, or accessible to, the transport controller, which informs the call controller (or which informs the media controller, the media controller informing the transport controller) of the detected associated—the call controller then informs the call agent on the user device). That is, in embodiments, the detection logic of the communication system informs one of: the call controller responsive to which the call controller transmits said notification; or the media modality controller responsive to which the media modality controller informs the call controller and responsive to which the call controller transmits said notification. The detection logic may be part of the transport controller in this case.

Alternatively, the all controller may detect a higher-level association. For instance, a user may create an association between the first and second devices by way of a shared secret e.g. the shared secret being a pairing code output (e.g. displayed) from the first device and input at the second device, or each device may be associated with a common user 302 (e.g. if that user is logged in at both devices). The detection logic may be part of the call controller in this case.

To provide privacy and security, the call controller may only conditionally allow use of the first device in the above-described manner based on a policy which dictates when the first device can and cannot be so used (the policy e.g. comprising identifier(s) of permitted users who e.g. 302 and/or identifier(s) of permitted user devices e.g. an identifier of the first device 304). The call controller is configured to access the computer storage to access the policy, said initiation of the instruction to the media modality controller by the call controller being dependent on the policy. The policy may indicates that the second device 304 and/or a user of the second device 402 is (or is not) permitted to make use of the first device.

Where the communication system comprises the media modality controller and another media modality controller (e.g. audio and video) respectively configured to manage different media modalities, a first media agent (e.g. video) on the first device may be used such that e.g. video of the call is transmitted to the second device, and a second media agent (e.g. audio) on the second device may be used such that e.g. audio (and call control) are retained on the second device.

Alternatively, e.g. audio and video agents on the first device 304' may be employed with only call control being effected by the second device 304 (executing a call agent).

Alternatively, a third user device (not shown) may run e.g. video whilst the second device runs e.g. audio.

Where the communication system comprises first and second media modality controllers (e.g. audio and video) configured to manage respective first and second media modalities of the established communication event without accessing the call agent on the second device. An instance of the first media modality controller may be configured to convey first media modality control signals of the communication event to a first media agent on the first device without accessing a second media agent on the second or a third computer device of the computer system; and an instance of the second media modality controller is configured to convey second media modality control signals of the communication event to the second media agent without accessing the first media agent. The respective instances of the first and second media modality controllers may be respectively assigned to convey the first and second media modality control signals responsive to respective instructions initiated to the first and second media modality controllers by the call controller. The instruction to the first media modality controller is initiated by the call controller responsive to a first instruction received from the call agent on the second device and wherein the instruction to the second media modality controller is initiated by the call controller responsive to the first or a second instruction received from the call agent on the second device. The first media modality controller instance may be released from said assignment responsive to the first media modality controller instance returning a response to the instruction initiated thereto while the second media modality controller instance continues to operate in communication with the second media agent.

In embodiments, the call controller may be configured to transmit an identifier of the first device to the media modality controller responsive to an instruction received from the call agent on the second device, said conveyance of media modality control signals by the media modality controller instance being based on that identifier.

The media modality controller instance may be released from said assignment responsive to the media modality controller instance returning a response to the instruction initiated by the call controller while the call controller continues to operate in communication with the call agent on the second device. An instance of the call controller may initiate the instruction to the media controller and the instance of the call controller may continue to operate in communication with the call agent on the second device following release of the instance of the media controller.

Whilst in the above, the processing units of the communication system on which controllers are instantiated are remote from call endpoints (that is the processing units are processing units other than said endpoints), in alternative embodiments some control may still be effected by the endpoints (that is by controller code on the endpoints). For example, in one embodiment call control, audio control, media control, transport control and pipe control may all be implemented centrally in the could 800 as described above, whilst e.g. instant messaging control is implemented on the endpoints themselves (and not by a cloud control service logic).

Further, whilst in the above, variously configured agents (call, media, transport, pipe) are implemented by a user device, in other embodiments endpoint other than user devices (e.g. servers, bridges etc.) may implemented one or more of the described agents.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A communication system for effecting communication events between endpoints connected via a communication network, the communication system comprising:
    a plurality of processing units, each having access to computer storage holding executable code modules for managing a communication event between a first end user device and a second end user device, the code modules configured to implement a plurality of media modality controllers configured to manage media modality of an established communication event and a call controller configured to establish the communication event, the plurality of media modality controllers including an audio controller configured to convey audio control signals between the first end user device and the second end user device and a video controller configured to convey video control signals between the first end user device and the second end user device; and
    a resource allocator configured to allocate physical resources of the processing units and computer storage to each of the call controller and the media modality controllers;
    wherein a grant of physical resources to the call controller is independent and different from a grant of physical resources to the media modality controllers, and a grant of physical resources to the audio controller is independent and different from a grant of physical resources to the video controller.

2. A communication system according to claim 1, wherein the physical resources are distributed across multiple failure-tolerant regions, the physical resources granted to the call controller being of a failure-tolerant region different from that of the physical resources granted to the media modality controllers.

3. A communication system according to claim 2, wherein the physical resources granted to the call controller have a geo-location different from that of the physical resources granted to the media modality controllers.

4. A communication system according to claim 1, wherein physical resources are distributed across multiple failure-tolerant regions, the grant of physical resources to the audio controller being of a failure region different from that of the physical resources granted to the video controller.

5. A communication system according to claim 4, wherein the physical resources granted to the audio controller have a geo-location different from that of the physical resources granted to video controller.

6. A communication system according to claim 1, wherein the processing units are configured to run a respective plurality of virtual machines respectively configured to execute one or more of said code modules.

7. A communication system according to claim 6, wherein the call controller is implemented by code modules executed on virtual machines which are different from virtual machines executing code modules implementing the media modality controllers.

8. A communication system according to claim 7, wherein the plurality of virtual machines are substantially isolated from one another.

9. A communication system according to claim 7, wherein the resource allocator is configured to effect the respective grants to the call controller and the media modality controllers by controlling the virtual machines of those controllers.

10. A communication system according to claim 9, wherein the grant for each controller is effected by increasing a size of one or more virtual machines of that controller and/or by increasing a number of virtual machines of that controller.

11. A communication system according to claim 7, wherein the call controller is implemented by a plurality of components, each component comprising one or more respective virtual machines executing respective code modules of that component.

12. A communication system according to claim 11, wherein the call controller is implemented by a call control component for receiving instructions from the network and an in-memory storage component for accessing computer storage, each of said components having a different and independent grant of physical resources.

13. A communication system according to claim 1, wherein the code modules are configured to implement a transport controller configured to manage transport of media between the first end user device and the second end user devices;
    wherein the resource allocator is further configured to allocate physical resources of the processing units and computer storage to the transport controller; and
    wherein a grant of physical resources to the transport controller is independent and different from the respective grants of physical resources to the call controller and the media modality controllers.

14. A communication system according to claim 13, wherein the code modules are configured to implement a pipe controller configured to create a pipe for said transportation of media under control of the transport controller; and wherein a grant of physical resources to the pipe controller is independent and different from the grant of physical resources to the transport controller.

15. A communication system according to claim 6, wherein at least one of said controllers is implemented by a plurality of components, each component comprising one or more virtual machines executing respective code modules of that component; and wherein a grant of physical resources to one of said components of that controller is independent and different from a grant of physical resources to another of said components of that same controller.

16. A communication system according to any of claim 15, wherein the communication system comprises a load balancer for each component, virtual machines of that component being load-balanced by that load balancer.

17. A communication system according to claim 1, wherein the code modules accessible by the processing units are further configured to implement the resource allocator.

18. At least one computer readable storage medium storing executable code which is configured to implement a method of resource allocation in a communication system comprising a plurality of processing units, each having access to computer storage holding executable code modules for managing the communication event between a first end user device and a second end user device, the code modules being configured to implement media modality controllers configured to manage media modality of an established communication event and a call controller configured to establish the communication event, the media modality controllers including an audio controller configured to convey audio control signals between the first end user device and the second end user device and a video controller configured to convey video control signals between the first end user device and the second end user device, the method comprising:

allocating first physical resources to the call controller; and independently allocating second physical resources to the audio controller, the second physical resources being different to the first physical resources; and independently allocating third physical resources to the video controller, the third physical resources being different to the first physical resources and the second physical resources.

19. A method of resource allocation in a communication system comprising a plurality of processing units, each having access to computer storage holding executable code modules for managing a communication event between a first end user device and a second end user device, the code modules being configured to implement a media modality controller configured to manage media modality of an established communication event and a call controller configured to establish the communication event, the method comprising:

allocating first physical resources to the call controller; and independently allocating second physical resources to the media modality controller, the second physical resources being different to the first physical resources;

wherein the code modules are configured to implement separate audio and video controllers, each of the audio and video controller being a respective media modality controller configured to convey control signals between the first end user device and the second end user device; and wherein a grant of physical resources to the audio controller is independent and different from a grant of physical resources to the video controller.

20. At least one computer readable medium storing executable code according to claim 18, wherein the plurality of processing units are configured to run a first virtual machine configured to execute the audio controller and a second virtual machine configured to execute the video controller, such that the first virtual machine and the second virtual machine are substantially isolated from one another.

* * * * *